United States Patent
Levi et al.

(10) Patent No.: US 12,502,275 B2
(45) Date of Patent: Dec. 23, 2025

(54) LEAFLET ATTACHMENT CONFIGURATIONS TO THE FRAMES OF PROSTHETIC VALVES

(71) Applicant: Edwards Lifesciences Corporation, Irvine, CA (US)

(72) Inventors: Tamir S. Levi, Zikhron Yaakov (IL); Nikolai Gurovich, Hadera (IL); Elena Sherman, Pardes Hana (IL); Ziv Yohanan, Kfar Hahoresh (IL)

(73) Assignee: EDWARDS LIFESCIENCES CORPORATION, Irvine, CA (US)

( * ) Notice: Subject to any disclaimer, the term of this patent is extended or adjusted under 35 U.S.C. 154(b) by 520 days.

(21) Appl. No.: 18/095,440

(22) Filed: Jan. 10, 2023

(65) Prior Publication Data
US 2023/0143332 A1    May 11, 2023

Related U.S. Application Data

(63) Continuation of application No. PCT/US2021/041002, filed on Jul. 9, 2021.

(60) Provisional application No. 63/211,417, filed on Jun. 16, 2021, provisional application No. 63/050,657, filed on Jul. 10, 2020.

(51) Int. Cl.
*A61F 2/24*    (2006.01)

(52) U.S. Cl.
CPC .... *A61F 2/2418* (2013.01); *A61F 2220/0075* (2013.01); *A61F 2220/0091* (2013.01)

(58) Field of Classification Search
CPC combination set(s) only.
See application file for complete search history.

(56) References Cited

U.S. PATENT DOCUMENTS

| | | |
|---|---|---|
| 3,409,013 A | 11/1968 | Berry |
| 3,548,417 A | 12/1970 | Ronnie et al. |
| 3,587,115 A | 6/1971 | Donald |
| 3,657,744 A | 4/1972 | Ersek |
| 3,671,979 A | 6/1972 | Moulopoulos |
| 3,714,671 A | 2/1973 | Edwards et al. |
| 3,755,823 A | 9/1973 | Hancock |
| 4,035,849 A | 7/1977 | Angell et al. |
| 4,056,854 A | 11/1977 | Boretos et al. |

(Continued)

FOREIGN PATENT DOCUMENTS

| | | |
|---|---|---|
| DE | 0144167 C | 9/1903 |
| DE | 2246526 A1 | 3/1973 |

(Continued)

OTHER PUBLICATIONS

H.R. Andersen, et al. "Transluminal Implantation of Artificial Heart Valve. Description of a New Expandable Aortic Valve and Initial Results with implantation by Catheter Technique in Closed Chest Pig," European Heart Journal, No. 13, pp. 704-708. 1992.

(Continued)

*Primary Examiner* — Tan-Uyen T Ho
(74) *Attorney, Agent, or Firm* — Klarquist Sparkman, LLP; Rosie H. Kim

(57) ABSTRACT

The present invention relates to implantable prosthetic devices, such as prosthetic heart valves, and to attachment configurations and methods of attaching soft components, such as leaflets or skirts, to frames of such prosthetic valves.

21 Claims, 20 Drawing Sheets

(56) References Cited

U.S. PATENT DOCUMENTS

| | | |
|---|---|---|
| 4,106,129 A | 8/1978 | Carpentier et al. |
| 4,222,126 A | 9/1980 | Boretos et al. |
| 4,265,694 A | 5/1981 | Boretos et al. |
| 4,297,749 A | 11/1981 | Davis et al. |
| RE30,912 E | 4/1982 | Hancock |
| 4,339,831 A | 7/1982 | Johnson |
| 4,343,048 A | 8/1982 | Ross et al. |
| 4,345,340 A | 8/1982 | Rosen |
| 4,373,216 A | 2/1983 | Klawitter |
| 4,406,022 A | 9/1983 | Roy |
| 4,441,216 A | 4/1984 | Ionescu et al. |
| 4,470,157 A | 9/1984 | Love |
| 4,535,483 A | 8/1985 | Klawitter et al. |
| 4,574,803 A | 3/1986 | Storz |
| 4,592,340 A | 6/1986 | Boyles |
| 4,605,407 A | 8/1986 | Black et al. |
| 4,612,011 A | 9/1986 | Kautzky |
| 4,643,732 A | 2/1987 | Pietsch et al. |
| 4,655,771 A | 4/1987 | Wallsten |
| 4,692,164 A | 9/1987 | Dzemeshkevich et al. |
| 4,733,665 A | 3/1988 | Palmaz |
| 4,759,758 A | 7/1988 | Gabbay |
| 4,762,128 A | 8/1988 | Rosenbluth |
| 4,777,951 A | 10/1988 | Cribier et al. |
| 4,787,899 A | 11/1988 | Lazarus |
| 4,787,901 A | 11/1988 | Baykut |
| 4,796,629 A | 1/1989 | Grayzel |
| 4,820,299 A | 4/1989 | Philippe et al. |
| 4,829,990 A | 5/1989 | Thuroff et al. |
| 4,851,001 A | 7/1989 | Taheri |
| 4,856,516 A | 8/1989 | Hillstead |
| 4,878,495 A | 11/1989 | Grayzel |
| 4,878,906 A | 11/1989 | Lindemann et al. |
| 4,883,458 A | 11/1989 | Shiber |
| 4,922,905 A | 5/1990 | Strecker |
| 4,966,604 A | 10/1990 | Reiss |
| 4,979,939 A | 12/1990 | Shiber |
| 4,986,830 A | 1/1991 | Owens et al. |
| 4,994,077 A | 2/1991 | Dobben |
| 5,007,896 A | 4/1991 | Shiber |
| 5,026,366 A | 6/1991 | Leckrone |
| 5,032,128 A | 7/1991 | Alonso |
| 5,037,434 A | 8/1991 | Lane |
| 5,047,041 A | 9/1991 | Samuels |
| 5,059,177 A | 10/1991 | Towne et al. |
| 5,080,668 A | 1/1992 | Bolz et al. |
| 5,085,635 A | 2/1992 | Cragg |
| 5,089,015 A | 2/1992 | Ross |
| 5,152,771 A | 10/1992 | Sabbaghian et al. |
| 5,163,953 A | 11/1992 | Vince |
| 5,167,628 A | 12/1992 | Boyles |
| 5,192,297 A | 3/1993 | Hull |
| 5,266,073 A | 11/1993 | Wall |
| 5,282,847 A | 2/1994 | Trescony et al. |
| 5,295,958 A | 3/1994 | Shturman |
| 5,332,402 A | 7/1994 | Teitelbaum |
| 5,360,444 A | 11/1994 | Kusuhara |
| 5,370,685 A | 12/1994 | Stevens |
| 5,397,351 A | 3/1995 | Pavcnik et al. |
| 5,411,055 A | 5/1995 | Kane |
| 5,411,552 A | 5/1995 | Andersen et al. |
| 5,443,446 A | 8/1995 | Shturman |
| 5,480,424 A | 1/1996 | Cox |
| 5,500,014 A | 3/1996 | Quijano et al. |
| 5,545,209 A | 8/1996 | Roberts et al. |
| 5,545,214 A | 8/1996 | Stevens |
| 5,549,665 A | 8/1996 | Vesely et al. |
| 5,554,185 A | 9/1996 | Block et al. |
| 5,558,644 A | 9/1996 | Boyd et al. |
| 5,571,175 A | 11/1996 | Vanney et al. |
| 5,584,803 A | 12/1996 | Stevens et al. |
| 5,591,185 A | 1/1997 | Kilmer et al. |
| 5,591,195 A | 1/1997 | Taheri et al. |
| 5,607,464 A | 3/1997 | Trescony et al. |
| 5,609,626 A | 3/1997 | Quijano et al. |
| 5,628,792 A | 5/1997 | Lentell |
| 5,639,274 A | 6/1997 | Fischell et al. |
| 5,665,115 A | 9/1997 | Cragg |
| 5,716,417 A | 2/1998 | Girard et al. |
| 5,728,068 A | 3/1998 | Leone et al. |
| 5,749,890 A | 5/1998 | Shaknovich |
| 5,756,476 A | 5/1998 | Epstein et al. |
| 5,769,812 A | 6/1998 | Stevens et al. |
| 5,800,508 A | 9/1998 | Goicoechea et al. |
| 5,840,081 A | 11/1998 | Andersen et al. |
| 5,855,597 A | 1/1999 | Jayaraman |
| 5,855,601 A | 1/1999 | Bessler et al. |
| 5,855,602 A | 1/1999 | Angell |
| 5,925,063 A | 7/1999 | Khosravi |
| 5,957,949 A | 9/1999 | Leonhardt et al. |
| 6,027,525 A | 2/2000 | Suh et al. |
| 6,132,473 A | 10/2000 | Williams et al. |
| 6,168,614 B1 | 1/2001 | Andersen et al. |
| 6,171,335 B1 | 1/2001 | Wheatley et al. |
| 6,174,327 B1 | 1/2001 | Mertens et al. |
| 6,210,408 B1 | 4/2001 | Chandrasekaran et al. |
| 6,217,585 B1 | 4/2001 | Houser et al. |
| 6,221,091 B1 | 4/2001 | Khosravi |
| 6,231,602 B1 | 5/2001 | Carpentier et al. |
| 6,245,102 B1 | 6/2001 | Jayaraman |
| 6,299,637 B1 | 10/2001 | Shaolian et al. |
| 6,302,906 B1 | 10/2001 | Goicoechea et al. |
| 6,338,740 B1 | 1/2002 | Carpentier |
| 6,350,277 B1 | 2/2002 | Kocur |
| 6,352,547 B1 | 3/2002 | Brown et al. |
| 6,425,916 B1 | 7/2002 | Garrison et al. |
| 6,440,764 B1 | 8/2002 | Focht et al. |
| 6,454,799 B1 | 9/2002 | Schreck |
| 6,458,153 B1 | 10/2002 | Bailey et al. |
| 6,461,382 B1 | 10/2002 | Cao |
| 6,468,660 B2 | 10/2002 | Ogle et al. |
| 6,482,228 B1 | 11/2002 | Norred |
| 6,488,704 B1 | 12/2002 | Connelly et al. |
| 6,527,979 B2 | 3/2003 | Constantz et al. |
| 6,569,196 B1 | 5/2003 | Vesely |
| 6,582,462 B1 | 6/2003 | Andersen et al. |
| 6,605,112 B1 | 8/2003 | Moll et al. |
| 6,652,578 B2 | 11/2003 | Bailey et al. |
| 6,689,123 B2 | 2/2004 | Pinchasik |
| 6,716,244 B2 | 4/2004 | Klaco |
| 6,730,118 B2 | 5/2004 | Spenser et al. |
| 6,733,525 B2 | 5/2004 | Yang et al. |
| 6,767,362 B2 | 7/2004 | Schreck |
| 6,769,161 B2 | 8/2004 | Brown et al. |
| 6,783,542 B2 | 8/2004 | Eidenschink |
| 6,830,584 B1 | 12/2004 | Seguin |
| 6,878,162 B2 | 4/2005 | Bales et al. |
| 6,893,460 B2 | 5/2005 | Spenser et al. |
| 6,908,481 B2 | 6/2005 | Cribier |
| 6,936,067 B2 | 8/2005 | Buchanan |
| 7,018,406 B2 | 3/2006 | Seguin et al. |
| 7,018,408 B2 | 3/2006 | Bailey et al. |
| 7,096,554 B2 | 8/2006 | Austin et al. |
| 7,225,518 B2 | 6/2007 | Eidenschink et al. |
| 7,276,078 B2 | 10/2007 | Spenser et al. |
| 7,276,084 B2 | 10/2007 | Yang et al. |
| 7,316,710 B1 | 1/2008 | Cheng et al. |
| 7,318,278 B2 | 1/2008 | Zhang et al. |
| 7,374,571 B2 | 5/2008 | Pease et al. |
| 7,393,360 B2 | 7/2008 | Spenser et al. |
| 7,462,191 B2 | 12/2008 | Spenser et al. |
| 7,510,575 B2 | 3/2009 | Spenser et al. |
| 7,563,280 B2 | 7/2009 | Anderson et al. |
| 7,585,321 B2 | 9/2009 | Cribier |
| 7,618,446 B2 | 11/2009 | Andersen et al. |
| 7,618,447 B2 | 11/2009 | Case et al. |
| 7,655,034 B2 | 2/2010 | Mitchell et al. |
| 7,785,366 B2 | 8/2010 | Maurer et al. |
| 7,959,665 B2 | 6/2011 | Pienknagura |
| 7,959,672 B2 | 6/2011 | Salahieh et al. |
| 7,993,394 B2 | 8/2011 | Hariton et al. |
| 8,029,556 B2 | 10/2011 | Rowe |
| 8,075,611 B2 | 12/2011 | Millwee et al. |
| 8,128,686 B2 | 3/2012 | Paul et al. |

(56) References Cited

U.S. PATENT DOCUMENTS

| | | |
|---|---|---|
| 8,167,932 B2 | 5/2012 | Bourang et al. |
| 8,291,570 B2 | 10/2012 | Eidenschink et al. |
| 8,348,998 B2 | 1/2013 | Pintor et al. |
| 8,449,606 B2 | 5/2013 | Eliasen et al. |
| 8,454,685 B2 | 6/2013 | Hariton et al. |
| 8,652,203 B2 | 2/2014 | Quadri et al. |
| 8,685,055 B2 | 4/2014 | VanTassel et al. |
| 8,747,463 B2 | 6/2014 | Fogarty et al. |
| 9,078,781 B2 | 7/2015 | Ryan et al. |
| 11,224,509 B2 | 1/2022 | Dasi et al. |
| 2001/0021872 A1 | 9/2001 | Bailey et al. |
| 2002/0026094 A1 | 2/2002 | Roth |
| 2002/0032481 A1 | 3/2002 | Gabbay |
| 2002/0138135 A1 | 9/2002 | Duerig et al. |
| 2002/0143390 A1 | 10/2002 | Ishii |
| 2002/0173842 A1 | 11/2002 | Buchanan |
| 2003/0014105 A1 | 1/2003 | Cao |
| 2003/0040791 A1 | 2/2003 | Oktay |
| 2003/0050694 A1 | 3/2003 | Yang et al. |
| 2003/0100939 A1 | 5/2003 | Yodfat et al. |
| 2003/0158597 A1 | 8/2003 | Quiachon et al. |
| 2003/0212454 A1 | 11/2003 | Scott et al. |
| 2004/0024452 A1 | 2/2004 | Kruse et al. |
| 2004/0039436 A1 | 2/2004 | Spenser et al. |
| 2004/0078074 A1 | 4/2004 | Anderson et al. |
| 2004/0186558 A1 | 9/2004 | Pavcnik et al. |
| 2004/0186563 A1 | 9/2004 | Lobbi |
| 2004/0186565 A1 | 9/2004 | Schreck |
| 2004/0260389 A1 | 12/2004 | Case et al. |
| 2005/0010285 A1 | 1/2005 | Lambrecht et al. |
| 2005/0075725 A1 | 4/2005 | Rowe |
| 2005/0075728 A1 | 4/2005 | Nguyen et al. |
| 2005/0096736 A1 | 5/2005 | Osse et al. |
| 2005/0096738 A1 | 5/2005 | Cali et al. |
| 2005/0137686 A1 | 6/2005 | Salahieh et al. |
| 2005/0188525 A1 | 9/2005 | Weber et al. |
| 2005/0203614 A1 | 9/2005 | Forster et al. |
| 2005/0203617 A1 | 9/2005 | Forster et al. |
| 2005/0234546 A1 | 10/2005 | Nugent et al. |
| 2006/0004469 A1 | 1/2006 | Sokel |
| 2006/0025857 A1 | 2/2006 | Bergheim et al. |
| 2006/0058872 A1 | 3/2006 | Salahieh et al. |
| 2006/0074484 A1 | 4/2006 | Huber |
| 2006/0108090 A1 | 5/2006 | Ederer et al. |
| 2006/0149350 A1 | 7/2006 | Patel et al. |
| 2006/0183383 A1 | 8/2006 | Asmus et al. |
| 2006/0229719 A1 | 10/2006 | Marquez et al. |
| 2006/0259136 A1 | 11/2006 | Nguyen et al. |
| 2006/0259137 A1 | 11/2006 | Artof et al. |
| 2006/0287717 A1 | 12/2006 | Rowe et al. |
| 2007/0005131 A1 | 1/2007 | Taylor |
| 2007/0010876 A1 | 1/2007 | Salahieh et al. |
| 2007/0010877 A1 | 1/2007 | Salahieh et al. |
| 2007/0112422 A1 | 5/2007 | Dehdashtian |
| 2007/0162102 A1 | 7/2007 | Ryan et al. |
| 2007/0203503 A1 | 8/2007 | Salahieh et al. |
| 2007/0203575 A1 | 8/2007 | Forster et al. |
| 2007/0203576 A1 | 8/2007 | Lee et al. |
| 2007/0208550 A1 | 9/2007 | Cao et al. |
| 2007/0213813 A1 | 9/2007 | Segesser et al. |
| 2007/0233228 A1 | 10/2007 | Eberhardt et al. |
| 2007/0260305 A1 | 11/2007 | Drews et al. |
| 2007/0265700 A1 | 11/2007 | Eliasen et al. |
| 2008/0021546 A1 | 1/2008 | Patz et al. |
| 2008/0114442 A1 | 5/2008 | Mitchell et al. |
| 2008/0125853 A1 | 5/2008 | Bailey et al. |
| 2008/0154355 A1 | 6/2008 | Benichou et al. |
| 2008/0183271 A1 | 7/2008 | Frawley et al. |
| 2008/0208327 A1 | 8/2008 | Rowe |
| 2008/0243245 A1 | 10/2008 | Thambar et al. |
| 2008/0255660 A1 | 10/2008 | Guyenot et al. |
| 2008/0275537 A1 | 11/2008 | Limon |
| 2008/0294248 A1 | 11/2008 | Yang et al. |
| 2009/0118826 A1 | 5/2009 | Khaghani |
| 2009/0125118 A1 | 5/2009 | Gong |
| 2009/0157175 A1 | 6/2009 | Benichou |
| 2009/0276040 A1 | 11/2009 | Rowe et al. |
| 2009/0281619 A1 | 11/2009 | Le et al. |
| 2009/0287296 A1 | 11/2009 | Manasse |
| 2009/0287299 A1 | 11/2009 | Tabor et al. |
| 2009/0299452 A1 | 12/2009 | Eidenschink et al. |
| 2009/0319037 A1 | 12/2009 | Rowe et al. |
| 2010/0004735 A1 | 1/2010 | Yang et al. |
| 2010/0049313 A1 | 2/2010 | Alon et al. |
| 2010/0082094 A1 | 4/2010 | Quadri et al. |
| 2010/0100176 A1 | 4/2010 | Elizondo et al. |
| 2010/0168844 A1 | 7/2010 | Toomes et al. |
| 2010/0185277 A1 | 7/2010 | Braido et al. |
| 2010/0198347 A1 | 8/2010 | Zakay et al. |
| 2010/0204781 A1 | 8/2010 | Alkhatib |
| 2011/0015729 A1 | 1/2011 | Jimenez et al. |
| 2011/0022157 A1 | 1/2011 | Essinger et al. |
| 2011/0066224 A1 | 3/2011 | White |
| 2011/0137397 A1 | 6/2011 | Chau et al. |
| 2011/0218619 A1 | 9/2011 | Benichou et al. |
| 2011/0319991 A1 | 12/2011 | Hariton et al. |
| 2012/0030090 A1 | 2/2012 | Johnston et al. |
| 2012/0089223 A1 | 4/2012 | Nguyen et al. |
| 2012/0101571 A1 | 4/2012 | Thambar et al. |
| 2012/0123529 A1 | 5/2012 | Levi et al. |
| 2012/0259409 A1 | 10/2012 | Nguyen et al. |
| 2013/0023985 A1 | 1/2013 | Khairkhahan et al. |
| 2013/0046373 A1 | 2/2013 | Cartledge et al. |
| 2013/0150956 A1 | 6/2013 | Yohanan et al. |
| 2013/0166017 A1 | 6/2013 | Cartledge et al. |
| 2013/0190857 A1 | 7/2013 | Mitra et al. |
| 2013/0274873 A1 | 10/2013 | Delaloye et al. |
| 2013/0310926 A1 | 11/2013 | Hariton |
| 2013/0317598 A1 | 11/2013 | Rowe et al. |
| 2013/0331929 A1 | 12/2013 | Mitra et al. |
| 2014/0194981 A1 | 7/2014 | Menk et al. |
| 2014/0200661 A1 | 7/2014 | Pintor et al. |
| 2014/0209238 A1 | 7/2014 | Bonyuet et al. |
| 2014/0222136 A1 | 8/2014 | Geist et al. |
| 2014/0277417 A1 | 9/2014 | Schraut et al. |
| 2014/0277419 A1 | 9/2014 | Garde et al. |
| 2014/0277424 A1 | 9/2014 | Oslund |
| 2014/0277563 A1 | 9/2014 | White |
| 2014/0296962 A1 | 10/2014 | Cartledge et al. |
| 2014/0330372 A1 | 11/2014 | Weston et al. |
| 2014/0343670 A1 | 11/2014 | Bakis et al. |
| 2014/0343671 A1 | 11/2014 | Yohanan et al. |
| 2014/0350667 A1 | 11/2014 | Braido et al. |
| 2015/0073545 A1 | 3/2015 | Braido |
| 2015/0073546 A1 | 3/2015 | Braido |
| 2015/0135506 A1 | 5/2015 | White |
| 2015/0157455 A1 | 6/2015 | Hoang et al. |
| 2016/0374802 A1 | 12/2016 | Levi et al. |
| 2017/0014229 A1 | 1/2017 | Nguyen-Thien-Nhon et al. |
| 2018/0028310 A1 | 2/2018 | Gurovich et al. |
| 2018/0078367 A1* | 3/2018 | Saar .......... A61F 2/2418 |
| 2018/0153689 A1 | 6/2018 | Maimon et al. |
| 2018/0325665 A1 | 11/2018 | Gurovich et al. |
| 2018/0344456 A1 | 12/2018 | Barash et al. |
| 2019/0159894 A1 | 5/2019 | Levi et al. |
| 2019/0192288 A1 | 6/2019 | Levi et al. |
| 2019/0192289 A1 | 6/2019 | Levi et al. |

FOREIGN PATENT DOCUMENTS

| | | |
|---|---|---|
| DE | 19532846 A1 | 3/1997 |
| DE | 19546692 A1 | 6/1997 |
| DE | 19857887 A1 | 7/2000 |
| DE | 19907646 A1 | 8/2000 |
| DE | 10049812 A1 | 4/2002 |
| DE | 10049813 C1 | 4/2002 |
| DE | 10049814 A1 | 4/2002 |
| DE | 10049815 A1 | 4/2002 |
| EP | 0103546 B1 | 5/1988 |
| EP | 0850607 A1 | 7/1998 |
| EP | 1057460 A1 | 12/2000 |
| EP | 1088529 A2 | 4/2001 |
| EP | 1570809 A1 | 9/2005 |
| FR | 2788217 A1 | 7/2000 |

(56) References Cited

FOREIGN PATENT DOCUMENTS

| | | |
|---|---|---|
| FR | 2815844 A1 | 5/2002 |
| GB | 2056023 A | 3/1981 |
| SU | 1271508 A1 | 11/1986 |
| WO | 1991017720 A1 | 11/1991 |
| WO | 1992017118 A1 | 10/1992 |
| WO | 1993001768 A1 | 2/1993 |
| WO | 1997024080 A1 | 7/1997 |
| WO | 1998029057 A1 | 7/1998 |
| WO | 1999030646 A1 | 6/1999 |
| WO | 1999033414 A1 | 7/1999 |
| WO | 1999040964 A1 | 8/1999 |
| WO | 1999047075 A1 | 9/1999 |
| WO | 2000018333 A1 | 4/2000 |
| WO | 2000041652 A1 | 7/2000 |
| WO | 2000047139 A1 | 8/2000 |
| WO | 2001035878 A2 | 5/2001 |
| WO | 2001049213 A2 | 7/2001 |
| WO | 2001054624 A1 | 8/2001 |
| WO | 2001054625 A1 | 8/2001 |
| WO | 2001062189 A1 | 8/2001 |
| WO | 2001064137 A1 | 9/2001 |
| WO | 2001076510 A2 | 10/2001 |
| WO | 2002022054 A1 | 3/2002 |
| WO | 2002036048 A1 | 5/2002 |
| WO | 2002041789 A2 | 5/2002 |
| WO | 2002043620 A1 | 6/2002 |
| WO | 2002047575 A2 | 6/2002 |
| WO | 2002049540 A2 | 6/2002 |
| WO | 2003047468 A1 | 6/2003 |
| WO | 2005034812 A1 | 4/2005 |
| WO | 2005055883 A1 | 6/2005 |
| WO | 2005084595 A1 | 9/2005 |
| WO | 2005102015 A2 | 11/2005 |
| WO | 2006014233 A2 | 2/2006 |
| WO | 2006032051 A2 | 3/2006 |
| WO | 2006034008 A2 | 3/2006 |
| WO | 2006111391 A1 | 10/2006 |
| WO | 2006127089 A1 | 11/2006 |
| WO | 2006138173 A2 | 12/2006 |
| WO | 2007047488 A2 | 4/2007 |
| WO | 2007067942 A1 | 6/2007 |
| WO | 2007097983 A2 | 8/2007 |
| WO | 2008005405 A2 | 1/2008 |
| WO | 2008015257 A2 | 2/2008 |
| WO | 2008035337 A2 | 3/2008 |
| WO | 2008091515 A2 | 7/2008 |
| WO | 2008147964 A1 | 12/2008 |
| WO | 2008150529 A1 | 12/2008 |
| WO | 2009033469 A1 | 3/2009 |
| WO | 2009042196 A2 | 4/2009 |
| WO | 2009053497 A1 | 4/2009 |
| WO | 2009061389 A2 | 5/2009 |
| WO | 2009094188 A2 | 7/2009 |
| WO | 2009116041 A2 | 9/2009 |
| WO | 2009149462 A2 | 12/2009 |
| WO | 2010011699 A2 | 1/2010 |
| WO | 2010121076 A2 | 10/2010 |
| WO | 2013106585 A1 | 7/2013 |
| WO | 2015085218 A1 | 6/2015 |

OTHER PUBLICATIONS

H.R. Andersen "History of Percutaneous Aortic Valve Prosthesis," Herz No. 34. pp. 343-346. 2009.
Pavcnik, et al. "Development and initial Experimental Evaluation of a Prosthetic Aortic Valve for Transcatheter Placement," Cardiovascular Radiology, vol. 183, No. 1. pp. 151-154. 1992.
Bailey, S. "Percutaneous Expandable Prosthetic Valves," Textbook of Interventional Cardiology vol. 2, 2nd Ed. pp. 1268-1276. 1994.
Al-Khaja, et al. "Eleven Years' Experience with Carpentier-Edwards Biological Valves in Relation to Survival and Complications," European Journal of Cardiothoracic Surgery, vol. 3. pp. 305-311. 1989.
Ross, "Aortic Valve Surgery," At a meeting of the Council on Aug. 4, 1966. pp. 192-197.
Sabbah, et al. "Mechanical Factors in the Degeneration of Porcine Bioprosthetic Valves: An Overview," Journal of Cardiac Surgery, vol. 4, No. 4. pp. 302-309. 1989.
Wheatley, "Valve Prostheses," Operative Surgery, 4th ed. pp. 415-424. 1986.
Uchida, "Modifications of Gianturco Expandable Wire Stents," American Journal of Roentgenology, vol. 150. pp. 1185-1187. 1986.
Walther T, Dehdashtian MM, Khanna R, Young E, Goldbrunner PJ, Lee W. Trans-catheter valve-in-valve implantation: in vitro hydrodynamic performance of the SAPIEN+cloth trans-catheter heart valve in the Carpentier-Edwards Perimount valves. Eur J Cardiothorac Surg. 2011;40(5):1120-6. Epub Apr. 7, 2011.
Fontaine, M.D., Arthur B., et al, "Vascular Stent Prototype; Results of Preclinical Evaluation", p. 29-34; Technical Developments and Instrumentation; Jan.-Feb. 1996, vol. 7, No. 1.
Fontaine, M.D., Arthur B., et al, "Prototype Stent: Invivo Swine Studies in the Biliary System", p. 101-105, Journal of Vascular and Interventional Radiology; Jan.-Feb. 1997; vol. 8, No. 1.
Patrick W. Serruys, Nicolo Piazza, Alain Cribier, John Webb, Jean-Claude Laborde, Peter de Jaegere, "Transcatheter Aortic Valve Implantation: Tips and Tricks to Avoid Failure"; we file the table of contents and pp. 18 to 39 (Chapter 2) and pp. 102-114 (Chapter 8); the publication date according to the "Library of Congress Cataloging-in-Publication Data" is Nov. 24, 2009.

* cited by examiner

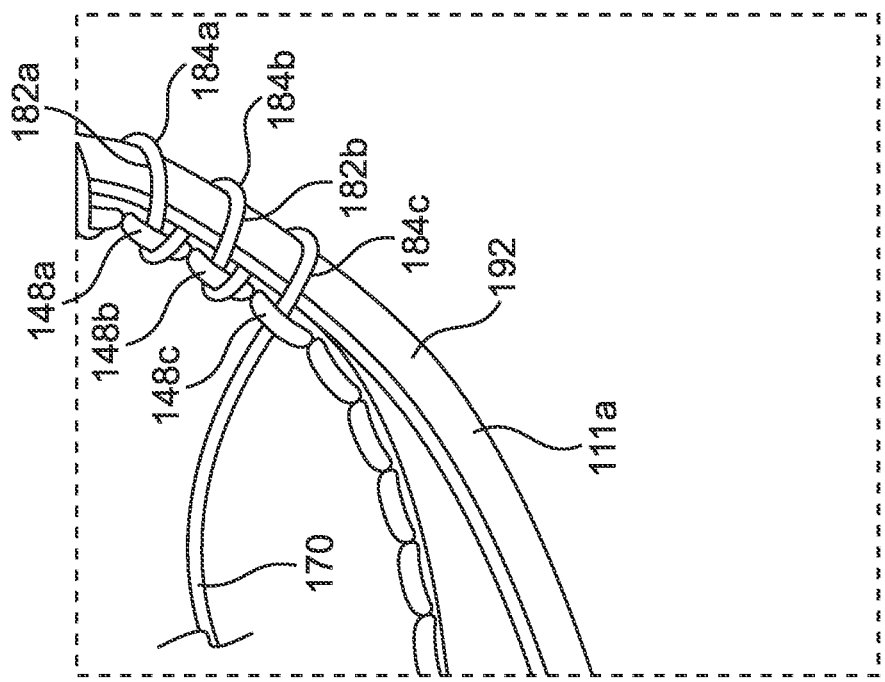
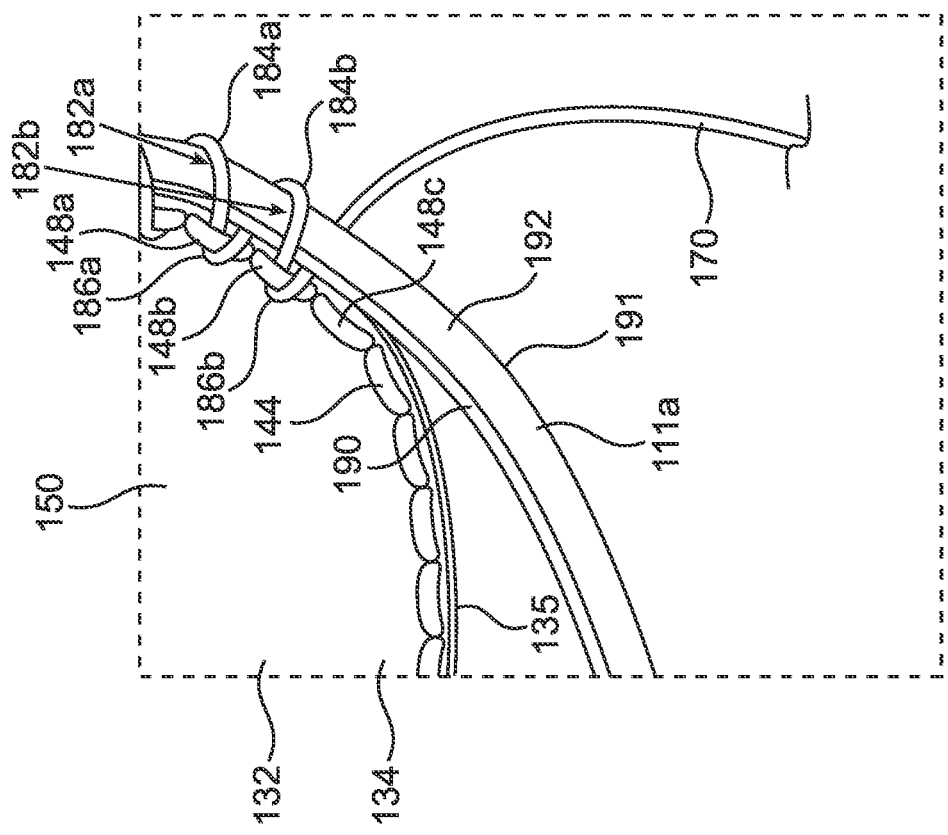
FIG. 11B
FIG. 11A

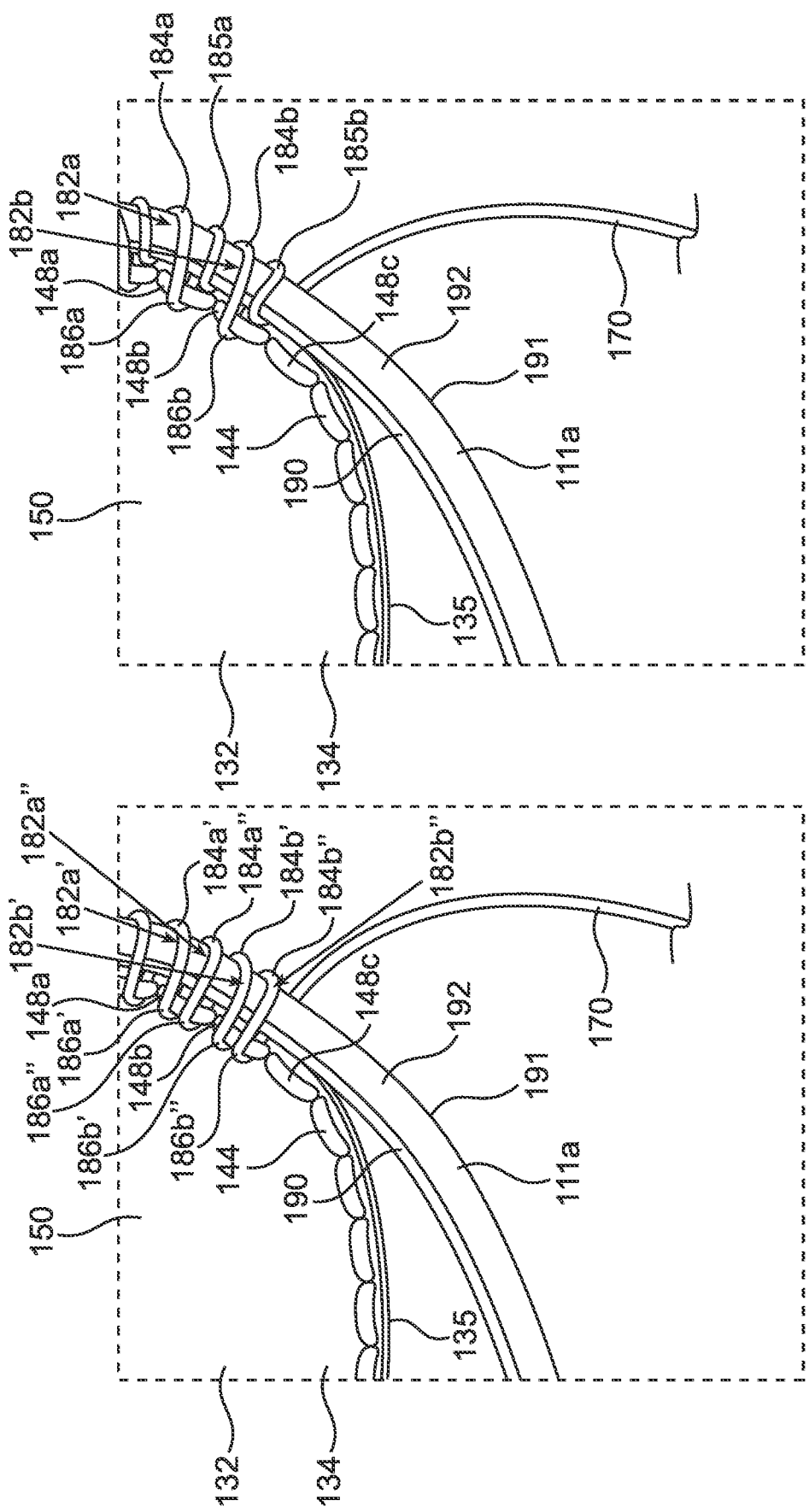

LEAFLET ATTACHMENT CONFIGURATIONS TO THE FRAMES OF PROSTHETIC VALVES

CROSS REFERENCE TO RELATED APPLICATION

This application is a continuation of a PCT Application No. PCT/US2021/041002, filed Jul. 9, 2021, which claims the benefit of U.S. Provisional Patent Application No. 63/211,417, filed Jun. 16, 2021 and U.S. provisional Patent Application No. 63/050,657 filed Jul. 10, 2020, where each of above-referenced applications is incorporated herein by reference in its entirety.

FIELD OF THE INVENTION

The present invention relates to implantable prosthetic devices, such as prosthetic heart valves, and to attachment configurations and methods of attaching soft components, such as leaflets or skirts, to frames of such prosthetic valves.

BACKGROUND OF THE INVENTION

Native heart valves, such as the aortic, pulmonary and mitral valves, function to assure adequate directional flow from, and to, the heart, and between the heart's chambers, to supply blood to the whole cardiovascular system. Various valvular diseases can render the valves ineffective and require replacement with artificial valves. Surgical procedures can be performed to repair or replace a heart valve. Since surgeries are prone to an abundance of clinical complications, alternative less invasive techniques of delivering a prosthetic heart valve over a catheter and implanting it over the native malfunctioning valve have been developed over the years.

Different types of prosthetic heart valves are known to date, including balloon expandable valve, self-expandable valves and mechanically-expandable valves. Different methods of delivery and implantation are also known, and may vary according to the site of implantation and the type of prosthetic valve. One exemplary technique includes utilization of a delivery assembly for delivering a prosthetic valve in a crimped configuration, from an incision which can be located at the patient's femoral or iliac artery, toward the native malfunctioning valve. Once the prosthetic valve is properly positioned at the desired site of implantation, it can be expanded against the surrounding anatomy, such as an annulus of a native valve, and the delivery assembly can be retrieved thereafter.

One of the complications that may be associated with implanted prosthetic heart valves is thrombus formation on the prosthetic structures, which can result in reduced leaflet motility or impaired coaptation, reduced effective valve orifice area, increased transvalvular pressure gradient, or transvalvular regurgitation. Thrombus may be formed by tissue ingrowth in fabric components of the prosthetic valves, such as fabrics utilized as intermediaries for coupling leaflets of a prosthetic valve to its frame. Thus, a need exists for leaflet-to-frame coupling methods and configurations, that will minimize or eliminate the need for incorporation of fabric components, thereby reducing the risk of tissue ingrowth and thrombus formation.

SUMMARY OF THE INVENTION

The present disclosure is directed toward prosthetic heart valves that include an expandable frame and a leaflet assembly, wherein the leaflets are coupled to struts of the frame via a primary suture threaded in an in-and-out pattern along the cusp end portions of the leaflets, and a secondary suture is threaded through the primary suture and around the struts, having a plurality of self-tightening constructs configured to constrict under tension over the struts.

According to one aspect of the invention, there is provided a prosthetic valve comprising a frame movable between a radially compressed configuration and a radially expanded configuration, and a leaflet assembly mounted within the frame and comprising a plurality of leaflets configured to regulate flow through the prosthetic valve. The frame comprises a plurality of intersecting struts. Each leaflet comprises a rounded cusp end portion defining a cusp edge, a free edge opposite to the cusp edge, and a pair of oppositely-directed tabs separating the cusp edge and the free edge.

Each cusp end portion is coupled to at least one strut via at least one primary suture threaded at penetration points therethrough in an in-and-out pattern, and a secondary suture threaded through the primary suture and around at least one section of at least one strut, wherein the secondary suture comprises a plurality of self-tightening constructs, and wherein each self-tightening construct comprises at least one loop configured to constrict under tension around the strut.

According to some embodiments, the leaflet comprises a leaflet inner surface and a leaflet outer surface, and the primary suture comprises a plurality of inner stitch portions disposed along the leaflet inner surface, and plurality of outer stitch portions disposed along the leaflet outer surface, each inner stitch portion and each outer stitch portion defined between respective penetration points.

According to some embodiments, the self-tightening construct is defined between two penetrations points that define at least one outer stitch portion there-between.

According to some embodiments, the at least one loop of each self-tightening construct comprises two loops.

According to some embodiments, each self-tightening construct further comprises a u-shaped section partially extending between the at least one loop and the strut.

According to some embodiments, the secondary suture further comprises a plurality of suture pull portions extending over the leaflet inner surface.

According to some embodiments, at least one of the suture pull portions spans over more than one inner or outer stitch portions.

According to some embodiments, the suture pull portions are pressed against portions of the at least one primary suture.

According to some embodiments, the diameter of the secondary suture is smaller than the diameter of the primary suture.

According to some embodiments, a secondary to primary sutures diameter ratio is equal to or smaller than 0.8.

According to some embodiments, a secondary to primary sutures diameter ratio is equal to or smaller than 0.5.

According to some embodiments, a secondary to primary sutures diameter ratio is equal to or smaller than 0.3.

According to some embodiments, the cusp end portion of each leaflet comprises a series of pre-formed apertures.

According to some embodiments, the apertures are dimensioned to accept the at least one primary suture, thereby serving as the penetration points.

According to some embodiments, the apertures are equally spaced from each other.

According to some embodiments, the diameter of the apertures is equal to or smaller than the diameter of the primary suture.

According to some embodiments, the diameter of the apertures is equal to or smaller than the combined diameters of the primary suture and the secondary suture.

According to some embodiments, the secondary suture is threaded through all successive penetration points.

According to some embodiments, the at least one primary suture comprises two primary sutures, which are inversely threaded in an in-and-out pattern, through the same penetration points.

According to some embodiments, the diameter of the apertures is equal to or smaller than the diameter of the two primary sutures.

According to some embodiments, the diameter of the apertures is equal to or smaller than the combined diameters of the two primary sutures and the secondary suture.

According to some embodiments, the at least one primary suture tracks the curvature of the at least one cusp edge.

According to some embodiments, the primary suture comprises a multi-filament suture.

According to some embodiments, the secondary suture comprises an ultra-high-molecular-weight polyethylene.

According to some embodiments, the prosthetic valve is devoid of fabric strips and/or cloth between the cusp end portions of the leaflets and the struts they are attached to.

According to another aspect of the inventions, there is provided a method of assembling a prosthetic valve, the method comprises threading a primary suture in an in-and-out pattern through a cusp end portion of a leaflet. The method further comprises approximating the cusp end portion with the primary suture threaded there-through to at least one strut of a frame of the prosthetic valve. The method further comprises stitching a secondary suture through the primary suture and around the at least one strut, in a manner that forms a plurality of self-tightening constructs, wherein each self-tightening construct is formed to comprise at least one loop configured to constrict under tension around the strut.

According to some embodiments, the stitching a secondary suture includes threading the secondary suture radially outward through the primary suture at a penetration point, thereby forming the at least one loop around the at least one strut.

According to some embodiments, the stitching a secondary suture comprises looping the secondary suture again around the at least one strut after forming a first loop, thereby forming two loops for each self-tightening construct.

According to some embodiments, the stitching a secondary suture comprises passing the secondary suture under the at least one loop, between the at least one loop and the at least one strut, to form a u-shaped section.

According to some embodiments, the method comprises a further step of extending the secondary suture over a leaflet inner surface, and then threading the secondary suture once again through the primary suture in a radially-outward direction, thereby forming at least one suture pull portion extending over the leaflet inner surface.

According to some embodiments, the cusp end portion of each leaflet comprises a series of pre-formed apertures, and wherein the step of threading a primary suture comprises threading the primary suture in an in-and-out pattern through the series of pre-formed apertures.

According to another aspect of the invention, there is provided a prosthetic valve comprising a frame movable between a radially compressed configuration and a radially expanded configuration, and a leaflet assembly mounted within the frame and comprising a plurality of leaflets configured to regulate flow through the prosthetic valve. The frame comprises a plurality of strut sections intersecting at junctions. Each junction is defined between: two opposite axial sides comprising a junction proximal side and a junction distal side; two opposite radial sides comprising a junction inner side and a junction outer side; and two opposite lateral sides comprising a junction first lateral side and a junction second lateral side.

Each leaflet comprises a rounded cusp end portion defining a cusp edge, a free edge opposite to the cusp edge, and a pair of oppositely-directed tabs separating the cusp edge and the free edge. Each cusp end portion is coupled to at least one strut section via at least one primary suture threaded at penetration points therethrough in an in-and-out pattern, and a secondary suture threaded through the primary suture and wrapped around the strut section in a series of whip stitches spaced from each other along the length of the strut section The cusp end portion is further coupled to at least one junction at an end of the strut section via a junction lock-knot formed by the second suture, wherein the junction lock-knot is configured to maintain tension on the plurality of the whip stitches wrapped around the corresponding strut section leading to the junction first lateral section.

According to some embodiments, each junction lock-knot comprises: (1) a transition section extending over one axial side of the junction, in a direction from the junction first lateral side to the junction second lateral side, (2) a first loop extending from the transition section and around a strut section extending from the junction second lateral side, and (3) a second loop extending from the first loop, between the transition section and the junction, and folded over itself to extend through the first loop.

According to some embodiments, the transition section extends in a diagonal direction from one radial side of the junction toward the opposite radial side of the junction, as well as from one lateral side of the junction to the opposite lateral side of the junction.

According to some embodiments, both the first loop and the second loop are tightly tensioned around the junction.

According to some embodiments, each plurality of whip stitches wrapped around a single strut section are angled whip stitches, oriented in the same direction along the length of the corresponding strut section.

According to some embodiments, the cusp end portion is sutured to at least two strut sections extending from both lateral sides of a selected junction, via a plurality of whip stitches wrapped around each of the respective strut sections and a junction lock-knot around the junction positioned there-between, wherein the plurality of whip stitches around one of the strut sections are angled in a direction opposite to that of the plurality of the whip stitches wrapped around the other strut section.

According to some embodiments, the diameter of the secondary suture is smaller than the diameter of the primary suture.

According to some embodiments, a secondary to primary sutures diameter ratio is equal to or smaller than 0.8.

According to some embodiments, a secondary to primary sutures diameter ratio is equal to or smaller than 0.5.

According to some embodiments, a secondary to primary sutures diameter ratio is equal to or smaller than 0.3.

According to some embodiments, the cusp end portion of each leaflet comprises a series of pre-formed apertures.

According to some embodiments, the apertures are dimensioned to accept the at least one primary suture, thereby serving as the penetration points.

According to some embodiments, the apertures are equally spaced from each other.

According to some embodiments, the diameter of the apertures is equal to or smaller than the diameter of the primary suture.

According to some embodiments, the diameter of the apertures is equal to or smaller than the combined diameters of the primary suture and the secondary suture.

According to some embodiments, the at least one primary suture comprises two primary sutures, which are inversely threaded in an in-and-out pattern, through the same penetration points.

According to some embodiments, the diameter of the apertures is equal to or smaller than the diameter of the two primary sutures.

According to some embodiments, the diameter of the apertures is equal to or smaller than the combined diameters of the two primary sutures and the secondary suture.

According to some embodiments, the at least one primary suture tracks the curvature of the at least one cusp edge.

According to some embodiments, the primary suture comprises a multi-filament suture.

According to some embodiments, the secondary suture comprises an ultra-high-molecular-weight polyethylene.

According to some embodiments, the prosthetic valve is devoid of fabric strips and/or cloth between the cusp end portions of the leaflets and the strut sections and junctions they are attached to According to another aspect of the inventions, there is provided a method of assembling a prosthetic valve, the method comprises threading a primary suture in an in-and-out pattern through a cusp end portion of a leaflet. The method further comprises approximating the cusp end portion with the primary suture threaded there-through to at least one strut section of a frame of the prosthetic valve. The method further comprises stitching a secondary suture through the primary suture and around the at least one strut section, in a manner that forms a plurality of whip stitches wrapped around the strut section up to a final whip stitch.

The method further comprises forming a junction lock-knot extending from the final whip stitch around a junction at a respective end of the corresponding strut section, wherein the junction lock is configured to maintain tension on the plurality of whip stitches wrapped around the strut section leading to the junction first lateral section.

According to some embodiments, the step of forming a junction lock-knot comprises extending the secondary suture from the final whip stitch disposed at a first lateral side of the junction, over one axial side of the junction, in a direction toward a second lateral side of the junction, thereby forming a transition section of the junction lock-knot.

According to some embodiments, the step of forming a junction lock-knot further comprises extending the secondary suture from the transition section around a strut section extending from the second lateral side of the junction, thereby forming a first loop of the junction lock-knot.

According to some embodiments, the step of forming a junction lock-knot further comprises extending the secondary suture from the first loop, between the transition section and the junction, folding the secondary suture back over itself and passing it through the first loop, thereby forming a second loop of the junction lock-knot.

According to some embodiments, the step of forming a junction lock-knot further comprises forcibly pulling the tail of the second loop to tighten both the first loop and the second loop around the junction.

According to some embodiments, forming the transition section comprises extending the secondary suture in a diagonal direction from one radial side of the junction toward an opposite radial side of the junction, as well as from one lateral side of the junction to the opposite lateral side of the junction.

According to some embodiments, forming the plurality of whip stitches around any single strut section comprises forming a plurality of angled whip stitches oriented in the same direction around the length of the corresponding strut section.

According to some embodiments, stitching the secondary suture around the at least one strut section comprises stitching around at least two strut sections separated from each other by a mutual junction, such that all whip stitches around one of the strut sections are formed as angled whip stitches oriented in one direction, while all whip stitches around the other strut section are formed as angled whip stitched oriented in a second direction, opposite to the first direction.

According to some embodiments, the cusp end portion of each leaflet comprises a series of pre-formed apertures, and wherein the step of threading a primary suture comprises threading the primary suture in an in-and-out pattern through the series of pre-formed apertures.

According to another aspect of the invention, there is provided a prosthetic valve comprising a frame movable between a radially compressed configuration and a radially expanded configuration, and a leaflet assembly mounted within the frame and comprising a plurality of leaflets configured to regulate flow through the prosthetic valve. The frame comprises a plurality of strut sections intersecting at junctions. Each leaflet comprises a rounded cusp end portion defining a cusp edge, a free edge opposite to the cusp edge, and a pair of oppositely-directed tabs separating the cusp edge and the free edge.

Each cusp end portion is coupled to at least one strut section via at least one primary suture threaded therethrough in an in-and-out pattern, and a secondary suture forming a series of non-penetrating whip stitches spaced from each other along the length of the strut section. Each non-penetrating whip stitch comprises a strut-wrapping section looped around the strut section, and a primary-suture-wrapping section extending therefrom, looped around the primary suture and passing between the primary suture and the leaflet.

According to some embodiments, the primary suture defines a series of running stitch portions, wherein each primary-suture-wrapping section is looped around a corresponding running stitch portion and extends between the running stitch portion and the rounded cusp end portion.

According to some embodiments, the secondary suture does not penetrate through the leaflet.

According to some embodiments, the secondary suture does not penetrate through the primary suture.

According to some embodiments, the cusp end portion is further coupled to at least one junction at an end of the strut section via a junction lock-knot formed by the second suture. Each junction is defined between: two opposite axial sides comprising a junction proximal side and a junction distal side; two opposite radial sides comprising a junction inner side and a junction outer side; and two opposite lateral sides comprising a junction first lateral side and a junction second lateral side. Each junction lock-knot is configured to maintain tension on the plurality of the non-penetrating whip stitches wrapped around the corresponding strut section leading to the junction first lateral section.

According to some embodiments, each junction lock-knot comprises: (1) a transition section extending over one axial side of the junction, in a direction from the junction first lateral side to the junction second lateral side, (2) a first loop extending from the transition section and around a strut section extending from the junction second lateral side, and (3) a second loop extending from the first loop, between the transition section and the junction, and folded over itself to extend through the first loop.

According to some embodiments, the transition section extends in a diagonal direction from one radial side of the junction toward the opposite radial side of the junction, as well as from one lateral side of the junction to the opposite lateral side of the junction.

According to some embodiments, the transition section extends in a diagonal direction from one radial side of the junction toward the opposite radial side of the junction, as well as from one lateral side of the junction to the opposite lateral side of the junction.

According to some embodiments, both the first loop and the second loop are tightly tensioned around the junction.

According to some embodiments, each plurality of non-penetrating whip stitches wrapped around a single strut section are angled non-penetrating whip stitches, oriented in the same direction along the length of the corresponding strut section.

According to some embodiments, the cusp end portion is sutured to at least two strut sections extending from both lateral sides of a selected junction, via a plurality of non-penetrating whip stitches wrapped around each of the respective strut sections and a junction lock-knot around the junction positioned there-between, wherein the plurality of non-penetrating whip stitches around one of the strut sections are angled in a direction opposite to that of the plurality of the non-penetrating whip stitches wrapped around the other strut section.

According to some embodiments, the at least one primary suture comprises two primary sutures, which are inversely threaded in an in-and-out pattern.

According to some embodiments, the at least one primary suture tracks the curvature of the at least one cusp edge.

According to some embodiments, the primary suture comprises a multi-filament suture.

According to some embodiments, the secondary suture comprises an ultra-high-molecular-weight polyethylene.

According to some embodiments, the prosthetic valve is devoid of fabric strips and/or cloth between the cusp end portions of the leaflets and the strut sections they are attached to.

According to another aspect of the inventions, there is provided a method of assembling a prosthetic valve, the method comprises threading a primary suture in an in-and-out pattern through a cusp end portion of a leaflet. The method further comprises approximating the cusp end portion with the primary suture threaded there-through to at least one strut section of a frame of the prosthetic valve. The method further comprises looping a secondary suture around the at least one strut section and around the primary suture, in a manner that forms a plurality of non-penetrating whip stitches wrapped around the strut section up to a final non-penetrating whip stitch. Each non-penetrating whip stitch comprises a strut-wrapping section looped around the strut section and a primary-suture-wrapping section extending therefrom, passing between the primary suture and the leaflet and looped around the primary suture.

According to some embodiments, forming each non-penetration whip stitch comprises forming the strut-wrapping section by: extending the secondary suture across one radial side of the strut section, folding it over an axial side of the strut, and extending it backward across the opposite radial side of the strut.

According to some embodiments, forming each non-penetration whip stitch further comprises forming the primary-suture-wrapping section by: passing the secondary suture between a running stitch portion of the primary suture and the cusp end portion of the leaflet, and folding it over the running stitch portion.

According to some embodiments, forming each non-penetration whip stitch further comprises forming the primary-suture-wrapping section by: passing the secondary suture over a running stitch portion of the primary suture, and looping it back over the running stitch portion and between the running stitch portion and the cusp end portion of the leaflet.

According to some embodiments, the running stitch portion is an outer stitch portion of the primary suture.

According to some embodiments, the method further comprises a step of forming a junction lock-knot extending from the final non-penetrating whip stitch around a junction at a respective end of the corresponding strut section, wherein the junction lock is configured to maintain tension on the plurality of non-penetrating whip stitches wrapped around the strut section leading to the junction first lateral section.

According to some embodiments, the step of forming a junction lock-knot comprises extending the secondary suture from the final non-penetrating whip stitch disposed at a first lateral side of the junction, over one axial side of the junction, in a direction toward a second lateral side of the junction, thereby forming a transition section of the junction lock-knot.

According to some embodiments, the step of forming a junction lock-knot further comprises extending the secondary suture from the transition section around a strut section extending from the second lateral side of the junction, thereby forming a first loop of the junction lock-knot.

According to some embodiments, the step of forming a junction lock-knot further comprises extending the secondary suture from the first loop, between the transition section and the junction, folding the secondary suture back over itself and passing it through the first loop, thereby forming a second loop of the junction lock-knot.

According to some embodiments, the step of forming a junction lock-knot further comprises forcibly pulling the tail of the second loop to tighten both the first loop and the second loop around the junction.

According to some embodiments, forming the transition section comprises extending the secondary suture in a diagonal direction from one radial side of the junction toward an opposite radial side of the junction, as well as from one lateral side of the junction to the opposite lateral side of the junction.

According to some embodiments, forming the plurality of whip stitches around any single strut section comprises forming a plurality of angled whip stitches oriented in the same direction around the length of the corresponding strut section.

According to some embodiments, forming the plurality of whip stitches around the at least one strut section comprises forming a plurality of whip stitches around at least two strut sections separated from each other by a mutual junction, such that all whip stitches around one of the strut sections are formed as angled whip stitches oriented in one direction, while all whip stitches around the other strut section are formed as angled whip stitched oriented in a second direction, opposite to the first direction.

According to another aspect of the invention, there is provided a prosthetic valve comprising a frame, a leaflet assembly mounted within the frame, and a skirt disposed around the frame. The frame is movable between a radially compressed configuration and a radially expanded configuration, and comprises a plurality of strut sections intersecting at junctions. The leaflet assembly comprises a plurality of leaflets configured to regulate flow through the prosthetic valve. The skirt comprises a skirt proximal end and a skirt distal end.

Each junction is defined between: two opposite axial sides comprising a junction proximal side and a junction distal side; two opposite radial sides comprising a junction inner side and a junction outer side; and two opposite lateral sides comprising a junction first lateral side and a junction second lateral side.

The skirt proximal end is coupled to at least one strut section via at least one primary suture threaded at penetration points therethrough in an in-and-out pattern, and a secondary suture threaded through the primary suture and wrapped around the strut section in a series of whip stitches spaced from each other along the length of the strut section.

The skirt proximal end is further coupled to at least one junction at an end of the strut section via a junction lock-knot formed by the second suture, wherein the junction lock-knot is configured to maintain tension on the plurality of the whip stitches wrapped around the corresponding strut section leading to the junction first lateral section.

According to some embodiments, the skirt proximal end follows a zig-zag pattern.

According to some embodiments, the at least one primary suture tracks the zig-zag pattern of the skirt proximal end.

According to some embodiments, each junction lock-knot comprises: (1) a transition section extending over one axial side of the junction, in a direction from the junction first lateral side to the junction second lateral side, (2) a first loop extending from the transition section and around a strut section extending from the junction second lateral side, and (3) a second loop extending from the first loop, between the transition section and the junction, and folded over itself to extend through the first loop.

According to some embodiments, the transition section extends in a diagonal direction from one radial side of the junction toward the opposite radial side of the junction, as well as from one lateral side of the junction to the opposite lateral side of the junction.

According to some embodiments, both the first loop and the second loop are tightly tensioned around the junction.

According to some embodiments, each plurality of whip stitches wrapped around a single strut section are angled whip stitches, oriented in the same direction along the length of the corresponding strut section.

According to some embodiments, the skirt proximal end is sutured to at least two strut sections extending from both lateral sides of a selected junction, via a plurality of whip stitches wrapped around each of the respective strut sections and a junction lock-knot around the junction positioned there-between, wherein the plurality of whip stitches around one of the strut sections are angled in a direction opposite to that of the plurality of the whip stitches wrapped around the other strut section.

According to some embodiments, the skirt distal end is coupled to at least one strut section at an inflow end portion of the valve via at least one additional primary suture threaded at penetration points therethrough in an in-and-out pattern, and an additional secondary suture threaded through the primary suture and wrapped around the strut section at the inflow end portion in a series of whip stitches spaced from each other along the length of the strut section, wherein the skirt distal end is further coupled to at least one junction at an end of the strut section at the inflow end portion via an additional junction lock-knot.

According to some embodiments, the additional primary suture tracks the shape of the strut sections disposed around the inflow end portion.

According to some embodiments, the diameter of the secondary suture is smaller than the diameter of the primary suture.

According to some embodiments, a secondary to primary sutures diameter ratio is equal to or smaller than 0.8.

According to some embodiments, a secondary to primary sutures diameter ratio is equal to or smaller than 0.5.

According to some embodiments, a secondary to primary sutures diameter ratio is equal to or smaller than 0.3.

According to some embodiments, the skirt proximal end comprises a series of pre-formed apertures.

According to some embodiments, the apertures are dimensioned to accept the at least one primary suture, thereby serving as the penetration points.

According to some embodiments, the apertures are equally spaced from each other.

According to some embodiments, the diameter of the apertures is equal to or smaller than the diameter of the primary suture.

According to some embodiments, the diameter of the apertures is equal to or smaller than the combined diameters of the primary suture and the secondary suture.

According to some embodiments, the at least one primary suture comprises two primary sutures, which are inversely threaded in an in-and-out pattern, through the same penetration points.

According to some embodiments, the diameter of the apertures is equal to or smaller than the diameter of the two primary sutures.

According to some embodiments, the diameter of the apertures is equal to or smaller than the combined diameters of the two primary sutures and the secondary suture.

According to some embodiments, the primary suture comprises a multi-filament suture.

According to some embodiments, the secondary suture comprises an ultra-high-molecular-weight polyethylene.

According to some embodiments, the skirt is an outer skirt, disposed around an outer surface of the frame.

According to another aspect of the inventions, there is provided a method of assembling a prosthetic valve, the method comprises threading a primary suture in an in-and-out pattern through a skirt proximal end of a skirt. The method further comprises approximating the skirt proximal end with the primary suture threaded there-through to at least one strut section of a frame of the prosthetic valve. The method further comprises stitching a secondary suture through the primary suture and around the at least one strut section, in a manner that forms a plurality of whip stitches wrapped around the strut section up to a final whip stitch. The method further comprises forming a junction lock-knot extending from the final whip stitch around a junction at a respective end of the corresponding strut section, wherein the junction lock-knot is configured to maintain tension on the plurality of whip stitches wrapped around the strut section leading to the junction first lateral section.

According to some embodiments, the step of forming a junction lock-knot comprises extending the secondary suture from the final whip stitch disposed at a first lateral side of the junction, over one axial side of the junction, in a direction toward a second lateral side of the junction, thereby forming a transition section of the junction lock-knot.

According to some embodiments, the step of forming a junction lock-knot further comprises extending the secondary suture from the transition section around a strut section extending from the second lateral side of the junction, thereby forming a first loop of the junction lock-knot.

According to some embodiments, the step of forming a junction lock-knot further comprises extending the secondary suture from the first loop, between the transition section and the junction, folding the secondary suture back over itself and passing it through the first loop, thereby forming a second loop of the junction lock-knot.

According to some embodiments, the step of forming a junction lock-knot further comprises forcibly pulling the tail of the second loop to tighten both the first loop and the second loop around the junction.

According to some embodiments, forming the transition section comprises extending the secondary suture in a diagonal direction from one radial side of the junction toward an opposite radial side of the junction, as well as from one lateral side of the junction to the opposite lateral side of the junction.

According to some embodiments, forming the plurality of whip stitches around any single strut section comprises forming a plurality of angled whip stitches oriented in the same direction around the length of the corresponding strut section.

According to some embodiments, stitching the secondary suture around the at least one strut section comprises stitching around at least two strut sections separated from each other by a mutual junction, such that all whip stitches around one of the strut sections are formed as angled whip stitches oriented in one direction, while all whip stitches around the other strut section are formed as angled whip stitched oriented in a second direction, opposite to the first direction.

According to some embodiments, the skirt proximal end comprises a series of pre-formed apertures, and wherein the step of threading a primary suture comprises threading the primary suture in an in-and-out pattern through the series of pre-formed apertures.

According to some embodiments, the skirt is an outer skirt, disposed around an outer surface of the frame.

According to another aspect of the invention, there is provided a prosthetic valve comprising a frame, a leaflet assembly mounted within the frame, and a skirt disposed around the frame. The frame is movable between a radially compressed configuration and a radially expanded configuration, and comprises a plurality of strut sections intersecting at junctions. The leaflet assembly comprises a plurality of leaflets configured to regulate flow through the prosthetic valve. The skirt comprises a skirt proximal end and a skirt distal end.

The skirt proximal end is coupled to at least one strut section via at least one primary suture threaded therethrough in an in-and-out pattern, and a secondary suture forming a series of non-penetrating whip stitches spaced from each other along the length of the strut section, each non-penetrating whip stitch comprising a strut-wrapping section looped around the strut section and a primary-suture-wrapping section extending therefrom, looped around the primary suture and passing between the primary suture and the leaflet.

According to some embodiments, the skirt proximal end follows a zig-zag pattern.

According to some embodiments, the at least one primary suture tracks the zig-zag pattern of the skirt proximal end.

According to some embodiments, the primary suture defines a series of running stitch portions, wherein each primary-suture-wrapping section is looped around a corresponding running stitch portion and extends between the running stitch portion and the skirt proximal end.

According to some embodiments, the secondary suture does not penetrate through the skirt.

According to some embodiments, the secondary suture does not penetrate through the primary suture.

According to some embodiments, each junction is defined between: two opposite axial sides comprising a junction proximal side and a junction distal side; two opposite radial sides comprising a junction inner side and a junction outer side; and two opposite lateral sides comprising a junction first lateral side and a junction second lateral side. The skirt proximal end is further coupled to at least one junction at an end of the strut section via a junction lock-knot formed by the second suture, and wherein the junction lock-knot is configured to maintain tension on the plurality of the non-penetrating whip stitches wrapped around the corresponding strut section leading to the junction first lateral section.

According to some embodiments, each junction lock-knot comprises: (1) a transition section extending over one axial side of the junction, in a direction from the junction first lateral side to the junction second lateral side, (2) a first loop extending from the transition section and around a strut section extending from the junction second lateral side, and (3) a second loop extending from the first loop, between the transition section and the junction, and folded over itself to extend through the first loop.

According to some embodiments, the transition section extends in a diagonal direction from one radial side of the junction toward the opposite radial side of the junction, as well as from one lateral side of the junction to the opposite lateral side of the junction.

According to some embodiments, both the first loop and the second loop are tightly tensioned around the junction.

According to some embodiments, each plurality of whip stitches wrapped around a single strut section are angled whip stitches, oriented in the same direction along the length of the corresponding strut section.

According to some embodiments, the skirt proximal end is sutured to at least two strut sections extending from both lateral sides of a selected junction, via a plurality of non-penetrating whip stitches wrapped around each of the respective strut sections and a junction lock-knot around the junction positioned there-between, wherein the plurality of non-penetrating whip stitches around one of the strut sections are angled in a direction opposite to that of the plurality of the non-penetrating whip stitches wrapped around the other strut section.

According to some embodiments, the skirt distal end is coupled to at least one strut section at an inflow end portion of the valve via at least one additional primary suture threaded at penetration points therethrough in an in-and-out pattern, and an additional secondary suture threaded through the primary suture and wrapped around the strut section at the inflow end portion in a series of whip stitches spaced from each other along the length of the strut section, wherein the skirt distal end is further coupled to at least one junction at an end of the strut section at the inflow end portion via an additional junction lock-knot According to some embodiments, the additional primary suture tracks the shape of the strut sections disposed around the inflow end portion.

According to some embodiments, the primary suture comprises a multi-filament suture.

According to some embodiments, the secondary suture comprises an ultra-high-molecular-weight polyethylene.

According to some embodiments, the skirt is an outer skirt, disposed around an outer surface of the frame.

According to another aspect of the inventions, there is provided a method of assembling a prosthetic valve, the method comprises threading a primary suture in an in-and-out pattern through a skirt proximal end of a skirt. The method further comprises approximating the skirt proximal end with the primary suture threaded there-through to at least one strut section of a frame of the prosthetic valve. The method further comprises looping a secondary suture around the at least one strut section and around the primary suture, in a manner that forms a plurality of non-penetrating whip stitches wrapped around the strut section up to a final non-penetrating whip stitch, each non-penetrating whip stitch comprising a strut-wrapping section looped around the strut section and a primary-suture-wrapping section extending therefrom, passing between the primary suture and the skirt proximal end around the primary suture.

According to some embodiments, forming each non-penetration whip stitch comprises forming the strut-wrapping section by: extending the secondary suture across one radial side of the strut section, folding it over an axial side of the strut section, and extending it backward across the opposite radial side of the strut section.

According to some embodiments, forming each non-penetration whip stitch further comprises forming the primary-suture-wrapping section by: passing the secondary suture between a running stitch portion of the primary suture and the skirt proximal end, and folding it over the running stitch portion.

According to some embodiments, forming each non-penetration whip stitch further comprises forming the primary-suture-wrapping section by: passing the secondary suture over a running stitch portion of the primary suture, and looping it back over the running stitch portion and between the running stitch portion and the skirt proximal end.

According to some embodiments, the skirt is an outer skirt and the running stitch portion is an inner stitch portion of the primary suture.

According to some embodiments, the method further comprises a step of forming a junction lock-knot extending from the final non-penetrating whip stitch around a junction at a respective end of the corresponding strut section, wherein the junction lock-knot is configured to maintain tension on the plurality of non-penetrating whip stitches wrapped around the strut section leading to the junction first lateral section.

According to some embodiments, the step of forming a junction lock-knot comprises extending the secondary suture from the final non-penetrating whip stitch disposed at a first lateral side of the junction, over one axial side of the junction, in a direction toward a second lateral side of the junction, thereby forming a transition section of the junction lock-knot.

According to some embodiments, the step of forming a junction lock-knot further comprises extending the secondary suture from the transition section around a strut section extending from the second lateral side of the junction, thereby forming a first loop of the junction lock-knot.

According to some embodiments, the step of forming a junction lock-knot further comprises extending the secondary suture from the first loop, between the transition section and the junction, folding the secondary suture back over itself and passing it through the first loop, thereby forming a second loop of the junction lock-knot.

According to some embodiments, the step of forming a junction lock-knot further comprises forcibly pulling the tail of the second loop to tighten both the first loop and the second loop around the junction.

According to some embodiments, forming the transition section comprises extending the secondary suture in a diagonal direction from one radial side of the junction toward an opposite radial side of the junction, as well as from one lateral side of the junction to the opposite lateral side of the junction.

According to some embodiments, forming the plurality of whip stitches around any single strut section comprises forming a plurality of angled whip stitches oriented in the same direction around the length of the corresponding strut section.

According to some embodiments, forming the plurality of whip stitches around the at least one strut section comprises forming a plurality of whip stitches around at least two strut sections separated from each other by a mutual junction, such that all whip stitches around one of the strut sections are formed as angled whip stitches oriented in one direction, while all whip stitches around the other strut section are formed as angled whip stitched oriented in a second direction, opposite to the first direction.

Certain embodiments of the present invention may include some, all, or none of the above advantages. Further advantages may be readily apparent to those skilled in the art from the figures, descriptions, and claims included herein. Aspects and embodiments of the invention are further described in the specification herein below and in the appended claims.

Unless otherwise defined, all technical and scientific terms used herein have the same meaning as commonly understood by one of ordinary skill in the art to which this invention pertains. In case of conflict, the patent specification, including definitions, governs. As used herein, the indefinite articles "a" and "an" mean "at least one" or "one or more" unless the context clearly dictates otherwise.

The following embodiments and aspects thereof are described and illustrated in conjunction with systems, tools and methods which are meant to be exemplary and illustrative, but not limiting in scope. In various embodiments, one or more of the above-described problems have been reduced or eliminated, while other embodiments are directed to other advantages or improvements.

BRIEF DESCRIPTION OF THE FIGURES

Some embodiments of the invention are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the invention. For the sake of clarity, some objects depicted in the figures are not to scale.

In the Figures:

FIGS. 11A-11D shows various stages of another exemplary technique for coupling a leaflet along its cusp end portion to strut sections and junctions of a frame, according to some embodiments.

FIG. 13 shows another exemplary stitching configuration.

FIG. 14 shows yet another exemplary stitching configuration.

DETAILED DESCRIPTION OF SOME EMBODIMENTS

In the following description, various aspects of the disclosure will be described. For the purpose of explanation, specific configurations and details are set forth in order to provide a thorough understanding of the different aspects of the disclosure. However, it will also be apparent to one skilled in the art that the disclosure may be practiced without specific details being presented herein. Furthermore, well-known features may be omitted or simplified in order not to obscure the disclosure. In order to avoid undue clutter from having too many reference numbers and lead lines on a particular drawing, some components will be introduced via one or more drawings and not explicitly identified in every subsequent drawing that contains that component.

Figure 1A:
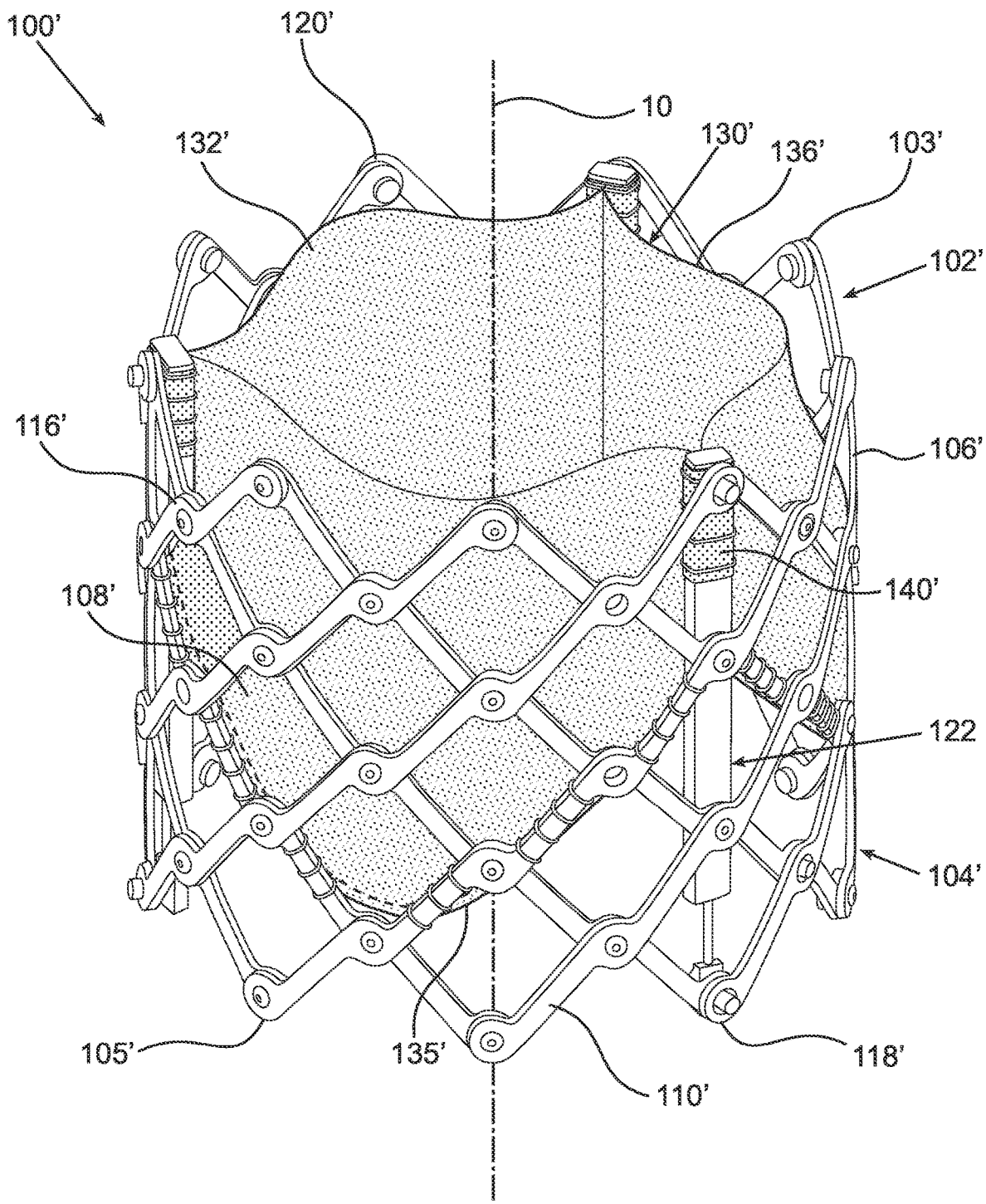
FIG. 1A. shows a view in perspective of a mechanically expandable prosthetic valve, according to some embodiments.
Figure 1B:
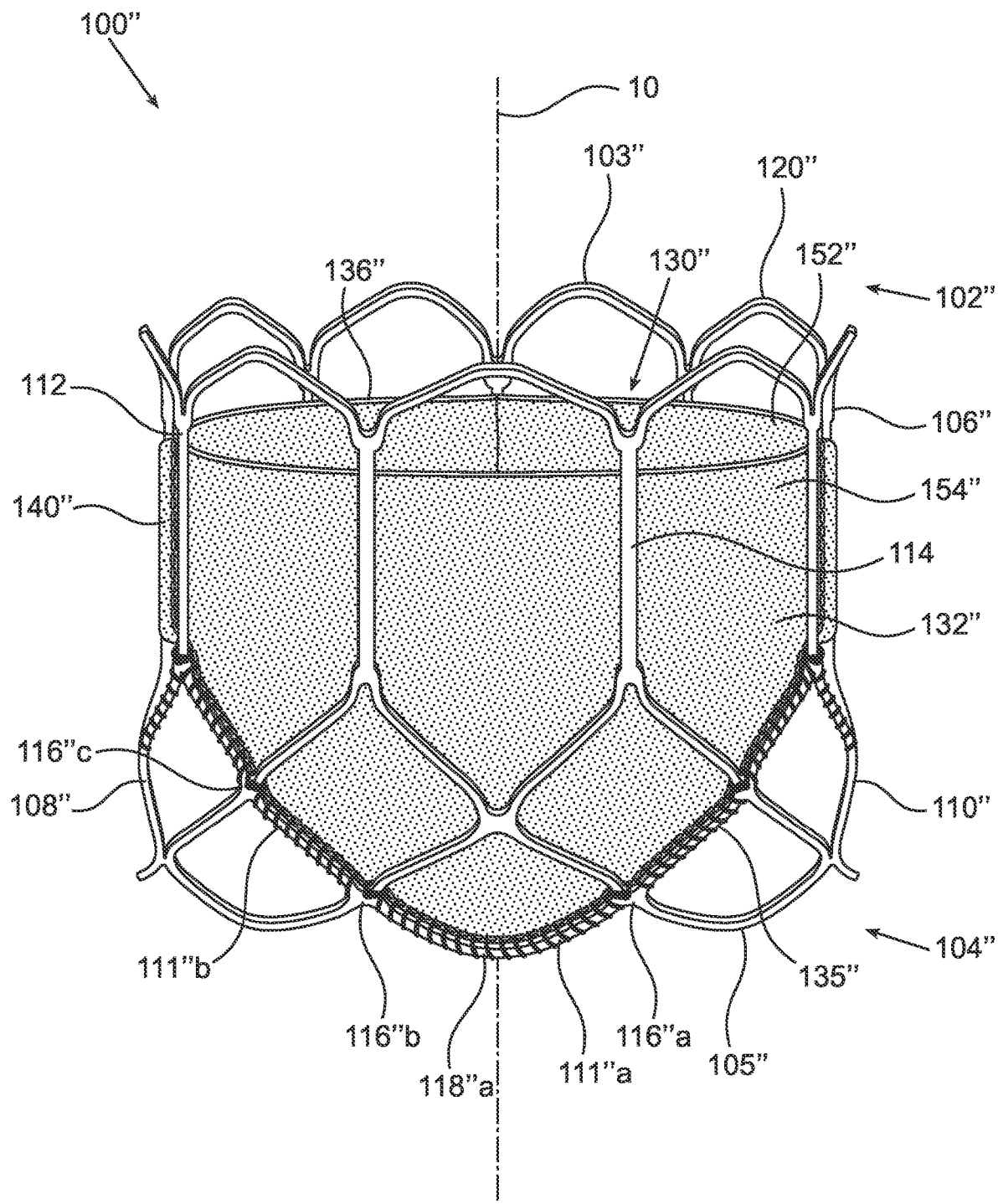
FIG. 1B. shows a view in perspective of a balloon expandable prosthetic valve, according to some embodiments.

FIGS. 1A and 1B show perspective views of two exemplary types of a prosthetic valve 100, according to some embodiments. It will be appreciated that reference numerals with prime marks (') or double prime marks (") are used throughout FIGS. 1A-1B to denote different embodiments of the same elements. Embodiments of the disclosed devices and systems may include any combination of different embodiments of the same elements. Specifically, any reference to an element without single or double prime marks may refer to any alternative embodiment of the same element denoted with a single prime mark or double prime marks.

The prosthetic valve 100 is deliverable to a patient's target site over a catheter (not shown), and is radially expandable and compressible between a radially compressed, or crimped, configuration, and a radially expanded configuration—shown in FIGS. 1A-1B. The expanded configuration may include a range of diameters to which the valve 100 may expand, between the compressed configuration and a maximal diameter reached at a fully expanded configuration. Thus, a plurality of partially expanded configurations may relate to any expansion diameter between radially compressed or crimped configuration, and maximally expanded configuration. A prosthetic valve 100 of the current disclosure may include any prosthetic valve configured to be mounted within the native aortic valve, the native mitral valve, the native pulmonary valve, and the native tricuspid valve.

The term "plurality", as used herein, means more than one.

As stated above, a prosthetic valve 100 can be delivered to the site of implantation via a delivery assembly carrying the valve 100 in a radially compressed or crimped configuration, toward the target site, to be mounted against the native anatomy, by expanding the valve 100 via various expansion mechanisms. FIG. 1A shows an exemplary mechanically expandable valve 100', wherein all reference numerals with prime marks (') shown in FIG. 1A refer to like elements comprised within a mechanically expandable valve. Mechanically expandable valves are a category of prosthetic valves that rely on a mechanical actuation mechanism for expansion. The mechanical actuation mechanism usually includes a plurality of actuator assemblies, releasably coupled to respective actuation arm assemblies of the delivery apparatus, controlled via a handle of the delivery apparatus for actuating the actuator assemblies to expand the prosthetic valve to a desired diameter.

FIG. 1B shows an exemplary balloon expandable valve 100", wherein all reference numerals with double prime marks (") shown in FIG. 1B refer to like elements comprised within a balloon expandable valve. Balloon expandable valves generally involve a procedure of inflating a balloon within a prosthetic valve, thereby expanding the prosthetic valve 100 within the desired implantation site. Once the valve is sufficiently expanded, the balloon is deflated and retrieved along with the delivery apparatus. While mechanically expandable valves 100' and balloon expandable valves 100" are described and illustrated in conjunction with FIGS. 1A-1B, it will be clear that a prosthetic valve 100 may include other expansion mechanisms, such as self-expandable valves. Self-expandable valves include a frame that is shape-set to automatically expand as soon as an outer retaining structure, such as a capsule or a portion of a shaft (not shown), is withdrawn proximally relative to the prosthetic valve.

A prosthetic valve 100 can comprise an inflow end portion 104 defining an inflow end 105, and an outflow end portion 102 defining an outflow end 103. The prosthetic valve 100 can define a valve longitudinal axis 10 extending through the inflow end portion 104 and the outflow end portion 102. In some instances, the outflow end 103 is the proximal end of the prosthetic valve 100, and the inflow end 105 is the distal end of the prosthetic valve 100. Alternatively, depending for example on the delivery approach of the valve, the outflow end can be the proximal end of the prosthetic valve, and the inflow end can be the distal end of the prosthetic valve.

The term "proximal", as used herein, generally refers to a position, direction, or portion of any device or a component of a device, which is closer to the user and further away from the implantation site.

The term "distal", as used herein, generally refers to a position, direction, or portion of any device or a component of a device, which is further away from the user and closer to the implantation site.

The term "outflow", as used herein, refers to a region of the prosthetic valve through which the blood flows through and out of the valve 100, for example between the valve longitudinal axis 10 and the outflow end 103.

The term "inflow", as used herein, refers to a region of the prosthetic valve through which the blood flows into the valve 100, for example between inflow end 105 and the valve longitudinal axis 10.

The valve 100 comprises an annular frame 106 movable between a radially compressed configuration and a radially expanded configuration, and a leaflet assembly 130 mounted within the frame 106. The frame 106 can be made of various suitable materials, including plastically-deformable materials such as, but not limited to, stainless steel, a nickel based alloy (e.g., a cobalt-chromium or a nickel-cobalt-chromium alloy such as MP35N alloy), polymers, or combinations thereof. When constructed of a plastically-deformable materials, the frame 106, such as frame 106" (and thus the balloon expandable valve 100") can be crimped to a radially compressed configuration on a delivery shaft (not shown), and then expanded inside a patient by an inflatable balloon or equivalent expansion mechanism. Alternatively or additionally, the frame 106" can be made of shape-memory materials such as, but not limited to, nickel titanium alloy (e.g., Nitinol). When constructed of a shape-memory material, the frame 106, such as frame 106' (and thus the mechanically expandable valve 100') can be crimped to a radially compressed configuration and restrained in the compressed configuration by insertion into a shaft or equivalent mechanism of a delivery apparatus (not shown).

In the examples illustrated in FIGS. 1A-1B, the frame 106 is an annular, stent-like structure comprising a plurality of intersecting struts 110. In this application, the term "strut" encompasses vertical struts, angled struts, attachment posts, commissure windows, and any similar structures described by U.S. Pat. Nos. 7,993,394 and 9,393,110, which are incorporated herein by reference. A strut 110 may be any elongated member or portion of the frame 106. The frame 106 can have one or more multiple rows of cells 108 defined by intersecting struts 110. The frame 106 can have a cylindrical or substantially cylindrical shape having a constant diameter from an inflow end 105 to an outflow end 103 of the frame as shown, or the frame can vary in diameter along the height of the frame, as disclosed in U.S. Pat. No. 9,155,619, which is incorporated herein by reference.

The end portions of the struts 110 are forming apices 120 at the outflow end 103 and apices 118 at the inflow end 105. The struts 110 can intersect at additional non-apical junctions 116 formed between the outflow apices 120 and the inflow apices 118. The non-apical junctions 116 can be equally or unequally spaced apart from each other, and/or from the apices 120, 118, between the outflow end 103 and the inflow end 105.

According to some embodiments, the struts 110 are arranged in a lattice-type pattern. In the exemplary embodiments illustrated in FIG. 1A, the struts 110' are positioned diagonally, or offset at an angle relative to, and radially offset from, the valve longitudinal axis 10, when the valve 100' is in an expanded position. It will be clear that the struts 110' can be offset by other angles than those shown in FIG. 1B, such as being oriented substantially parallel to the valve longitudinal axis 10.

According to some embodiments, the struts 110' are pivotably coupled to each other. Frame 106' may comprise openings or apertures at the regions of inflow apices 118', outflow apices 120' and non-apical junctions 116' of the struts 110'. Respective hinges can be included at locations where the apertures of struts 110' overlap each other, via fasteners, such as rivets or pins, which extend through the apertures. The hinges can allow the struts 110' to pivot relative to one another as the frame 106' is radially expanded or compressed.

According to some embodiments, the struts 110 include a plurality of angled struts and vertical struts. In the exemplary embodiments illustrated in FIG. 1B, the frame 106" comprises a plurality of angled struts 110", and axially extending struts 114. In such embodiments, the struts are not necessarily coupled to each other via respective hinges, but are otherwise pivotable or bendable relative to each other, so as to permit frame expansion or compression. For example, the frame 106" can be formed from a single piece of material, such as a metal tube, via various processes such as, but not limited to, laser cutting, electroforming, and/or physical vapor deposition, while retaining the ability to collapse/expand radially in the absence of hinges and like.

The leaflet assembly 130 comprises a plurality of leaflets 132 (e.g., three leaflets), positioned at least partially within the frame 106, and configured to regulate flow of blood through the prosthetic valve 100 from the inflow end 105 to the outflow end 103. While three leaflets 132 arranged to collapse in a tricuspid arrangement, are shown in the exemplary embodiment illustrated in FIGS. 1A-1B, it will be clear that a prosthetic valve 100 can include any other number of leaflets 132. The leaflets 132 are made of a flexible material, derived from biological materials (e.g., bovine pericardium or pericardium from other sources), bio-compatible synthetic materials, or other suitable materials as known in the art and described, for example, in U.S. Pat. Nos. 6,730,118, 6,767,362 and 6,908,481, which are incorporated by reference herein.

Figure 2:
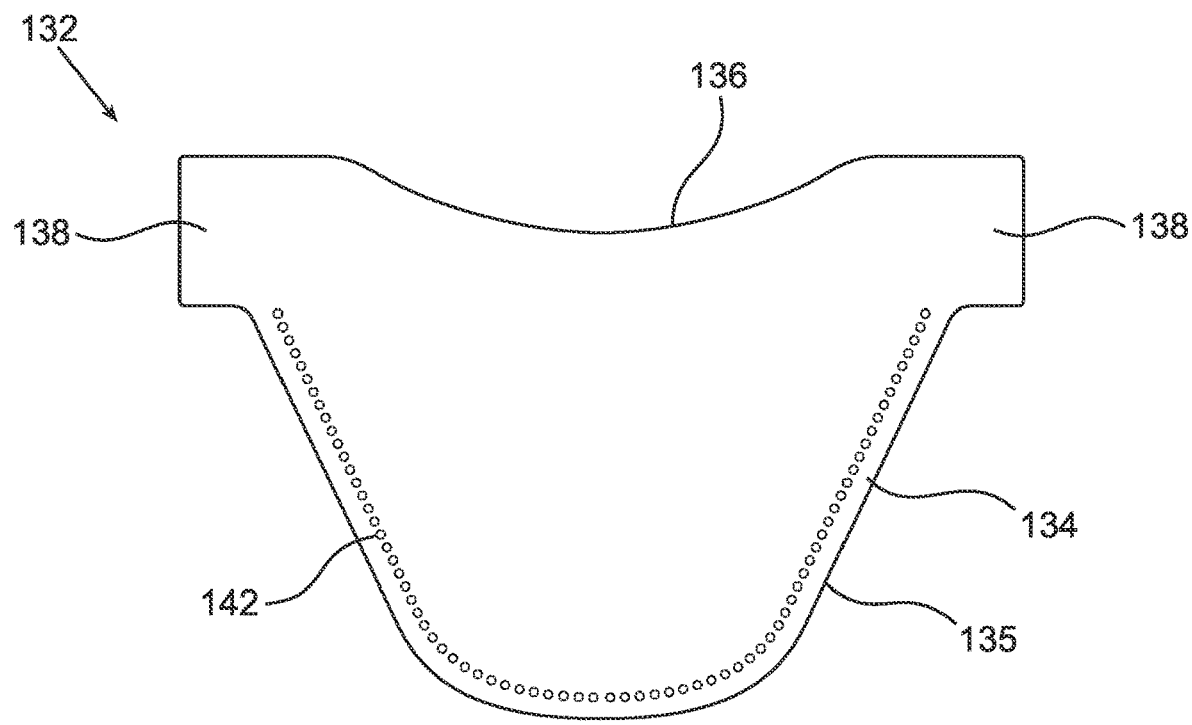
FIG. 2 shows a single leaflet, according to some embodiments.
Figure 3:
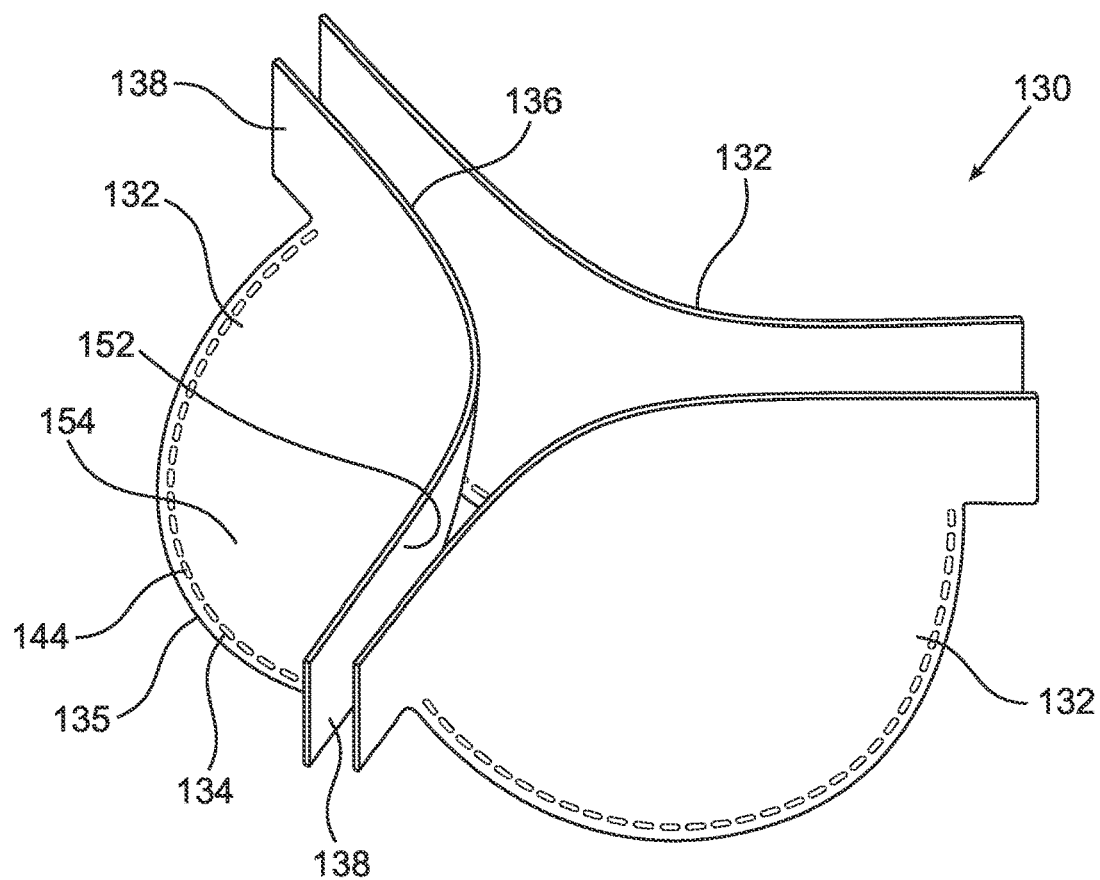
FIG. 3 shows a leaflet assembly defined by three leaflets, prior to assembly, according to some embodiments.

FIG. 2 shows a single representative leaflet 132, and FIG. 3 shows three separated leaflets prior to attachment to the frame 106 and to each other, collectively defining the leaflet assembly 130, according to some embodiments. Each leaflet 132 has a rounded cusp end portion 134 defining a cusp edge 135 opposite a free edge 136, and a pair of generally oppositely-directed tabs 138 separating the cusp edge 135 and the free edge 136. The cusp edge 135 forms a single scallop. The leaflet 132 further comprises an inner surface 152, defined as the surface facing the valve longitudinal axis 10, and an outer surface 154, opposite thereto so as to face the frame 106.

When the leaflets 132 are coupled to the frame and to each other, the lower edge of the resulting leaflet assembly 130 desirably has an undulating, curved scalloped shape. By forming the leaflets with this scalloped geometry, stresses on the leaflets 132 are reduced which, in turn, improves durability of the valve. Moreover, by virtue of the scalloped shape, folds and ripples at the belly of each leaflet, which can cause early calcification in those areas, can be eliminated or at least minimized. The scalloped geometry also reduces the amount of tissue material used to form the leaflet structure, thereby allowing a smaller, more even crimped profile at the inflow end of the valve.

The leaflets 132 define a non-planar coaptation plane (not annotated) when their free edges 136 co-apt with each other to seal blood flow through the prosthetic valve 100. Leaflets 132 can be secured to one another at their tabs 138 to form commissures 140 of the leaflet assembly 130, which can be secured, directly or indirectly, to structural elements connected to the frame 106 or embedded therein, such as commissure posts. When secured to two other leaflets 132 to form leaflet assembly 130, the cusp edges 135 of the leaflets 132 collectively form the scalloped shaped lower edge portion of the leaflet structure 130.

According to some embodiments, a mechanically expandable valve 100' comprises a plurality of actuator assemblies 122, configured to facilitate expansion of the valve 100', and in some instances, to lock the valve at an expanded configuration, preventing unintentional recompression thereof. Although FIG. 1A illustrates three actuator assemblies 122, mounted to, and equally spaced, around an inner surface of the frame 106', it should be clear that a different number of actuator assemblies 122 may be utilized, that the actuator assemblies 122 can be mounted to the frame 106' around its outer surface, and that the circumferential spacing between actuator assemblies 122 can be unequal. In some cases, as further illustrated in FIG. 1B, the actuator assemblies 122 can further serve as commissure posts, to which commissures 140 of the leaflet assembly 130 can be coupled. Details regarding the structure and operation of mechanically expandable valves and delivery system thereof are described in U.S. Pat. No. 9,827,093, U.S. Patent Application Publication Nos. 2019/0060057, 2018/0153689 and 2018/0344456, and US Patent Application Nos. 62/870,372 and 62/776,348, all of which are incorporated herein by reference.

According to some embodiments, such as the exemplary embodiment illustrated in FIG. 1B, the upper row of cells comprises a plurality of axially extending window frame portions 112 (which define commissure windows) and a plurality of axially extending struts 114. Each axial strut 114 and each window frame portion 112 extends from a junction 116" defined by the convergence of the lower ends of two angled struts 110" to another junction 116" defined by the convergence of the upper ends of two angled struts 110". Each commissure window frame portion 112 mounts a respective commissure 140 of the leaflet structure 130.

Additional frame configurations may include commissure posts attached to the frame, configured to accept commissures 140 extending either through window portions defined therein, or supporting commissure attachment thereto in various other manners. Alternatively, some of the cells 108 may be configured to receive commissures 140 attached thereto. For example, the uppermost row of cells 108 can be configured to receive tabs 138 of the leaflets 132. Further details regarding prosthetic valves, including the manner in which commissures may be mounted to their frames, are described in U.S. Pat. Nos. 6,730,118, 7,393,360, 7,510,575, 7,993,394, 8,252,202, and 9,393,110; U.S. Publication Nos. 2018/0325665, 2019/0105153, U.S. Application Nos. 62/869,948 and 62/813,643; and PCT Application No. PCT/US2019/61392, all of which documents are incorporated herein by reference. Any of the techniques and mechanisms disclosed in the prior documents can be used to connect the commissures 140, directly or indirectly, to the frame 106.

According to some embodiments, the prosthetic valve 100 can further comprise a skirt 123, such as an outer skirt 124 (shown for example in FIGS. 15 and 17) mounted on the outer surface of the frame 106, configure to function, for example, as a sealing member retained between the frame 106 and the surrounding tissue of the native annulus against which the prosthetic valve 100 is mounted, thereby reducing risk of paravalvular leakage past the prosthetic valve 100. Such an outer skirt can be made of various suitable biocompatible materials, such as, but not limited to, various synthetic materials (e.g., PET) or natural tissue (e.g. pericardial tissue).

Figure 4:
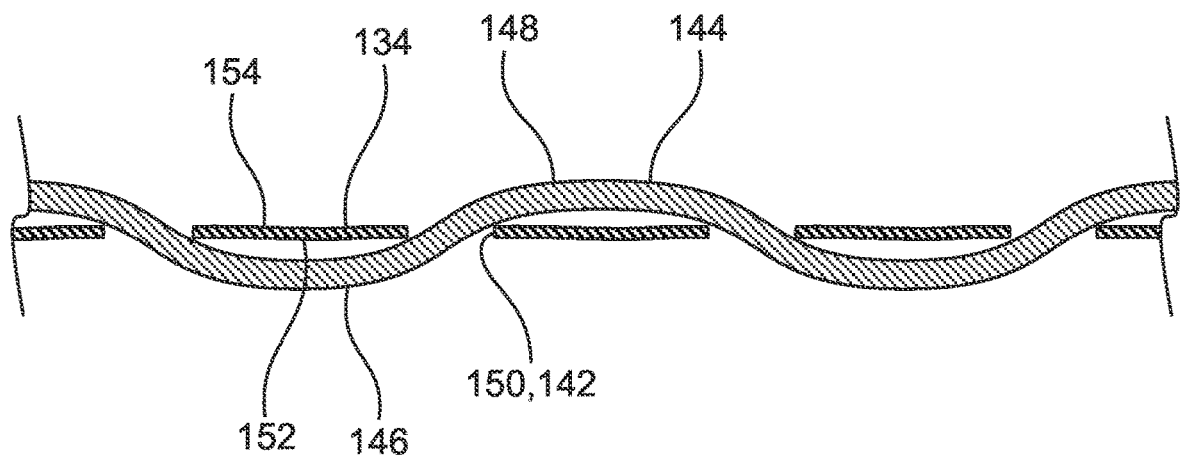
FIG. 4 shows an enlarged sectional view through a cusp end portion of a leaflet, with a primary suture threaded there-through in an in-and-out pattern, according to some embodiments.

According to some embodiments, a primary suture 144 is threaded through the cusp end portion 134 in an in-and-out pattern, also known in the art as a running stitch pattern. FIG. 3 shows primary sutures 144 stitched along the cusp end portions 134 of the leaflets 132. FIG. 4 shows an enlarged sectional view through a cusp end portion 134 and the primary suture 144 threaded there-through. As shown, the running stitch extends through penetration points 150 in an in-and-out pattern along the cusp end portion 134, thereby defining a plurality of running stitch portions that include a plurality of inner stitch portions 146 disposed along the leaflet inner surface 152, and a plurality of outer stitch portions 148 disposed along the leaflet outer surface 154, wherein each inner stitch portion 146 and each outer stitch portion 148 is defined between a couple of consecutive penetration points 150. Optionally, but in some embodiments preferably, the primary suture 144 tracks the curvature of the cusp edge 135, meaning that the primary suture 144 runs along or is generally parallel, with the cusp edge 135.

Figure 5A:
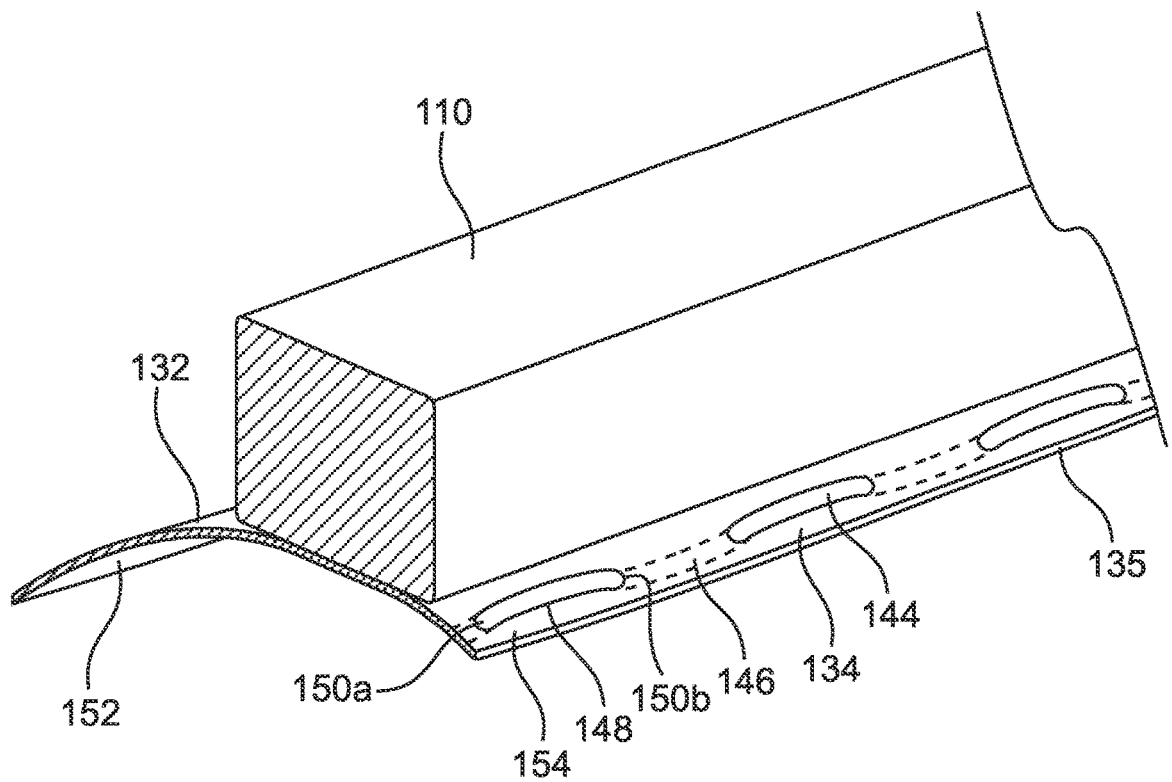
FIGS. 5A-5E shows various stages of an exemplary technique for coupling a leaflet along its cusp end portion to struts of a frame, according to some embodiments.

With particular reference to FIGS. 5A-5E, an exemplary technique for coupling a leaflet 132 along its cusp end portion 134 to at least one section of at least one strut 110 of a frame 106 will now be discussed in accordance with the present teachings. As shown in FIG. 5A, the cusp end portion 134, with the primary suture threaded there-through in an in-and-out pattern, is approximated to a strut 110, such that the cusp end portion 134 is preferably positioned radially inward (and optionally in contact with) the inner side of the strut 110. According to some embodiments, a secondary suture 156 is stitched through the primary suture 144 and around at least one section of at least one strut 110, wherein the secondary suture 156 comprises a plurality of self-tightening constructs 158. Each self-tightening construct 158 includes at least one loop configured to constrict under tension around the strut 110.

While the strut 110 is shown to have a rectangular cross-section in FIGS. 5A-5E, it will be clear that this is merely for illustrative purpose, and that the cross-section of a strut 110 can have a rounded, circular, having a polygonal shape, have an irregular shape, or have a shape that changes along the length of the strut. The cross-sections of the struts can also remain the same shape, but change size along the length of the strut.

Figure 5B:
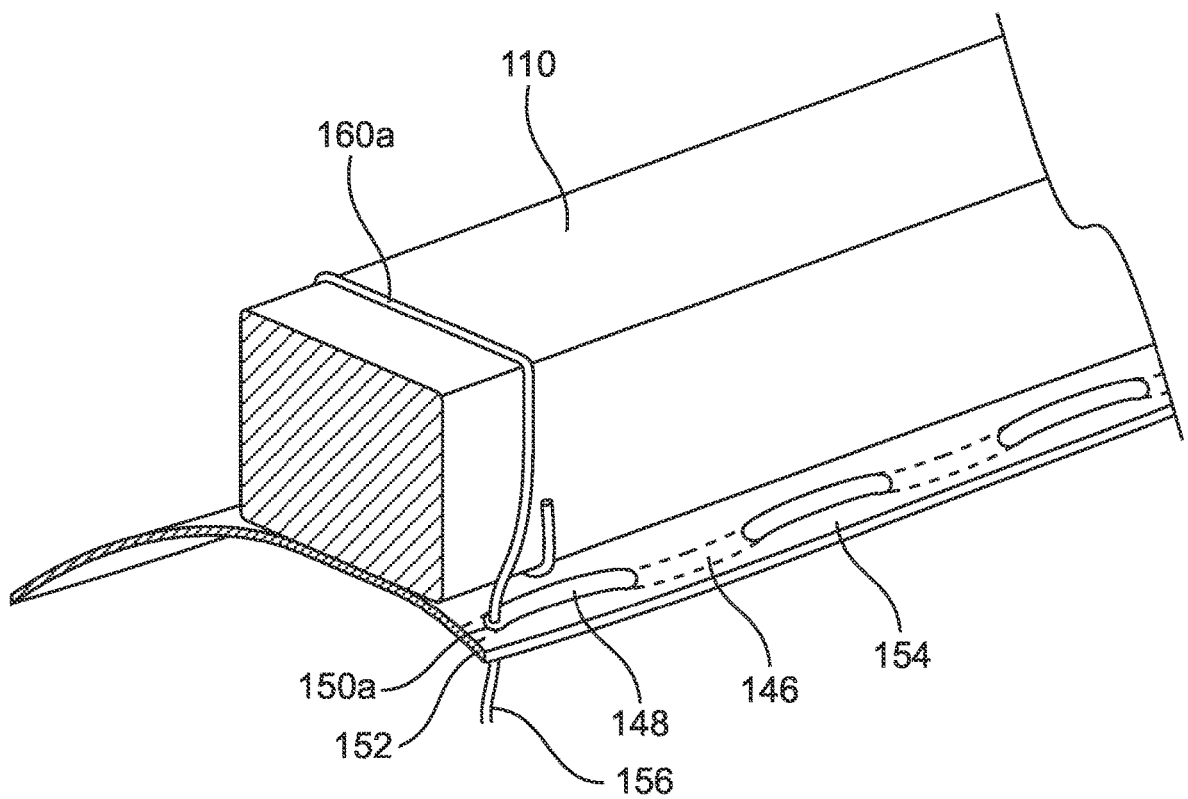
Figure 5C:
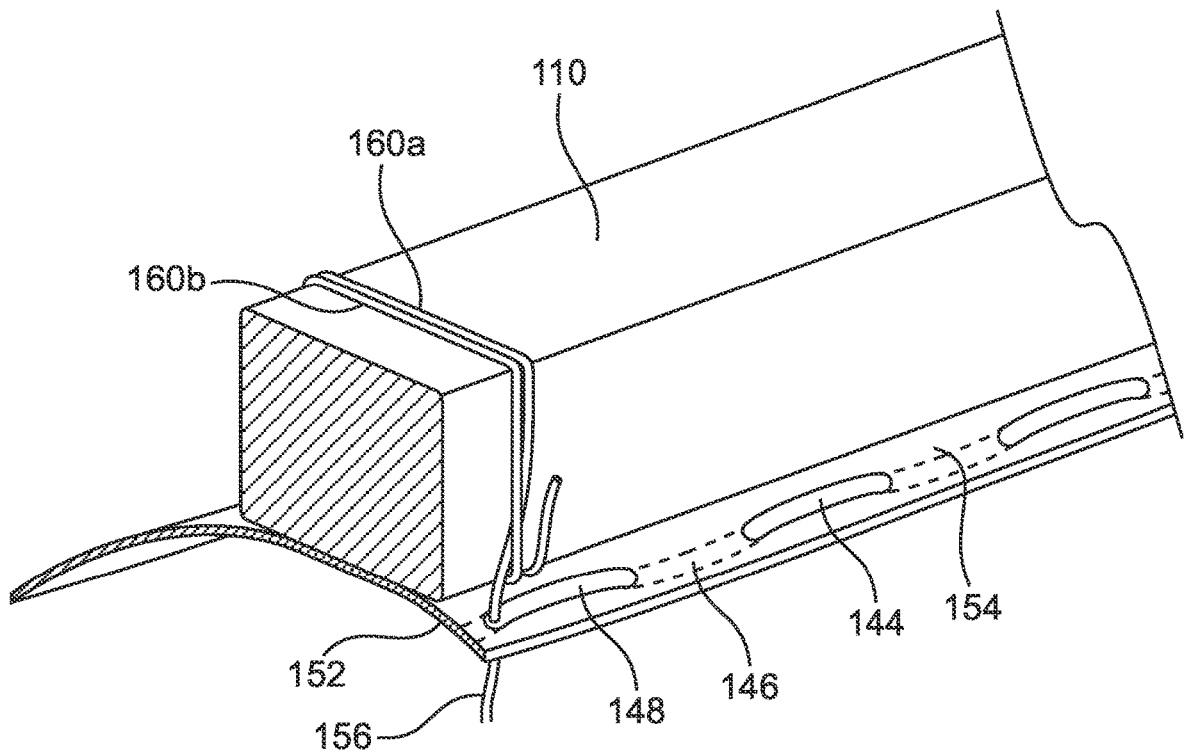

A self-tightening construct 158 is formed by threading the secondary suture 156 radially outward through the primary suture 144 at penetration point 150a, and forming at least one loop 160 around the strut, such as loop 160a shown in FIG. 5B. According to some embodiments, the self-tightening construct 158 includes more than one loop 160 around the strut 110. For example, the secondary suture may be looped again to form a second loop 160b around the strut 110 as shown in FIG. 5C. It will be clear that while two loops 160a and 160b are described and illustrated in conjunction with FIGS. 5A-5E, the self-tightening construct 158 can include, in alternative variations, any other number of loops.

Figure 5D:
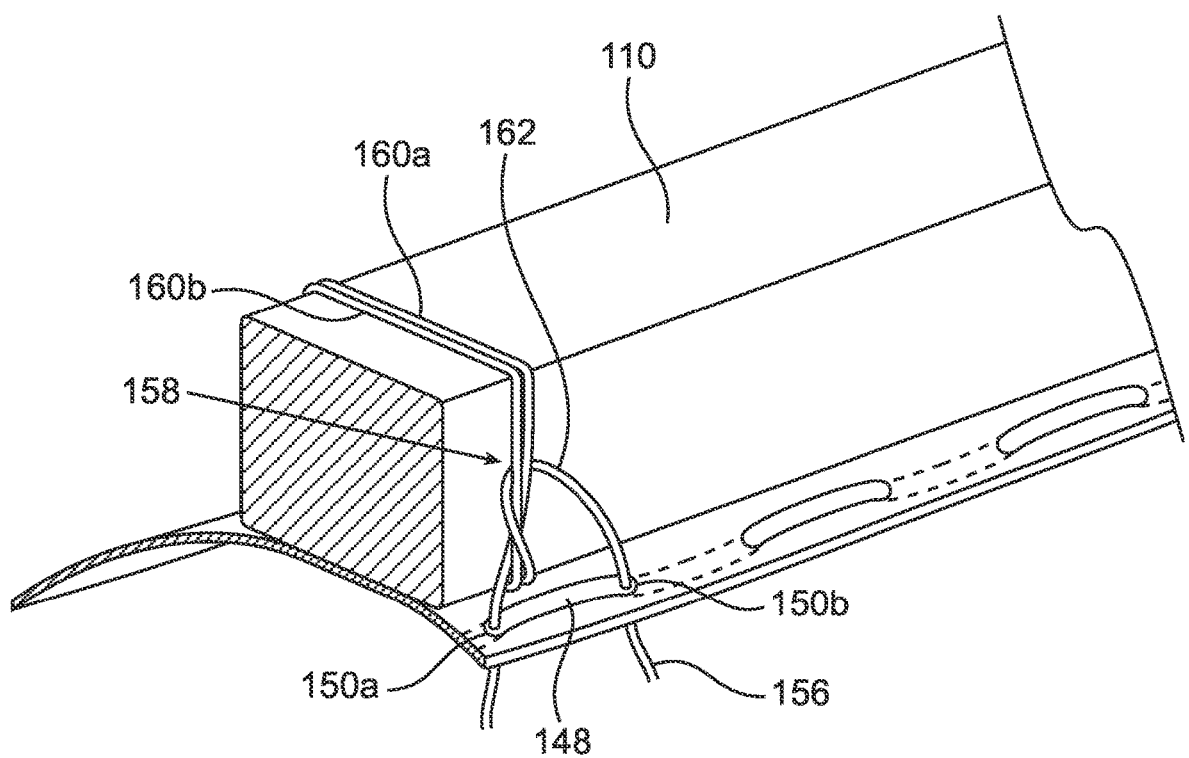

As shown in FIG. 5D, the secondary suture 156 is then passed under the at least one loop 160, such as between both loops 160a, 160b and the strut 110, to form a generally horseshoe-shaped, or u-shaped section 162, which is threaded thereafter through the primary suture 144 in a radially inward direction at penetration point 150b. Thus, the resulting self-tightening construct 158 is defined between two penetrations points 150 that define at least one outer stitch portion 148 there-between.

A "radially inward" direction is a direction toward the valve longitudinal axis 10, while a "radially outward" direction is oppositely oriented away from the valve longitudinal axis 10.

Figure 5E:
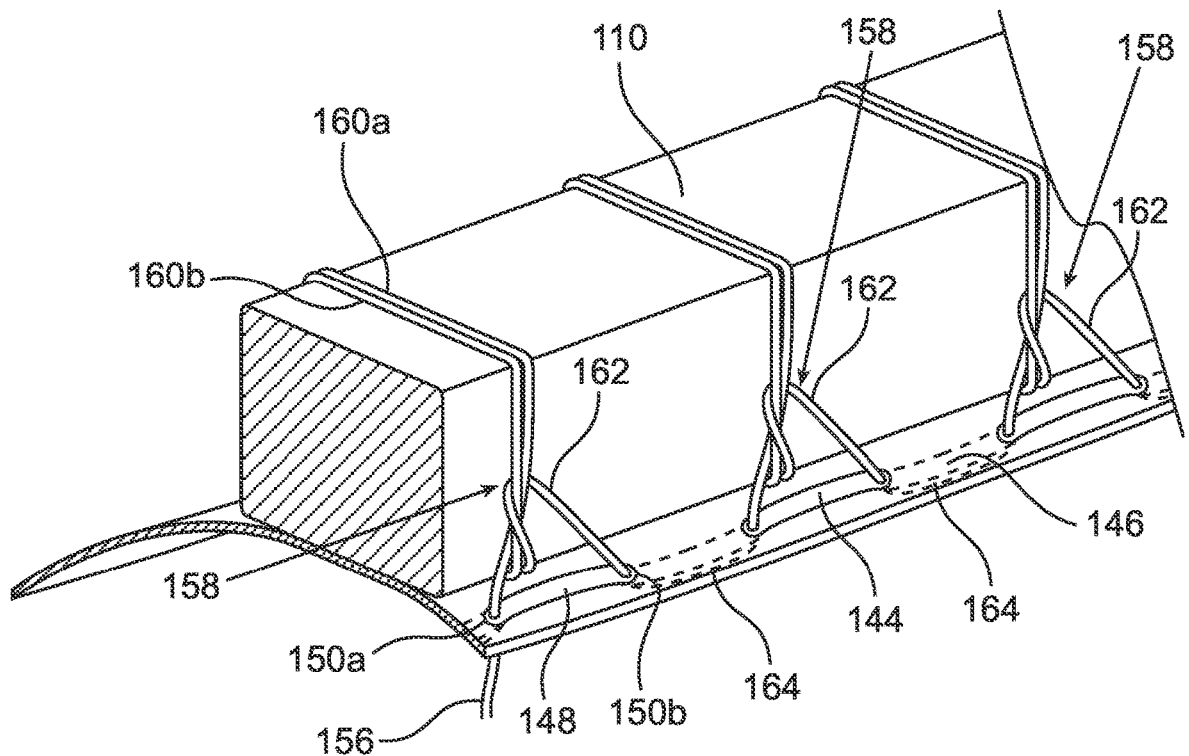

The secondary suture 156 further comprises a plurality of suture pull portions 164 extending over the leaflet inner surface 152, and may be defined between consecutive self-tightening constructs 158. As shown in FIG. 5E, a suture pull portion 164 of the secondary suture 156 is defined by extending the secondary suture 156 over the leaflet inner surface 152, for example—in parallel to at least one inner stitch portion 146, and then threading the secondary suture 156 once again through the primary suture 144 in a radially-outward direction, at a consecutive penetration point 150c, at which point another self-tightening construct 158 can be formed in a similar manner. FIG. 5E shows a section of a stitch pattern that includes three exemplary self-tightening constructs 158.

The self-tightening constructs 158 are configured to tighten their grip on the leaflets 132 the more their cusp end portions 134 are pulled radially inward. During diastole, the leaflets 132 collapse radially inward to effectively close the prosthetic valve. This collapse exerts pull forces oriented radially inward in the cusp end portions 134, which tend to pull the suture pull portions 164 radially inward therewith. The suture pull portions 164, disposed over the leaflet inner surfaces 152, pull the tails on both sides of each self-tightening construct 158 there-along, which causes the at least one loop 160 to constrict about the strut 110. This constriction reduces the diameter of the at least one loop 160, thus forming a mechanical interface between the exterior surfaces of the strut 110 and the interior surfaces of the at least one loop 160. This constriction results in static friction between the interior and exterior surfaces at the mechanical interface, causing the at least one loop 160 of each self-tightening construct 158 to tighten in a reduced size or diameter configuration in which tension may be maintained. In other words, the loops 160 are configured to reduce in diameter when tension is applied to both end portions of the self-tightening construct 158, which increase the grip of the secondary suture 156 around the struts 110, thereby preventing the leaflets 132 from sliding over the struts 110 along the resulting scallop line.

Advantageously, the primary suture 144, which is threaded in an in-and-out pattern through the cusp end portion 134, may serve as a pledget or cushion between the secondary suture 156 and the leaflet 132. For example, the suture pull portion 164, disposed over the leaflet inner surface 152, may be pressed during the repetitive systolic and diastolic cycles against the inner stitch portions 146 of the primary suture 144, which serves as a pledget or cushion so as to prevent direct abrasion that may be otherwise applied to the leaflet 132.

The term "suture", as used herein for either the primary suture 144 or the secondary suture 156 (as well as secondary suture 170 described further down below), includes, but is not limited to, polymer materials, thread, strand, fiber, wire, other windable materials, organic and inorganic materials, or any other material that is acceptable for medical applications for threading and/or joining together components used in the various embodiments of the valve 100. The primary suture 144 can be a multi-filament suture, such as Ethibond Excel® PET thread (Johnson & Johnson, New Brunswick, N.J.) among other types of suture. The secondary suture 156 (as well as secondary suture 170 that will be described further down below) can include ultra-high-molecular-weight polyethylene (UHMwPE), such as a FORCE FIBER® suture (Teleflex, Wayne, Pa) or DYNEEMA® fiber (Koninklijke DSM, the Netherlands), among other types of sutures.

Preferably, the diameter of the secondary suture 156 is sufficiently smaller than that of the primary suture 144, so that threading the secondary suture 156 through the primary suture 144 does not tear or disrupt the primary suture 144. A ratio of the diameter of the secondary suture 156 to the diameter of the primary suture 144 is defined as the secondary to primary sutures diameter ratio. According to some embodiments, the secondary to primary sutures diameter ratio is less than 0.8. According to some embodiments, the secondary to primary sutures diameter ratio is less than 0.5. According to some embodiments, the secondary to primary sutures diameter ratio is less than 0.3.

In prior art prosthetic valve devices, an inner skirt is attached to an inner surface of the frame, so as to form a more suitable attachment surface for the leaflets. In contrast, the currently disclosed attachment configuration does not require utilization of intermediate fabric strips, since the primary suture 144 serves as a support structure through which the leaflet 132 may be attached to the frame 106, via a secondary suture 156 threaded through the primary suture 144. Fabric strips along the inner surface of the frame 106 pose a risk of promoting tissue ingrowth and proliferation after implantation. Thus, the absence of such fabric or cloth components along the inner side of the frame may significantly reduce such risks, thereby improving the valve's long-term durability and functionality.

According to preferred embodiments of the present invention, leaflet attachment to the frame of a prosthetic valve along the scalloped edge of the leaflets, is devoid of intermediate fabric strips and/or cloth there-between. While tissue ingrowth may still occur along suture materials, such as the primary suture 144, the overall surface area of a suture is significantly smaller than that of traditionally used fabric strips that serve, for example, as inner skirt components.

As shown, the attachment of the leaflets 132 to the struts 110 of the frame 106 is achieved via the secondary suture 156, which is threaded through the primary suture 144 instead of being threaded directly through the leaflet material. Thus, the primary suture 144 serves as a reinforcement member that resists suture tear-through along the cusp end portions 134, thereby reducing stress concentrations on the leaflets 132 in the vicinity of the scallop line. Advantageously, the forces applied to the leaflets 132 during transitioning between the open and closed or coapting states, at the regions of leaflets attachment to the frame, are distributed along the length of the primary sutures 144. In such manner, the primary suture 144 serves as a force-distributing element which enhances the durability of the leaflets 132 over time, because the forces are distributed over the primary suture 144 in a substantially equal manner along its length.

With further reference back to FIG. 2, the leaflet 132 can be provided, in some embodiments, with a series of apertures 142 pre-formed along its cusp end portion 134, configured to accept the primary suture 144 and define penetration points 150 through which it may extend in an in-and-out pattern. In such embodiments, the apertures 142 may serve as the penetration points 150. The apertures 142 can be equally spaced from each other in some embodiments.

The secondary suture 156 is threaded through the primary suture 144 at the penetration points 150, potentially within the apertures 142. According to some embodiments, the secondary suture 156 extends through the primary suture 144 at each penetration point 150. Alternatively, the secondary suture 156 may extend through only some of the penetration points 150, as will be further disclosed herein below.

Since in such embodiments the primary suture 144 is threaded through pre-formed apertures 142 along the cusp end portion 134, accuracy of the penetration points 150 for the primary and/or secondary suture 144 and/or 156, respectively, can be pre-set, leading to more accurate placement of the sutures and less errors.

The apertures 142 are dimensioned to accept the primary suture 144. According to some embodiments, the diameter of the apertures 142 is equal to or smaller than the diameter of the primary suture 144, such that when the primary suture 144 is pass there-through, each aperture 142 tightly retains the primary suture 144 extending there-through. Since the secondary suture 156 extends the boundaries the primary suture 144 at the penetration zones outward, alternative embodiments may include apertures 142 having a diameter that is equal to or smaller than the combined diameters of the primary suture 144 and the secondary suture 156, such that when the secondary suture 156 extends through the primary suture 144 within the aperture 142, the aperture 142 tightly retains them both therein.

According to some embodiments, the cusp end portions 134 include markings that may follow the undulating scallop line, such as by tracking the curvature of the cusp edges 135. Such markings, which may be utilized either alternatively to, or in addition to, apertures 142, can further assist the assembler in stitching of the primary suture 144 there-along.

According to some embodiments, as shown in FIG. 5E, the secondary suture 156 is threaded through all successive penetration points 150, such that each self-tightening construct 158 is positioned over a single outer stitch portion 148, and each suture pull portion 164 spans over a length of a single inner stitch portion 146.

Figure 6:
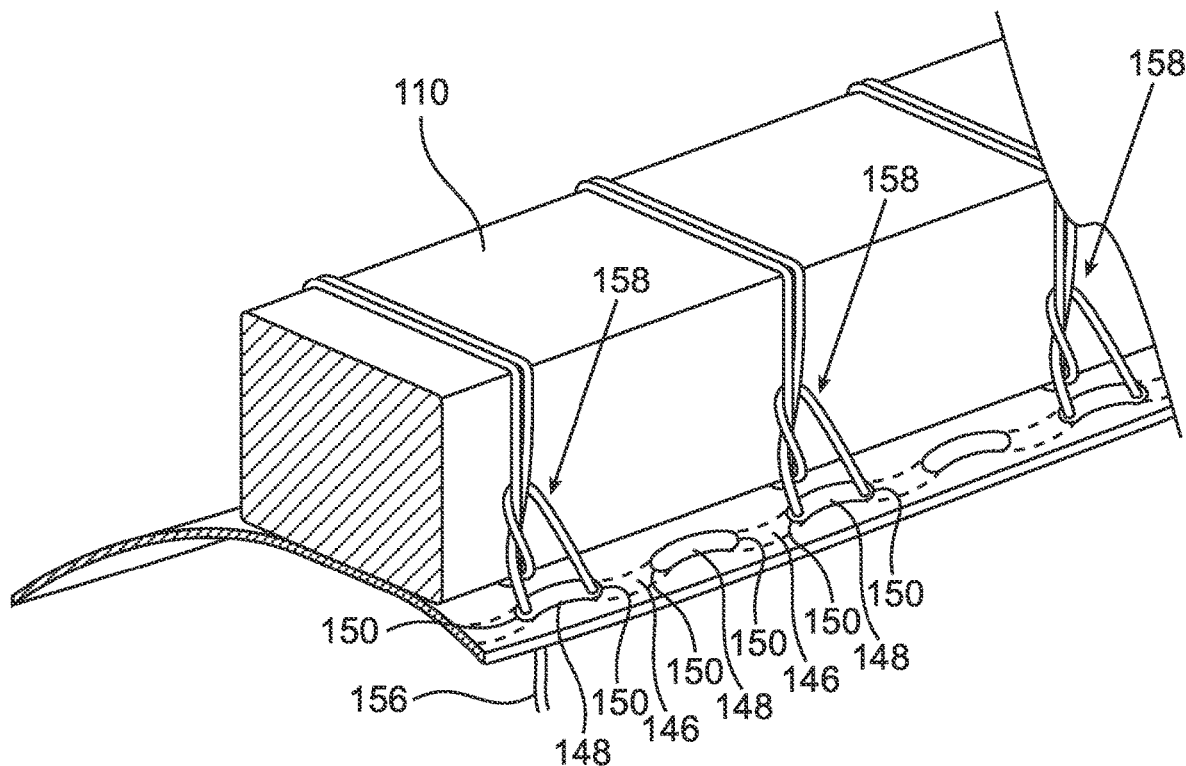
FIG. 6 shows an exemplary configuration of a leaflet coupled to a strut via a first and a secondary suture, according to some embodiments.

According to alternative embodiments, the secondary suture 156 is not necessarily threaded through all successive penetration points 150, and may actually skip over one or more penetration point 150, such that a single suture pull portion 164 may span over more than one inner 146 or outer 148 stitch portions. FIG. 6 shows an exemplary configuration in which each self-tightening construct 158 is positioned over a single outer stitch portion 148, while the suture pull portion 164 spans over two inner stitch portions 146 and a single outer stitch portion 148 positioned there-between. It will be understood that other configurations are contemplated, wherein either the self-tightening construct 158 and/or the suture pull portion 164 is threaded through non-successive penetration points 150.

The term "non-successive penetration points" refers to any couple of penetration points that include at least one additional penetration point 150 there-between. Advantageously, the self-tightening configuration of the secondary suture 156 enables it to be threaded through non-successive penetrations points 150, while retaining a sufficient grip to prevent or at least significantly reduce lateral movement of the cusp end portions 134 over the struts 110. Thus, the number and position of the self-tightening constructs 158 can be designed and modified in various different manners, based on the desired attachment points, and to facilitate easier attachment by an assembler of the valve 100.

Figure 7:
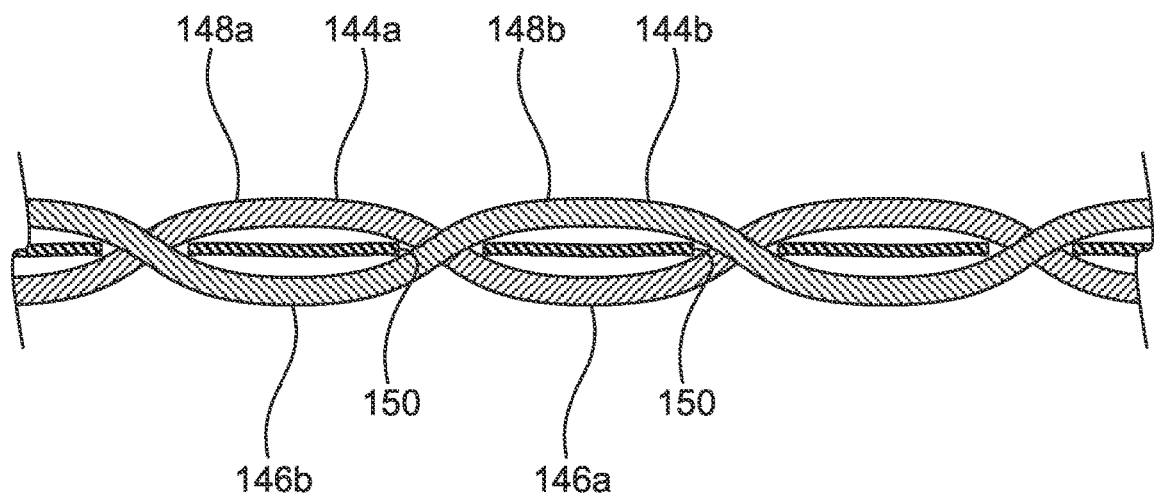
FIG. 7 shows an enlarged sectional view through a cusp end portion of a leaflet, with two primary sutures threaded there-through in an in-and-out pattern, according to some embodiments.
Figure 8:
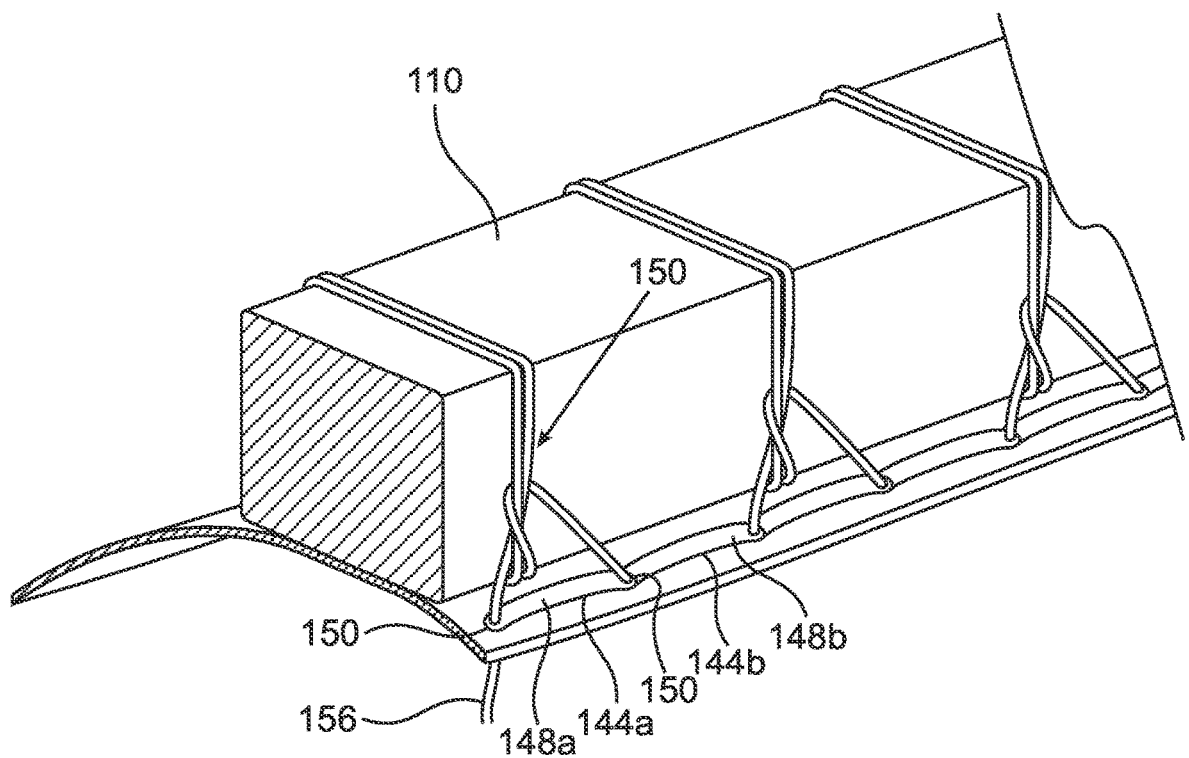
FIG. 8 shows another exemplary configuration of a leaflet coupled to a strut via a first and a secondary suture, according to some embodiments.

According to some embodiments, two primary sutures 144 are inversely threaded in an in-and-out pattern, through the same penetration points 150. FIG. 7 shows a sectional view of a cusp end portion 134 which is similar to the view shown in FIG. 4, except that two primary sutures 144a and 144b are threaded in opposite directions, through the same penetration points 150, such that each couple of successive penetration points 150 define both an inner stitch portion 146 of one of the primary sutures, and an outer stitch portion 148 of the other primary suture. FIG. 8 shows a secondary suture 156 threaded through a cusp end portion 134 that includes two primary sutures 144 as shown in FIG. 7. Advantageously, this configuration results in a pattern in which an outer stitch portion 148 and an inner stitch portion 146 extend between each couple of successive penetration points 150, thereby simplifying the assembly procedure by allowing the assembler to thread the secondary suture 156 through any penetration points 150 conveniently available during such a procedure.

According to some embodiments, the diameter of the apertures 142 is equal to or smaller than the diameter of two primary sutures 144, such that when both primary sutures 144 extend there-through, each aperture 142 tightly retains them both. Since the secondary suture 156 extends the boundaries of at least one of the primary sutures 144 at the penetration zones outward, alternative embodiments may include apertures 142 having a diameter that is equal to or smaller than the combined diameters of two primary suture 144 and the secondary suture 156.

Generally, threading sutures through a leaflet 132 involves using a needle or other sharp tool that can pierce through leaflet 132. However, use of a needle or other sharp tools might lead to unintended cuts, punctures, or other damage to the leaflets 132. Such damage is also difficult to foresee or predict by the manufacturer, and can also be difficult to detect by the end user even when it occurs. The primary suture 144 is threaded in an in-and-out manner through penetration points 150, that also serve as the penetration sites through which the secondary suture 156 is threaded. Thus, as the secondary suture 156 is threaded through the primary suture 144 and not directly into the leaflet, additional penetrations or cuts to the leaflets may be avoided. Advantageously, the proposed arrangement enables utilization of a secondary suture 156 to attach the leaflet 132 to the struts of the frame, without further puncturing the tissue of the leaflet, thereby improving the leaflets' long-term durability.

A stitching pattern that includes self-tightening constructs 158 for directly attaching leaflets 132 to the struts 110 of the frame 106, according to any of the embodiments described above, can be implemented for any type of prosthetic valves 100, such as either mechanically expandable valves 100' or balloon expandable valves 100". However, the advantage of self-tightening constructs 158 is more prominent for mechanically expandable valve 100' of the type illustrated in FIG. 1A, shown to include two layers of intersecting struts 110', namely inner struts and outer struts, that intersect (for example, via pins or other hinges) at the junctions 116'. A unique challenge with such double-layered frames 106' is the difficulty to form knots of the sutures at the pivot junctions 116', as relative movement between the intersecting struts 110' can exert scissor-like shearing forces that may compromise the integrity of the sutures in such regions.

Unlike the double-layered frames 106' of mechanically expandable valves, such as valve 100' shown in FIG. 1A, frames of prosthetic valve formed with a unitary frame, such as the frame 106" of balloon expandable valves 100" shown, for example, in FIG. 1B, do not suffer from the this problem to the same effect, and stitching pattern utilized to directly couple leaflets 132 to such frames 106" can include knot formed around non-apical junctions 116" in a manner that will preserve tight attachment there-between, without necessarily utilizing self-tightening constructs.

With particular reference to FIGS. 9A-9D, an exemplary technique for coupling leaflets 132 along their cusp end portions 134 to strut sections 111 interconnected at non-apical junctions 116 will now be discussed in accordance with the present teachings. The views illustrated in FIGS. 9A-9D are taken from a bottom view point of a section of a prosthetic valve, such as a section of prosthetic valve 100". A strut section 111, as used herein, refers to any section of a strut defined between two non-apical junctions 116 of a frame 106.

The frame 106" of the exemplary balloon expandable valve 100" illustrated in FIG. 1B, is shown to include flat inflow apices 118" (as well as flat outflow apices 120"). In some embodiments, a strut section can be either a relatively linear strut section, such as strut section 111"b shown in FIG. 1B, extending between two non-apical junctions that are axially spaced from each other, such as non-apical junctions 116"b and 116"c, and/or a curved strut section, such as strut section 111"a, extending between two non-apical junctions that are laterally spaced from each other, but may be aligned with each other at the same level of height between the inflow end 105" and the outflow end 103", such as non-apical junctions 116"a and 116"b. In such embodiments, the peak of the curvature of a curved strut section can define an apex, such as inflow apex 118"a defined by curved strut section 111"a.

Figure 9A:
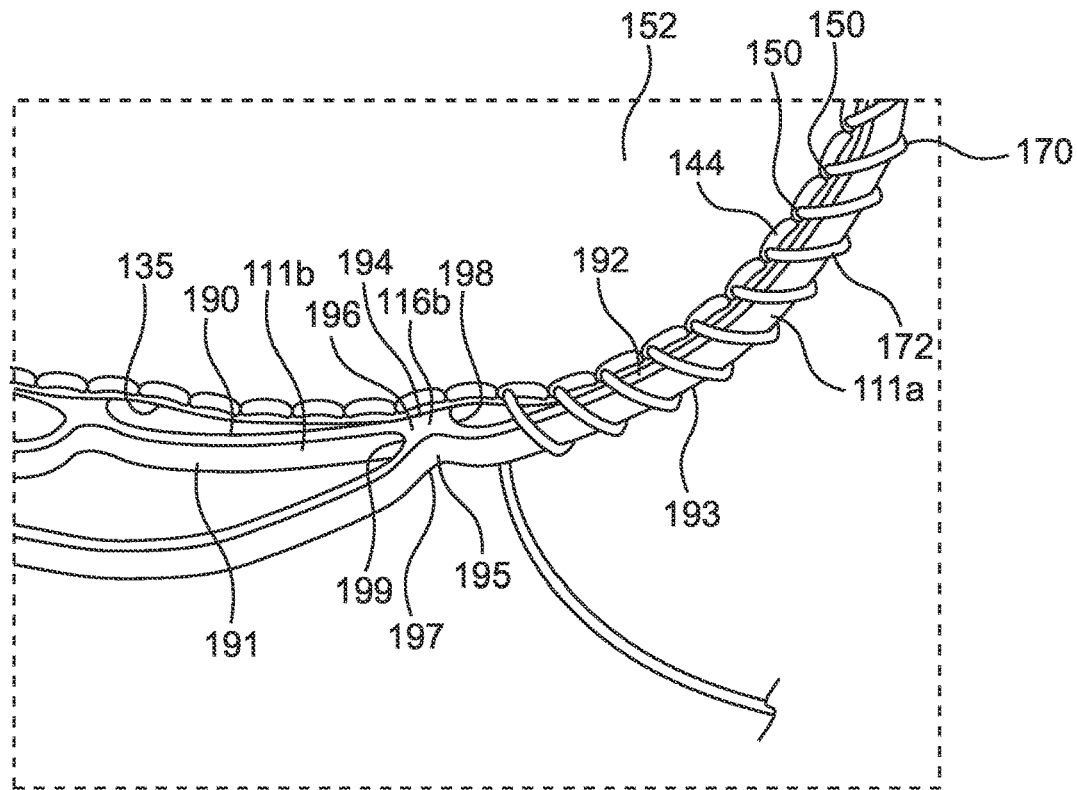
FIGS. 9A-9D shows various stages of an exemplary technique for coupling a leaflet along its cusp end portion to strut sections and junctions of a frame, according to some embodiments.
Figure 9B:
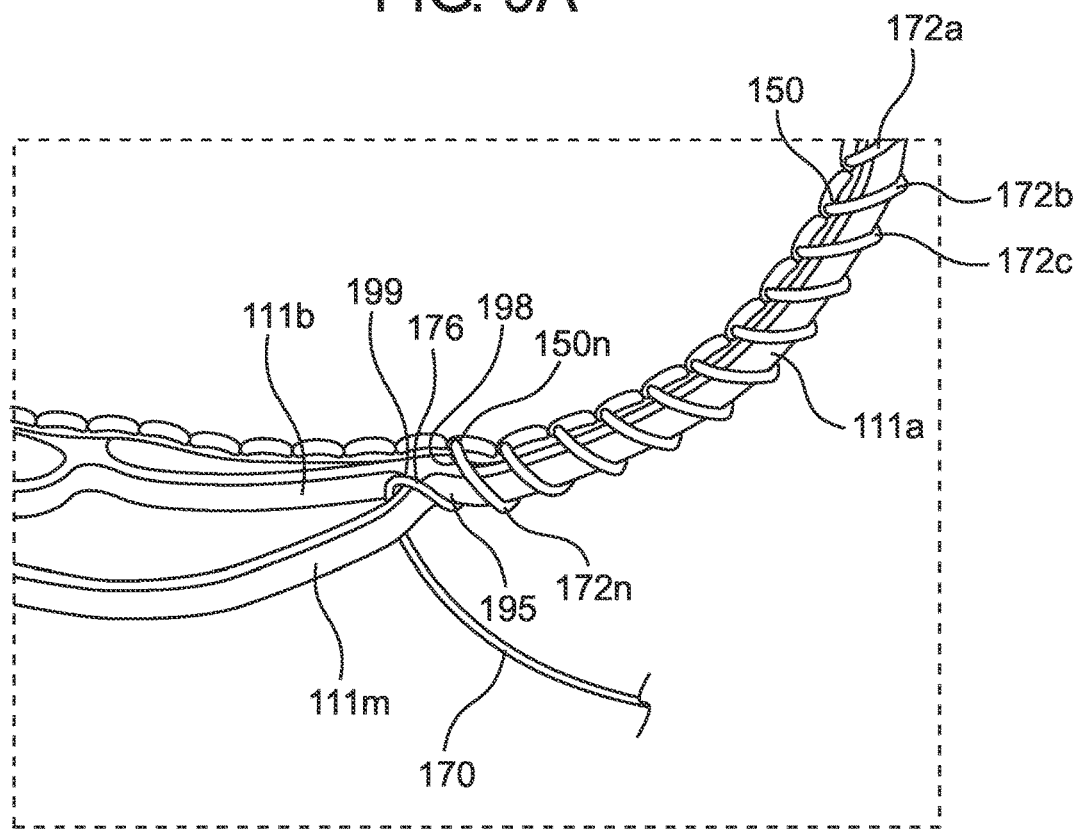
Figure 9C:
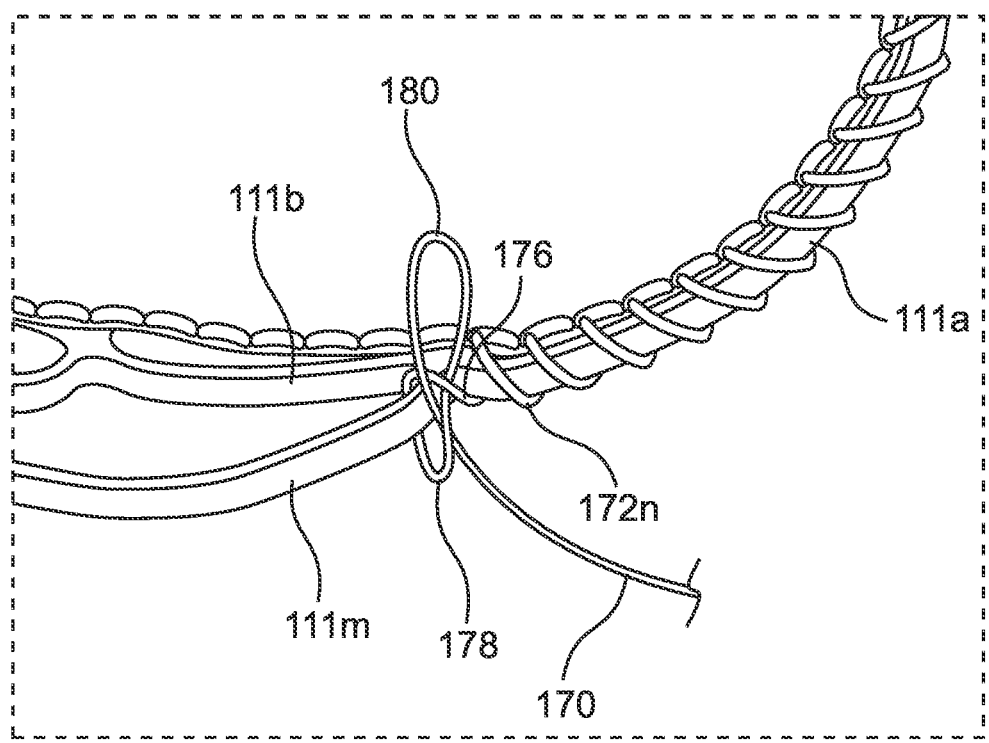
Figure 9D:
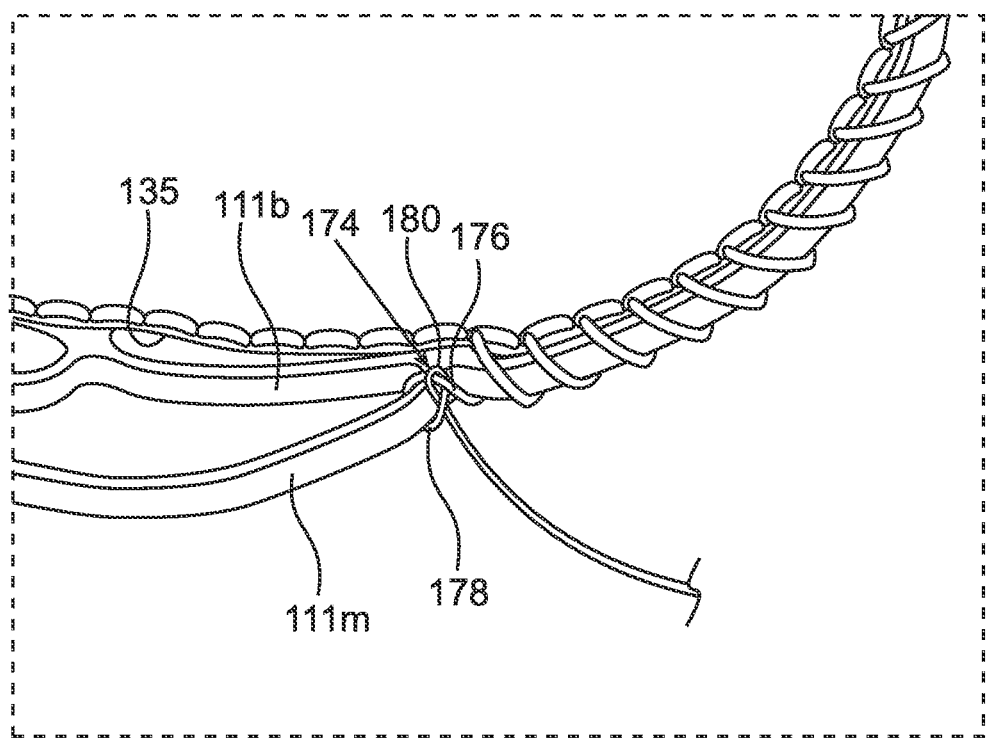

As shown in FIGS. 9A-B, Each strut section 111 and each non-apical junction 116 is defined between opposite axial sides and opposite radial sides. For example, each strut section 111 is defined between a strut proximal side 190 facing the outflow end 103, and a strut distal side 191 facing the inflow end 105 (sides 190 and 191 being the opposite axial sides of the strut section). Each strut section 111 is also defined between a strut inner side 192 facing the valve longitudinal axis 10, and a strut outer side 193 facing away from the axis 10 (sides 192 and 193 being the opposite radial sides of the strut section). If the strut has a rectangular cross-sectional profile, as illustrated in the example of FIGS. 5A-6, then each of the sides 190, 191, 192, 193 can be defined by a corresponding planar face of the strut. Nevertheless, as mentioned above, other cross-sectional shapes for the struts are contemplated, such that a side may not necessarily include a planar face.

Each non-apical junction 116 is defined between a junction proximal side 194 facing the outflow end 103, and a junction distal side 195 facing the inflow end 105 (sides 194 and 195 being the opposite axial sides of the junction). Each non-apical junction 116 is similarly defined between a junction inner side 196 facing the valve longitudinal axis 10, and a junction outer side 197 facing away from the axis 10 (sides 196 and 197 being the opposite radial sides of the junction). Each junction is also defined between two opposite lateral sides, namely a junction first lateral side 198 and a junction second lateral side 199. In the illustrated example, two strut sections 111 converge on each lateral side of a non-apical junction 116.

A primary suture 144 can be threaded through the cusp end portions 134 in an in-and-out pattern, in the same manner described above in conjunction with FIG. 4. In some embodiments, two primary sutures 144a and 144b are threaded in opposite direction through penetration point 150, in a similar manner to that described above in conjunction with FIG. 8. Thus, any reference to a primary suture described below in conjunction with FIGS. 9A-10 can refer either to a configuration of a single primary suture or to two oppositely threaded sutures, with equal force.

As shown in FIGS. 9A-B, the cusp end portion 134, with the primary suture 144 threaded there-through in an in-and-out pattern, is approximated to a strut section 111, such that the cusp end portion 134 is preferably positioned radially inward (and optionally in contact with) the strut inner side 192. A secondary suture 170 is stitched through the primary suture 144 and around the strut section 111 in a manner that forms a series of loops or whip stitches 172 spaced from each other along the length of the strut section 111. The secondary suture 170 can be similar to any embodiment of the secondary suture 156, except that the secondary suture 170 does not form self-tightening constructs 158, but rather wraps around at least one strut section 111 by a series of whip stitches and includes at least one junction lock-knot 174 around at least one non-apical junction 116, as will be described in greater detail below.

A whip stitch 172 is formed by threading the secondary suture 170 through the primary suture 144 at a penetration point 150, extending the secondary suture 170 around the strut section 111 and back toward the primary suture 144, and then threading secondary suture 170 once again through the primary suture 144 at a consecutive penetration point 150, at which point another whip stitch can be formed in a similar manner.

For example, whip stitch 172b shown in FIG. 9B is formed by threading the secondary suture 170 radially outward through the primary suture 144 at penetration point 150 (shown in FIG. 9B between loops 172a and 172b), extending it around the strut segment 111 (in the illustrated example, radially outward over the strut proximal side 190, then along the strut outer side 193 which is hidden from view, and radially inward over the strut distal side 195) back (along strut inner side 192) toward the primary suture 144, threading it through the next sequential penetration point 150 to form the next whip stitch 172c in a similar manner. In some embodiments, as in the illustrated example, the primary suture 144 is positioned proximal or adjacent to the strut proximal side 191.

Threading the whip stitches 172 through consecutive penetration points 150 results in a series of angled whip stitches. An angled whip stitch can be defined as a stitch having at least one portion extending between opposite sides of the strut section 111, oriented at a non-perpendicular angle with respect to a strut section axis defined as tangent to the strut section 111 at the region of the respective stitch.

In the example illustrated in FIGS. 9A-B, the portion of the whip stitch 172b extending along the strut outer side 193 between the strut proximal side 190 and the strut distal side 191 (this portion is hidden from view in FIG. 9B), the portion extending along the strut distal side 191 between the strut outer side 193 and the strut inner side 192, and the portion extending along the strut inner side 192 (optionally at least partly over the leaflet inner surface 152) between the strut distal side 191 and the strut proximal side 190, are oriented at a non-perpendicular angle relative to a strut section axis which is tangent to the strut 111a at the region of whip stitch 172b.

Thus, each angled whip stitch 172 has a portion extending over one axial side of the strut section 111 wrapped thereby, closer to a junction 116 (at the end of the respective strut section) than the opposite portion extending over the opposite axial side of the strut section. In the illustrated example, the portions of whip stitches 172 extending over the proximal side 190 of strut section 111a are closer to junction 116b than the opposite portions extending over the strut distal side 191. Alternatively, an opposite orientation of the whip stitches 172 can include the portions extending over the strut distal side 191 being closer to such a junction 116 than the portions extending over the strut proximal side 190. A series of whip stitches 172 wrapped over a single strut section 111 defined between two junction 116 will generally follow the same angled orientation.

Preferably, the diameter of the secondary suture 170 is sufficiently smaller than that of the primary suture 144, so that threading the secondary suture 170 through the primary suture 144 does not tear or disrupt the primary suture 144. A secondary to primary sutures diameter ratio with respect to secondary sutures 170 can be defined in the same manner described above with respect to secondary sutures 156. According to some embodiments, the secondary to primary sutures diameter ratio is less than 0.8. According to some embodiments, the secondary to primary sutures diameter ratio is less than 0.5. According to some embodiments, the secondary to primary sutures diameter ratio is less than 0.3.

As shown in FIG. 9B, these steps are repeated to form a series of angled whip stitches 172 (such as stitches 172a, 172b, 172c), up to a final whip stitch 172n defined as the whip stitch which is closest to the non-apical junction 116 on an end of the strut section 111 (junction 116b in FIG. 9B), wherein the final whip stitch 172n extends up to a final penetration point 150n, after which the secondary suture 170 is utilized to form a junction lock-knot 174 over the corresponding non-apical junction 116.

A junction lock-knot 174 includes a transition section 176, a first loop 178 and a second loop 180. The transition section 176 extends along one axial side of the junction 116, in a direction from the junction first lateral side 198 to the junction second lateral side 199. In the example illustrated in FIG. 9B, the secondary suture 170 extend over the outer side 193 of strut section 111a from the final penetration point 150n at the strut proximal side 190 to the strut distal side 191, in proximity of the first lateral side 198 of junction 116b. The transition section 176 is then formed by extending the secondary suture 170 along the junction distal side 195 in a diagonal direction, such as radially inward from the junction outer side 197 toward the junction inner side 196 and laterally from the junction first lateral side 198 to the junction second lateral side 199.

The first loop 178 is then formed by extending the secondary suture 170 around a strut section 111 extending from the junction second lateral side 199. Struts sections 111b and 111m are shown to extend from the second lateral side 199 of junction 116b. In the example illustrated in FIGS. 9B-C, the first loop 178 is formed by extending the secondary suture 170 from the transition section 176 around strut section 111m.

The second loop 180 is formed by passing the tail of the secondary suture 170 from the first loop 178, between the transition section 176 and the junction 116, and then looping it back to extend through the first loop 178. In the example illustrated in FIG. 9C, the secondary suture 170, extending from the first loop 178, is passed, for example in an axial direction (e.g., upward toward outflow end 103), and is then folded over itself backward (e.g., in the distal/downward direction), passing through the first loop 178. The tail of the secondary suture is then forcibly pulled to tighten both loops 178, 180 and lock the resulting knot 174.

The procedure can then be repeated by forming a series of whip stitches 172 attaching the leaflet 132 to the subsequent strut section 111 extending from the junction 116, such as strut section 111b, and forming similar junction lock-knots 174 over all respective junction 116 along the path of the rounded cusp end portions 134. Advantageously, this type of stitching pattern facilitates the valve assembly procedure because the knots 174 around the junctions 116 maintain a tight connection between the leaflets and the junctions during assembly.

Compared to conventional assembly procedures, during which the assembler is required to maintain tension on the suture while forming each subsequent stitch along the entire circumference of the frame, the junction lock-knots 174 will maintain tight connection of all whip stitches 172 around the strut section 111 leading to the respective junction 116, relieving the assembler from the need to keep all previous stitches tensioned, and even allowing continuation of the assembly procedure at a later time without the risk of any of the previous loops of knots being loosened.

The tight connection of the knot 174 keeps all whip stitches 172 along the strut section 111 leading thereto, tightly connected to the strut section 111 as well, thereby reducing relative motion between the suture 170 and strut sections 111 under normal operation of the valve 100 after implantation.

Any junction lock-knot 174 also separates between the series of whip stitches 172 around the strut sections 111 extending from both sides of the junction 116. Thus, the orientation of angled whip stitches 172 formed subsequent to junction lock-knot 174 are not dependent on the configuration of the whip stitches 172 leading to the knot 174, and in fact can have a similar or different angular orientation, as well as similar or different stitching density, and so on. This allows the assembler to switch the angular orientation of angled whip stitched in any desired direction that may be convenient during the assembly procedure, which may differ for different strut portion 111 along the circumference of the valve 100.

Figure 10:
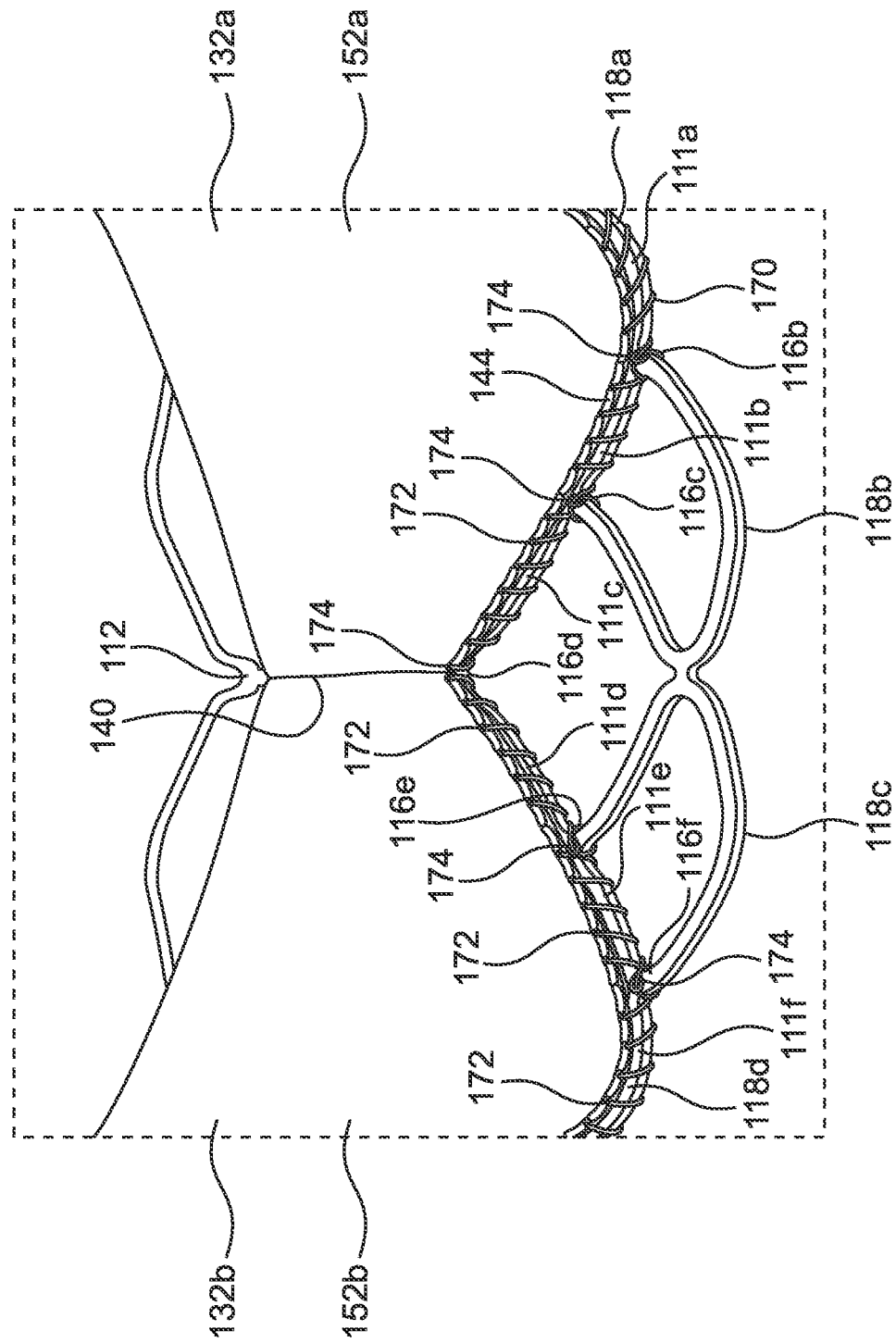
FIG. 10 shows a partial view of a prosthetic valve with leaflets coupled to a plurality of strut sections and junctions, according to some embodiments.

FIG. 10 shows an example of a portion of a leaflet assembly 130 sutured to the frame 106 (view is from the inside of the valve). As shown, the procedure can be repeated to attach one or more other leaflets 132 to strut sections 111 and junction 116, including formation of similar junction lock-knots 174 around junctions 116 that interconnect two adjacent leaflets 132, such as junction 116d aligned with commissure 140 between leaflets 132a and 132b shown in FIG. 10.

In the illustrated view, the cusp end portion of leaflet 132a is sutured to strut sections 111a, 111b and 111c, and the cusp end portion of leaflet 132b is sutured to strut sections 111d, 111e and 111f. As shown, the angular orientation of the whip stitches 172 around strut sections 111a, 111b and 111c is generally similar (having their upper/proximal ends closer to junction 116d, for example, than their lower/distal ends). After the junction lock-knot 174 around junction 116d, the orientation of the whip stitches 172 around strut sections 111*d* and 116*e* is reversed to a generally opposite direction, and as shown, after the junction lock-knot 174 around junction 116*f*, the orientation of the whip stitches 172 around strut section 111*f* is switched again (to an orientation similar to that of the whip stitches looped over struts section 111*a-c*). The ability to change the orientation of the whip stitches wrapped around each strut segment separately can facilitate the valve assembly process.

In some cases, it may be preferable to attach the leaflets 132 to the frame 106 utilizing a secondary suture 156 that does not penetrate through the leaflets 132 and/or through the primary suture 144. FIGS. 11A-11D show an exemplary technique for coupling leaflets 132 along their cusp end portions 134 to strut sections 111. The views illustrated in FIGS. 11A-11D are taken from a bottom view point of a section of a prosthetic valve, such as a section of prosthetic valve 100", similar to the view angle of FIGS. 9A-9D.

Figure 11C:
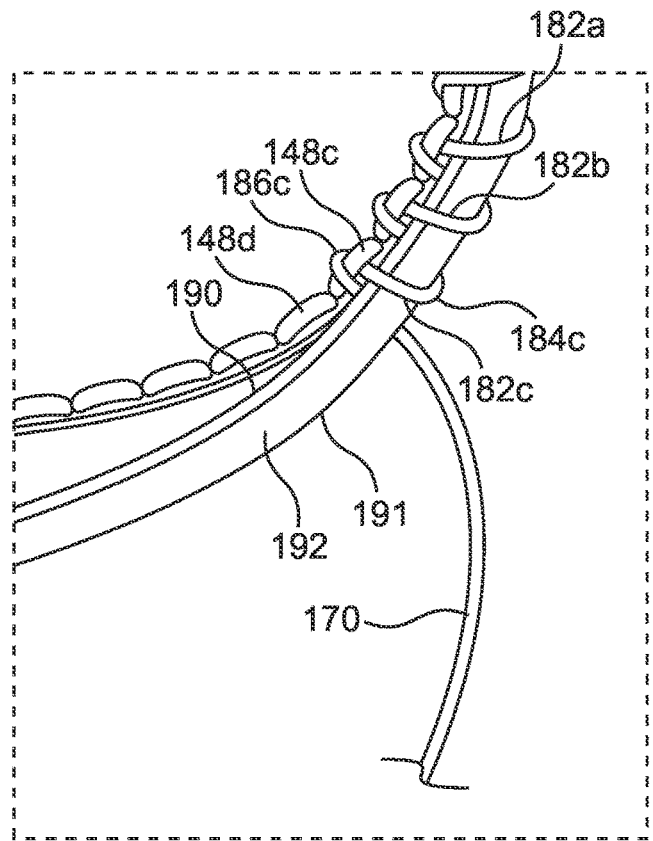

A primary suture 144 can be threaded through the cusp end portions 134 in an in-and-out pattern, in the same manner described above in conjunction with FIG. 4, forming a plurality of running stitch portions, including inners stitch portions extending over the leaflet inner surface (hidden from view) and outer stitch portions 148 extending over the leaflet outer surface 154 between penetration points 150, such as outer stitch portions 148*a*, 148*b* and 148*c* shown in FIG. 11A. In some embodiments, two primary sutures 144*a* and 144*b* are threaded in opposite direction through penetration point 150, in a similar manner to that described above in conjunction with FIG. 8. Thus, any reference to a primary suture described below in conjunction with FIGS. 11A-11D can refer either to a configuration of a single primary suture or to two oppositely threaded sutures, with equal force.

As shown in FIG. 11A, the cusp end portion 134, with the primary suture 144 threaded there-through in an in-and-out pattern, is approximated to a strut section 111, such that the cusp end portion 134 is preferably positioned radially inward (and optionally in contact with) the strut inner side 192. A secondary suture 170 is looped around the outer stitch portions 148 of the primary suture 144 and around the strut section 111 in a manner that forms a series non-penetrating whip stitches 182 spaced from each other along the length of the strut section 111. The secondary suture 170 can be similar to any embodiment described above in conjunction with FIGS. 9A-9D, except that the secondary suture in the embodiments shown in FIGS. 11A-11D is utilized to form non-penetrating whip stitches 182 instead of conventional whip stitches 172 that extend from one side of the leaflet to the other side (e.g., from leaflet inner surface 152 to its outer surface 154).

Unlike whip stitch 172, the non-penetrating whip-stitch 182 is not threaded through the primary suture 144 at penetration point 150 or any other region of the primary suture 144, and does not penetrate through the leaflet from one side to the other side. A non-penetrating whip-stitch 182 is formed by looping the secondary suture 170 around the strut section 111, thereby forming a strut-wrapping section 184, and then looping the secondary suture around an outer stitch portion 148, thereby forming a primary-suture-wrapping section 186. This can be repeated to form a series of following non-penetrating whip stitches 182 in a similar manner along the strut section 111.

For example, FIG. 11A shows two non-penetration whip stitches 182*a* and 182*b*, each including a corresponding strut-wrapping section 184 and a corresponding primary-suture-wrapping section 186. A following non-penetration whip stitch 182*c* is formed by looping the tail of the secondary suture 170, extending from primary-suture-wrapping section 186*b* (looped around outer stitch portion 148*b*), around the strut section 111, and back toward the following stitch portion 148*c* of the primary suture 144, as shown in FIG. 11B.

In the example shown in FIGS. 11A-11B, the strut-wrapping section 184*c* is formed by extending the secondary suture 170 across one radial side of the strut section (e.g., strut outer side 193) from one axial side to the opposite axial side of the strut (e.g., from strut proximal side 190 to strut distal side 191), folding it over the corresponding axial side of the strut (e.g., over strut distal side 191), and extending it across the opposite radial side (e.g., strut inner side 192) back toward the primary suture 144 (e.g., from strut distal side 191 toward strut proximal side 190).

As further shown in FIG. 11B, the secondary suture 170 is then passed beneath the consecutive outer stitch portion 148*c*, between the outer stitch portion and the leaflet 132 (i.e., between outer stitch portion 148 and leaflet inner surface 152). As shown in FIG. 11C, the secondary suture 170 is then folded over outer stitch portion 148*c*, thereby forming primary-suture-wrapping section 186*c*. The suture can then pass across the strut section 111 (such as across strut outer side 193 toward strut distal side 191 in the example illustrated in FIG. 11C), repeating these steps to form a following non-penetration whip stitch 182 (such as non-penetration whip stitch 182*d*).

Figure 11D:
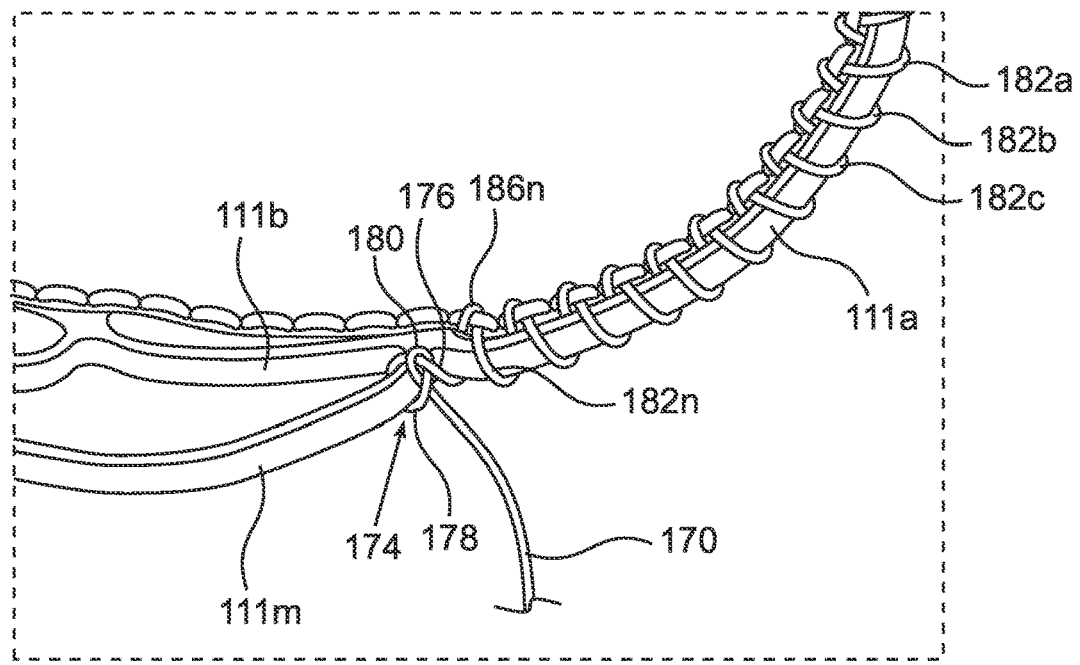
Figure 12B:
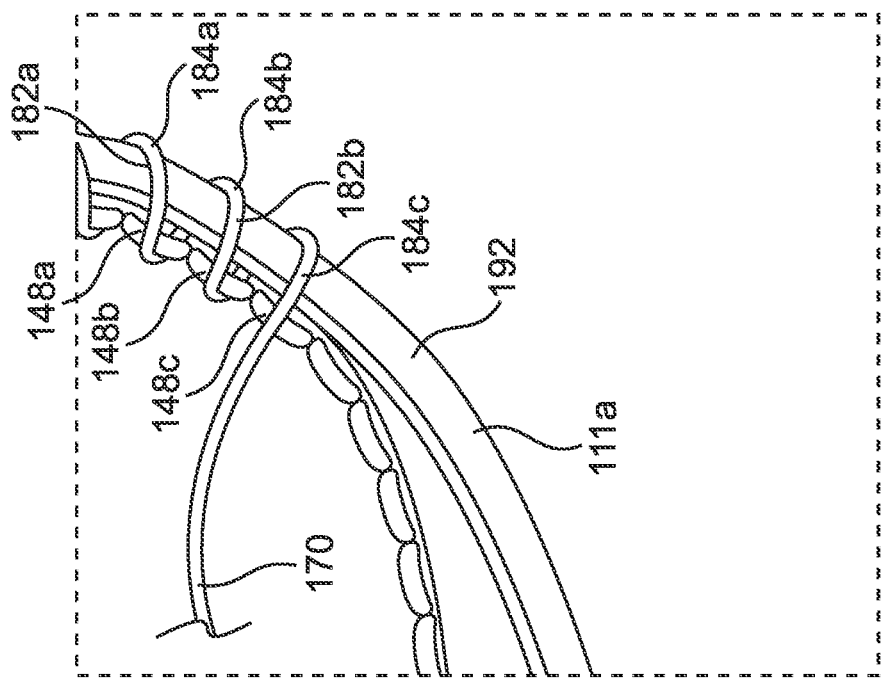
FIGS. 12A-12D shows various stages of another exemplary technique for coupling a leaflet along its cusp end portion to strut sections and junctions of a frame, according to some embodiments.
Figure 12A:
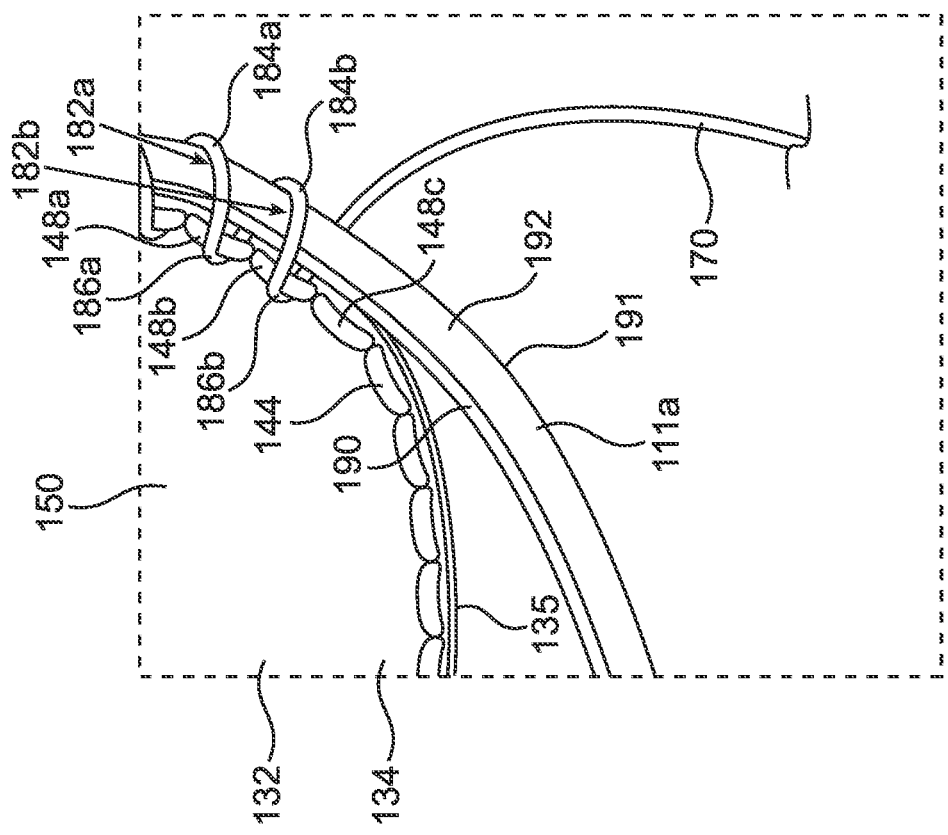
Figure 12C:
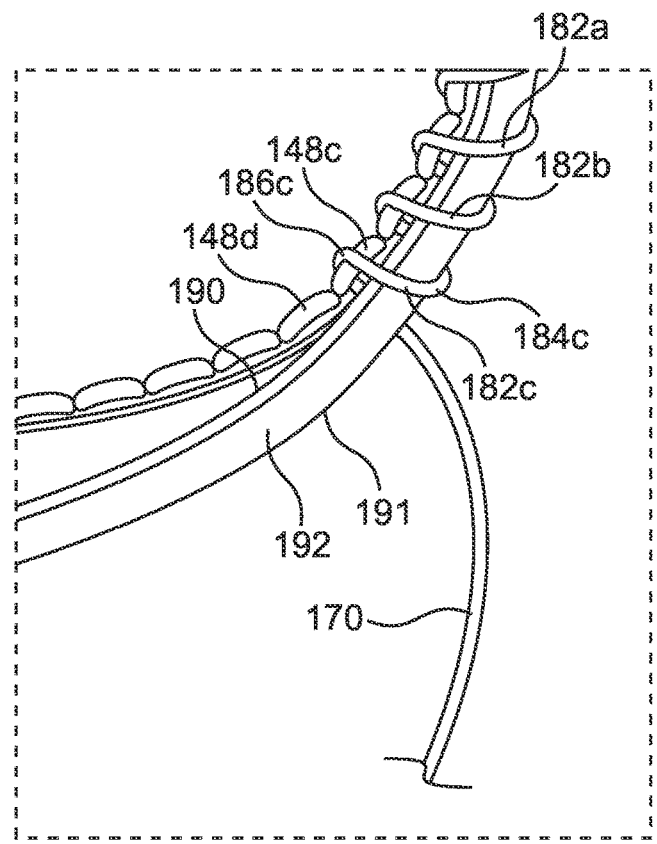
Figure 12D:
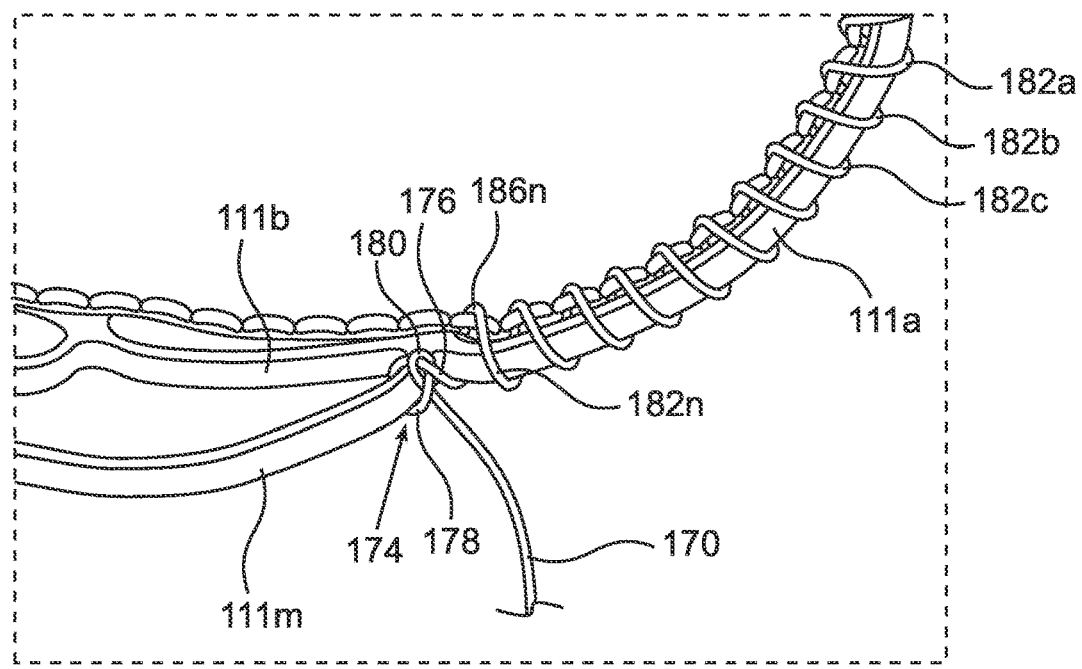

As shown in FIG. 11D, this procedure can be repeated up to a final non-penetration whip stitch 182*n* defined as the whip stitch which is closest to the non-apical junction 116 on an end of the strut section 111, wherein the secondary suture 170 can be utilized to form a junction lock-knot 174 following the same steps described above in conjunction with FIGS. 9A-9D, with the exception that the transition zone 176 of the junction lock-knot 174 extends from the final primary-suture-wrapping section 186*n* of the final non-penetration whip stitch 182*n*, instead of from a final penetration point 150*n*.

FIGS. 12A-12D shows another exemplary technique for coupling leaflets 132 along their cusp end portions 134 to strut sections 111 via a series of non-penetrating whip stitches 182, which can be identical to the technique described in conjunction with FIGS. 11A-11D, except that instead of passing the secondary suture 170 extending from a strut-wrapping section 184 beneath an outer stitch portion 148 and then folding it over the outer stitch portion 148, to form the primary-suture-wrapping section 186 (as shown in FIGS. 11B-11C), the secondary suture 170 is passed over the outer stitch portion 148 (see FIG. 12B) and then folded beneath it (i.e., between outer stitch portion 148 and leaflet inner surface 152). All other steps and embodiments can be similar to those described above in conjunction with FIGS. 11A-11D, and in the interest of brevity will not be further described.

FIG. 13 shows another stitching configuration which is similar to that shown in FIGS. 12A-12D, except that two non-penetration whip stitches 182 pass through each outer stitch portion 148. In the illustrated example, non-penetrating whip stitch 182*a*' comprises strut-wrapping section 184*a*' looped around strut section 111, and primary-suture-wrapping section 186*a*' extending therefrom and looped around outer stitch portion 148*a*. The secondary suture 170 then extends to form strut wrapping section 184*a*" of non-penetrating whip stitch 182*a*", and primary-suture-wrapping section 186*a*' looped around the same outer stitch portion 148*a*.

The secondary suture 170 then extends to form subsequent non-penetrating whip stitches 182b' and 182b" in a similar manner, having their primary-suture-wrapping sections 186b' and 186b" looped around outer stitch portion 148b. It is to be understood that while two non-penetration whip stitches 182 passing through a single outer stitch portion 148 are illustrated in FIG. 13, any other number of non-penetration whip stitches 182 can pass through any single outer stitch portion 148 in a similar manner.

FIG. 14 shows yet another stitching configuration which is also similar to that shown in FIGS. 12A-12D, except that each non-penetrating whip stitch 182 further includes a strut-looping section 185 extending from the respective primary-suture-wrapping section 186, looped solely over the strut section 111. In the illustrated example, non-penetrating whip stitch 182a comprises strut-wrapping section 184a looped around strut section 111, primary-suture-wrapping section 186a extending therefrom and looped around outer stitch portion 148a, and strut-looping section 185a extending from the primary-suture-wrapping section 186a and looped again around the strut section.

In the specific illustrated example, strut-looping section 185a is formed by extending the secondary suture 170 from the primary-suture-wrapping section 186a across one radial side of the strut section, such as strut outer side 193, around the strut distal side 191, over the other radial side, such as strut inner side 192, toward and over the strut proximal side 190. The secondary suture is then extended to form the strut-wrapping section 184b, primary-suture-wrapping section 186b, and strut-looping section 185b, together forming the subsequent non-penetrating whip stitch 182b in a similar manner. It is to be understood that while a single strut-looping section 185 is illustrated in the example, a non-penetrating whip stitch 182 can similarly include a plurality of single strut-looping sections 185 looped one after the other around the strut section 111, before forming the subsequent non-penetrating whip stitch 182.

It is to be understood that the configuration described above and illustrated in FIGS. 11A-14, showing the primary-suture-wrapping sections 186 looped around outer stitch portions 148, is non-binding, and that any primary-suture-wrapping section 186 can be looped around any running stitch portion, including around inner stitch portion 146 of the primary suture 144. In some embodiments, the cusp end portion 134 can be folded over itself such that the cusp edge 135 is rests over the leaflet outer surface 152 facing outward, such that the outer stitch portions 148 are concealed and the inner stitch portions 146 are facing the strut sections 111. In such embodiments, the non-penetration whip stitches can be formed in the same manner described above, except that the secondary suture is looped around the inner stitch portions 146 instead of around the outer stitch portions.

It is to be understood that various stitching configuration can be combined to attach one or more leaflets 132 to strut sections 111 of the same prosthetic valve 100. For example, attachment of a leaflet 132 along its rounded cusp end portion 134 to one or more strut section 111 can include a combination of one or more single non-penetrating whip stitches 182 passing through corresponding running stitch portions (as illustrated in FIGS. 12A-12D), together with one or more double non-penetrating whip stitches 182 passing through corresponding single running stitch portions (as illustrated in FIG. 13), and/or together with one or more single non-penetrating whip stitches 182 looped twice around the strut section 111 (as illustrated in FIG. 14). Single-pattern or combined-pattern configurations can be implemented along the same strut section 111, or around different strut section of the same valve.

Attachment of the leaflets 132 to the frame 106, and more specifically, to strut section 111 of the frame 106, by non-penetrating whip stitches 182, can advantageously improve long-term durability of the leaflets and their attachment to the frame along the scalloped line, due to the reduced damage to the leaflet material resulting from the fact that the secondary suture 170 does not need to penetrate through the tissue material.

While non-penetrating whip stitches 182, with or without junction lock-knots 174, are described and illustrated above with respect to attachment of leaflets 132 to the frame 106, such attachment configurations can be similarly utilized for attachment of other soft components of the valve 100 to the frame 106, such as skirts 123 that may include any of an inner skirt (not shown) or an outer skirt 124.

Figure 15:
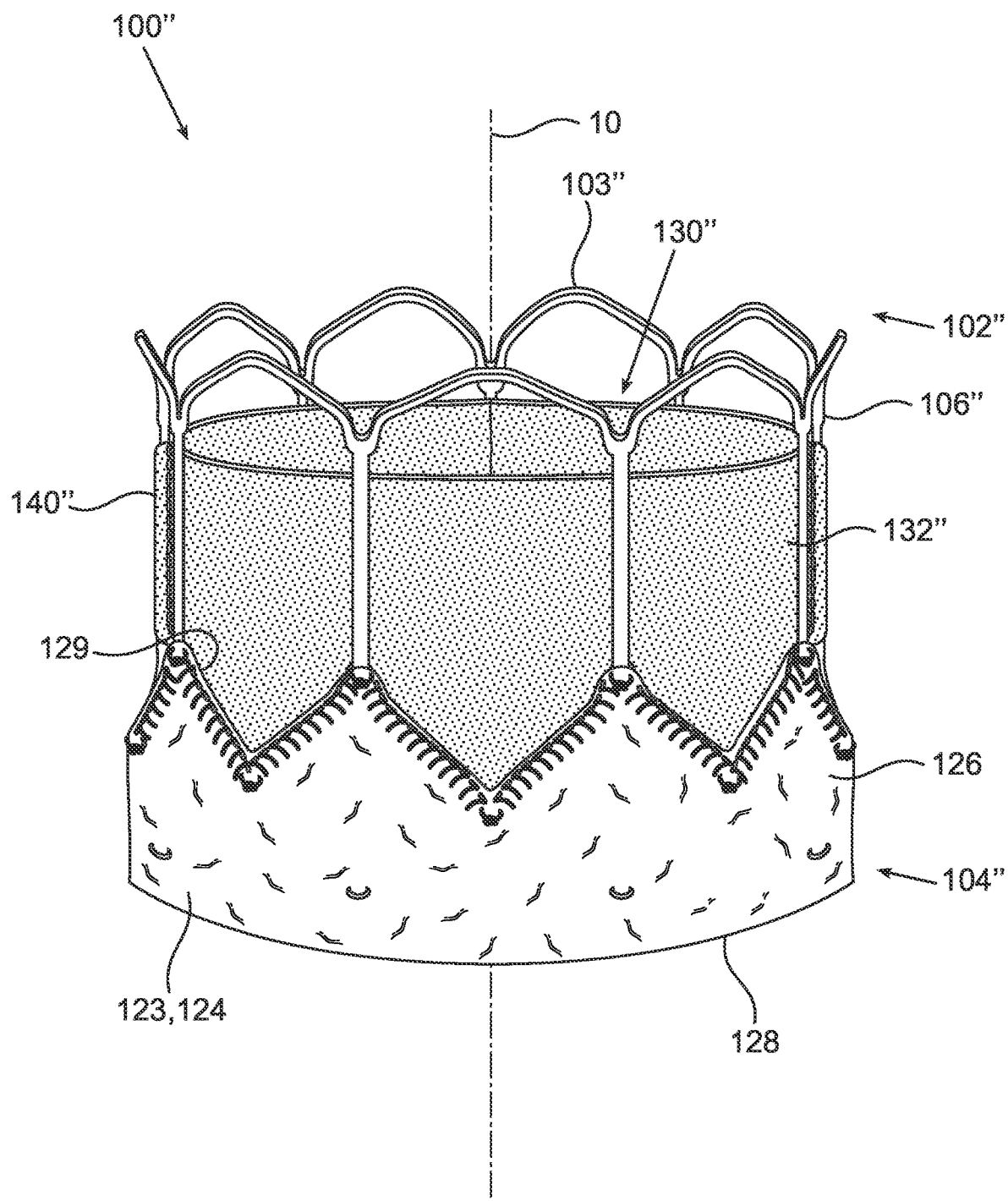
FIG. 15 shows a view in perspective of a prosthetic valve with an outer skirt, according to some embodiments.

FIG. 15 shows a prosthetic valve 100 with an outer skirt 124, according to some embodiments. The prosthetic valve can be similar in all respects to prosthetic valve 100" described in conjunction with FIG. 1B, and in the interest of brevity will not be described further. A skirt 123, such as outer skirt 124 shown in FIG. 15, extends between a skirt proximal end 128 and a skirt distal end 129, and defines a skirt inner surface 125 facing (and is at least partially in contact with) the frame 106, and an opposite skirt outer surface 126 facing away from the frame (toward the native anatomy when implanted in a patient's body).

In some embodiments, as further shown in FIG. 15, the proximal end of the outer skirt follows a zig-zag pattern, corresponding to a zig-zag pattern of strut section 111 to which it may be sutured. In the specific exemplary embodiment illustrated in FIG. 15, the skirt distal end 128 is substantially linear (for example, being straight when the skirt is flattened), meaning that it is retained at the same axial level, disposed circumferentially around the inflow end portion 104 of the valve 100.

In some embodiments, a primary suture 144 (one or more) is sutured along portions of the skirt 123 which are aligned with strut sections 111 of the frame 106 in an in-and-out pattern, and a secondary suture 170 (one or more) formed a plurality of non-penetrating whip stitches 182 to couple the skirt 123 to the strut section 111 of the frame 106.

The primary suture 144 can be stitched through the skirt 123 in an in-and-out pattern according to any of the embodiments disclosed hereinabove, mutatis mutandis. Similarly, any type of non-penetrating whip stitches 182 disclosed above with respect to attachment of leaflets 132 to struts 111, can be similarly adapted to attach the skirt 123 to struts 111 in the same manner, mutatis mutandis.

Figure 16:
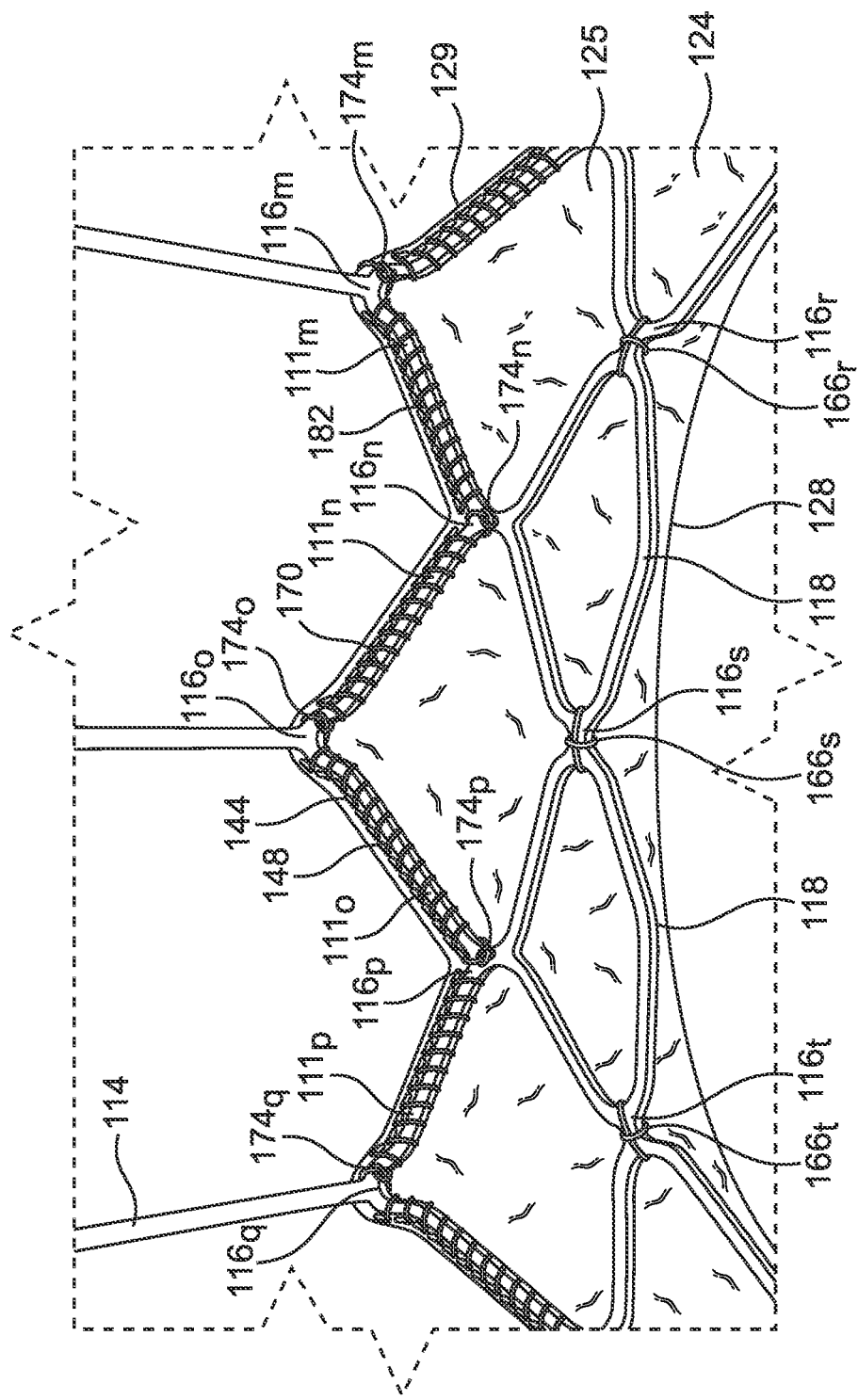
FIG. 16 shows a partial view of the prosthetic valve of FIG. 15 with the skirt coupled to a plurality of strut sections and junctions, according to some embodiments.

FIG. 16 shows a partial view or the outer skirt 124 coupled to struts 111 of the frame 106 of the valve 100 shown in FIG. 15, from a valve-internal view angle. The leaflet assembly 130 is omitted from view in FIG. 16 for simplicity. In the illustrated exemplary embodiment, a primary suture 144 is stitched in an in-and-out pattern along the skirt proximal end 129, for example tracking its zig-zagged shape. In the case of an outer skirt 124, the primary suture 144 can define a series of running stitch portions that include inner stitch portion 146, disposed over skirt inner surface 125, and outer skirt portion 148, disposed over skirt outer surface 126. A plurality of non-penetrating whip stitches 182 are then looped around strut sections 111 via strut-wrapping sections 184, and around running stitch portion of the primary suture 144, such as over and between inner stitch portions 146 and the skirt inner surface 125.

While a specific embodiment of non-penetrating whip stitches 182, similar to those described in conjunction with FIGS. 12A-D, is illustrated in FIG. 16, for example along strut sections 111*m*, 111*n*, 111*o*, and 111*p*, it is to be understood that the skirt can be sutured to the corresponding strut section 111 by implementing any of the suturing patterns and methods described above in conjunction with FIGS. 11A-14, mutatis mutandis.

In some embodiments, junction lock-knots 174 are similarly used to attach the skirt 123, such as outer skirt 124, to junctions 116 disposed between strut section 111 to which the skirt is sutured via non-penetrating whip stitches 182, such as junction lock-knots 174*m*, 174*n*, 174*o*, 174*p* and 174*q* formed over respective junctions 116*m*, 116*n*, 116*o*, 116*p* and 116*q* in the illustrated example. The configuration and methods of forming such junction lock-knots 174 is similar to that described hereinabove with respect to attachment of leaflets 132 to junction 116, mutatis mutandis.

In some embodiments, the skirt 123, such as outer skirt 124, is coupled to additional junctions 116, which are not necessarily disposed between strut section 111 around which non-penetrating whip stitches 182 extend, via additional knots, which are not necessarily the junction lock-knots 172 but may be implemented as other knots known in the art, as schematically shown in FIG. 16 for knots 166*r*, 166*s* and 166*t* around respective junctions 116*r*, 116*s* and 116*t*, for example.

Figure 17:
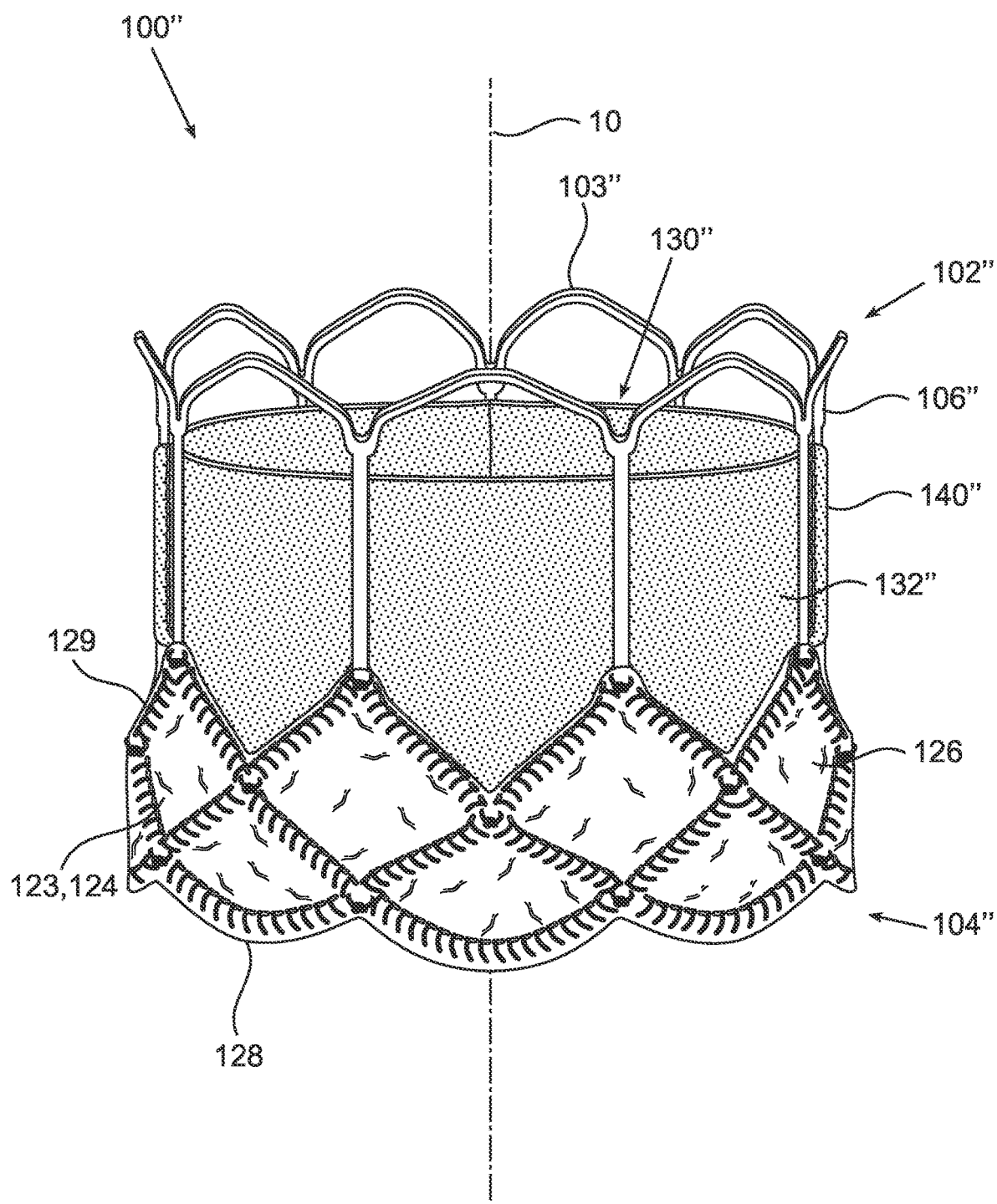
FIG. 17 shows a view in perspective of another exemplary prosthetic valve with an outer skirt, according to some embodiments.

FIG. 17 shows another valve 100 comprising an outer skirt 124 that can be similar to the valve and skirt of FIG. 15, except that the skirt distal end 128 is not linear but rather tracks the shape of the strut sections 111 along the inflow end portion 104 of the valve, which can be undulated or arc-shaped as illustrated in FIG. 17, or can otherwise be zig-zagged or otherwise shaped to follow other paths defines by distal strut sections of the valve.

Figure 18:
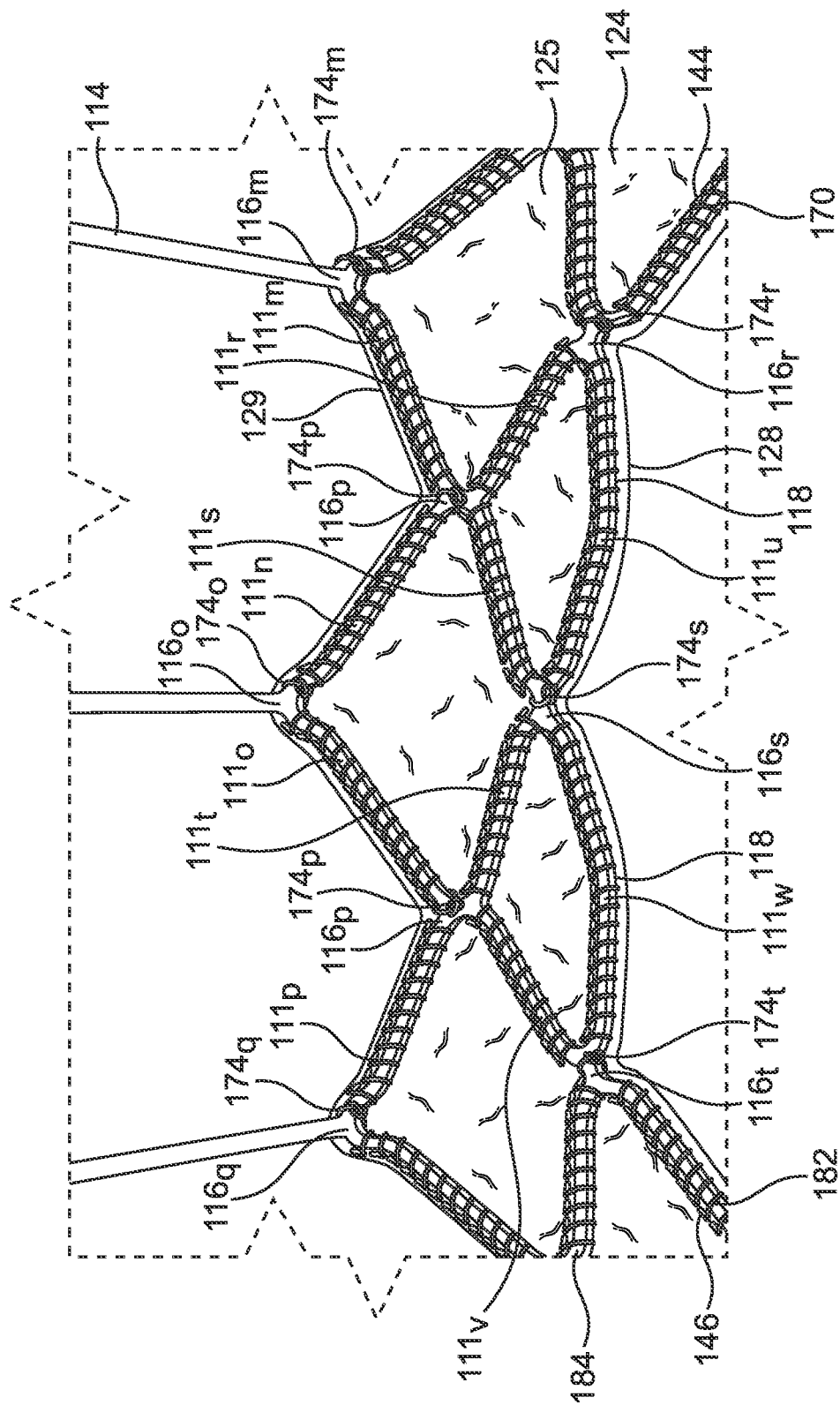
FIG. 18 shows a partial view of the prosthetic valve of FIG. 17 with the skirt coupled to a plurality of strut sections and junctions, according to some embodiments.

FIG. 18 shows a partial view or the outer skirt 124 coupled to struts 111 of the frame 106 of the valve 100 shown in FIG. 17, from valve-bottom-internal view angle. The leaflet assembly 130 is omitted from view in FIG. 18 for simplicity. In the illustrated exemplary embodiment, a primary suture 144 is stitched in an in-and-out pattern along the skirt distal end 129, for example tracking its undulating shape. This can be in addition to the primary suture 144 stitched along the skirt proximal end 129, implemented in the same manner described above.

A plurality of non-penetrating whip stitches 182 are then looped around the strut sections 111 (of the inflow end portion 104) by a series of strut-wrapping sections 184, and around running stitch portion of the primary suture 144, such as over and between inner stitch portions 146 and the skirt inner surface 125. While a specific embodiment of non-penetrating whip stitches 182, similar to those described in conjunction with FIGS. 12A-D, is illustrated in FIG. 18, for example along strut sections 111*u* and 111*w*, it is to be understood that the skirt can be sutured to the corresponding strut section 111 by implementing any of the suturing patterns and methods described above in conjunction with FIGS. 11A-14, mutatis mutandis.

In some embodiments, junction lock-knots 174 are similarly used to attach the outer skirt 124 to junctions 116 along the inflow end portion 104, such as junction lock-knots 174*r*, 174*s* and 174*t* formed around respective junctions 116*r*, 116*s* and 116*t* in the illustrated example, following the same configuration and methods described hereinabove with respect to attachment of leaflets 132 to junction 116, mutatis mutandis.

In some embodiments, the skirt 123, such as outer skirt 124, is attached to additional strut sections 111 disposed between the skirt proximal end 129 and skirt distal end 128 via non-penetrating whip stitches 182 in the same manner and according to all optional embodiments described above. For example, primary suture 144 (one or more) can be sutured in an in-and-out pattern along regions of the skirt aligned with strut sections 111 disposed between the skirt proximal end 129 and skirt distal end 128 (when the skirt is attached to the frame), implemented according to any embodiments of stitching such primary suture 144 described above. A series of non-penetrating whip stitches 182, implemented according to any of the embodiments described above with respect to FIGS. 11A-14, can be utilized to attached the skirt to the corresponding strut section 111, as shown for example in FIG. 18 along strut sections 111*r*, 111*s*, 111*t* and 111*v*.

In some embodiments, the skirt 123, such as outer skirt 124, is attached to additional junctions 116 disposed between the skirt proximal end 129 and skirt distal end 128 via junction lock-knots 174 in the same manner and according to all optional embodiments described above.

Some valve are provided with an inner skirt (not shown) disposed around the inner surface of the frame. While outer skirts 124 are illustrated for demonstrating various attachment configurations thereof to the frames throughout FIGS. 15-18, it is to be understood that the same embodiments described above with respect to outer skirt attachment, may be implemented in a similar manner for attachment of inner skirts to the frame, mutatis mutandis.

In some embodiments, junction lock-knots 174 can be utilized for attachment of a skirt 123 (including any of an inner skirt or an outer skirt) to junctions 116 along any of the skirt proximal end 129, skirt distal end 128, and/or to junctions 116 disposed between the skirt proximal end 129 and skirt distal end 128 (when the skirt is attached to the frame), without the use of non-penetrating whip stitches 182 around strut sections 111.

For example, a skirt can be sutured to corresponding strut sections 111 along any of the skirt proximal end 129, skirt distal end 128, and/or to strut sections 111 disposed between the skirt proximal end 129 and skirt distal end 128 (when the skirt is attached to the frame) via a series of whip stitches 172 that can penetrate through the primary suture 144, with junction lock-knots 174 formed around junction 116 disposed between such strut sections 111, in the same manner and following similar methods described above in FIGS. 10A-11 for attachment of leaflets 132 to the frame 106, mutatis mutandis.

Additional Examples of the Disclosed Technology

In view of the above described implementations of the disclosed subject matter, this application discloses the additional examples enumerated below. It should be noted that one feature of an example in isolation or more than one feature of the example taken in combination and, optionally, in combination with one or more features of one or more further examples are further examples also falling within the disclosure of this application.

Example 1. A prosthetic valve comprising:
 a frame movable between a radially compressed configuration and a radially expanded configuration, wherein the frame comprises a plurality of intersecting struts, and
 a leaflet assembly mounted within the frame and comprising a plurality of leaflets configured to regulate flow through the prosthetic valve, wherein each leaflet comprises a rounded cusp end portion defining a cusp edge, a free edge opposite to the cusp edge, and a pair of oppositely-directed tabs separating the cusp edge and the free edge;

wherein each cusp end portion is coupled to at least one strut via at least one primary suture threaded at penetration points therethrough in an in-and-out pattern, and a secondary suture threaded through the primary suture and around at least one section of at least one strut, wherein the secondary suture comprises a plurality of self-tightening constructs, and wherein each self-tightening construct comprises at least one loop configured to constrict under tension around the strut.

Example 2. The prosthetic valve of any example herein, particularly example 1, wherein the at least one loop of each self-tightening construct comprises two loops.

Example 3. The prosthetic valve of any example herein, particularly any one of examples 1 or 2, wherein each self-tightening construct further comprises a u-shaped section partially extending between the at least one loop and the strut.

Example 4. The prosthetic valve of any example herein, particularly any one of examples 1 to 3, wherein the leaflet comprises a leaflet inner surface and a leaflet outer surface, and wherein the primary suture comprises a plurality of inner stitch portions disposed along the leaflet inner surface, and plurality of outer stitch portions disposed along the leaflet outer surface, each inner stitch portion and each outer stitch portion defined between respective penetration points.

Example 5. The prosthetic valve of any example herein, particularly example 4, wherein the self-tightening construct is defined between two penetrations points that define at least one outer stitch portion there-between.

Example 6. The prosthetic valve of any example herein, particularly any one of examples 4 or 5, wherein the secondary suture further comprises a plurality of suture pull portions extending over the leaflet inner surface.

Example 7. The prosthetic valve of any example herein, particularly example 6, wherein at least one of the suture pull portions spans over more than one inner or outer stitch portions.

Example 8. The prosthetic valve of any example herein, particularly any one of examples 6 or 7, wherein the suture pull portions are pressed against portions of the at least one primary suture.

Example 9. The prosthetic valve of any example herein, particularly any one of examples 1 to 8, wherein the diameter of the secondary suture is smaller than the diameter of the primary suture.

Example 10. The prosthetic valve of any example herein, particularly example 9, wherein a secondary to primary sutures diameter ratio is equal to or smaller than 0.8.

Example 11. The prosthetic valve of any example herein, particularly example 9, wherein a secondary to primary sutures diameter ratio is equal to or smaller than 0.5.

Example 12. The prosthetic valve of any example herein, particularly example 9, wherein a secondary to primary sutures diameter ratio is equal to or smaller than 0.3.

Example 13. The prosthetic valve of any example herein, particularly any one of examples 1 to 12, wherein the cusp end portion of each leaflet comprises a series of pre-formed apertures.

Example 14. The prosthetic valve of any example herein, particularly example 13, wherein the apertures are dimensioned to accept the at least one primary suture, thereby serving as the penetration points.

Example 15. The prosthetic valve of any example herein, particularly any one of examples 13 or 14, wherein the apertures are equally spaced from each other.

Example 16. The prosthetic valve of any example herein, particularly any one of examples 13 to 15, wherein the diameter of the apertures is equal to or smaller than the diameter of the primary suture.

Example 17. The prosthetic valve of any example herein, particularly any one of examples 13 to 15, wherein the diameter of the apertures is equal to or smaller than the combined diameters of the primary suture and the secondary suture.

Example 18. The prosthetic valve of any example herein, particularly any one of examples 1 to 17, wherein the secondary suture is threaded through all successive penetration points.

Example 19. The prosthetic valve of any example herein, particularly any one of examples 1 to 18, wherein the at least one primary suture comprises two primary sutures, which are inversely threaded in an in-and-out pattern, through the same penetration points.

Example 20. The prosthetic valve of any example herein, particularly any one of examples 13 to 15, wherein the diameter of the apertures is equal to or smaller than the diameter of the two primary sutures.

Example 21. The prosthetic valve of any example herein, particularly example 20, wherein the diameter of the apertures is equal to or smaller than the combined diameters of the two primary sutures and the secondary suture.

Example 22. The prosthetic valve of any example herein, particularly any one of examples 1 to 21, wherein the at least one primary suture tracks the curvature of the at least one cusp edge.

Example 23. The prosthetic valve of any example herein, particularly any one of examples 1 to 22, wherein the primary suture comprises a multi-filament suture.

Example 24. The prosthetic valve of any example herein, particularly any one of examples 1 to 23, wherein the secondary suture comprises an ultra-high-molecular-weight polyethylene.

Example 25. The prosthetic valve of any example herein, particularly any one of examples 1 to 24, wherein the prosthetic valve is devoid of fabric strips and/or cloth between the cusp end portions of the leaflets and the struts they are attached to.

Example 26. A method of assembling a prosthetic valve, the method comprising steps of:
threading a primary suture in an in-and-out pattern through a cusp end portion of a leaflet;
approximating the cusp end portion with the primary suture threaded there-through to at least one strut of a frame of the prosthetic valve; and
stitching a secondary suture through the primary suture and around the at least one strut, in a manner that forms a plurality of self-tightening constructs, wherein each self-tightening construct is formed to comprise at least one loop configured to constrict under tension around the strut.

Example 27. The method of any example herein, particularly example 26, wherein the step of stitching a secondary suture includes threading the secondary suture radially outward through the primary suture at a penetration point, thereby forming the at least one loop around the at least one strut.

Example 28. The method of any example herein, particularly example 27, wherein the step of stitching a secondary suture comprises looping the secondary suture again around the at least one strut after forming a first loop, thereby forming two loops for each self-tightening construct.

Example 29. The method of any example herein, particularly any one of examples 26 to 28, wherein the step of stitching a secondary suture comprises passing the secondary suture under the at least one loop, between the at least one loop and the at least one strut, to form a u-shaped section.

Example 30. The prosthetic valve of any example herein, particularly any one of examples 26 to 29, further comprising a step of extending the secondary suture over a leaflet inner surface, and then threading the secondary suture once again through the primary suture in a radially-outward direction, thereby forming at least one suture pull portion extending over the leaflet inner surface.

Example 31. The prosthetic valve of any example herein, particularly any one of examples 26 to 30, wherein the cusp end portion of each leaflet comprises a series of pre-formed apertures, and wherein the step of threading a primary suture comprises threading the primary suture in an in-and-out pattern through the series of pre-formed apertures.

Example 32. A prosthetic valve comprising:
a frame movable between a radially compressed configuration and a radially expanded configuration, wherein the frame comprises a plurality of strut sections intersecting at junctions, and
a leaflet assembly mounted within the frame and comprising a plurality of leaflets configured to regulate flow through the prosthetic valve, wherein each leaflet comprises a rounded cusp end portion defining a cusp edge, a free edge opposite to the cusp edge, and a pair of oppositely-directed tabs separating the cusp edge and the free edge;
wherein each junction is defined between: two opposite axial sides comprising a junction proximal side and a junction distal side; two opposite radial sides comprising a junction inner side and a junction outer side; and two opposite lateral sides comprising a junction first lateral side and a junction second lateral side;
wherein each cusp end portion is coupled to at least one strut section via at least one primary suture threaded at penetration points therethrough in an in-and-out pattern, and a secondary suture threaded through the primary suture and wrapped around the strut section in a series of whip stitches spaced from each other along the length of the strut section;
wherein the cusp end portion is further coupled to at least one junction at an end of the strut section via a junction lock-knot formed by the second suture, and wherein the junction lock-knot is configured to maintain tension on the plurality of the whip stitches wrapped around the corresponding strut section leading to the junction first lateral section.

Example 33. The prosthetic valve of any example herein, particularly example 32, wherein each junction lock-knot comprises:
a transition section extending over one axial side of the junction, in a direction from the junction first lateral side to the junction second lateral side;
a first loop extending from the transition section and around a strut section extending from the junction second lateral side; and
a second loop extending from the first loop, between the transition section and the junction, and folded over itself to extend through the first loop.

Example 34. The prosthetic valve of any example herein, particularly example 33, wherein the transition section extends in a diagonal direction from one radial side of the junction toward the opposite radial side of the junction, as well as from one lateral side of the junction to the opposite lateral side of the junction.

Example 35. The prosthetic valve of any example herein, particularly any one of examples 33 or 34, wherein both the first loop and the second loop are tightly tensioned around the junction.

Example 36. The prosthetic valve of any example herein, particularly any one of examples 32 to 35, wherein each plurality of whip stitches wrapped around a single strut section are angled whip stitches, oriented in the same direction along the length of the corresponding strut section.

Example 37. The prosthetic valve of any example herein, particularly example 36, wherein the cusp end portion is sutured to at least two strut sections extending from both lateral sides of a selected junction, via a plurality of whip stitches wrapped around each of the respective strut sections and a junction lock-knot around the junction positioned there-between, and wherein the plurality of whip stitches around one of the strut sections are angled in a direction opposite to that of the plurality of the whip stitches wrapped around the other strut section.

Example 38. The prosthetic valve of any example herein, particularly any one of examples 32 to 37, wherein the diameter of the secondary suture is smaller than the diameter of the primary suture.

Example 39. The prosthetic valve of any example herein, particularly example 38, wherein a secondary to primary sutures diameter ratio is equal to or smaller than 0.8.

Example 40. The prosthetic valve of any example herein, particularly example 38, wherein a secondary to primary sutures diameter ratio is equal to or smaller than 0.5.

Example 41. The prosthetic valve of any example herein, particularly example 38, wherein a secondary to primary sutures diameter ratio is equal to or smaller than 0.3.

Example 42. The prosthetic valve of any example herein, particularly any one of examples 32 to 41, wherein the cusp end portion of each leaflet comprises a series of pre-formed apertures.

Example 43. The prosthetic valve of any example herein, particularly example 42, wherein the apertures are dimensioned to accept the at least one primary suture, thereby serving as the penetration points.

Example 44. The prosthetic valve of any example herein, particularly any one of examples 42 or 43, wherein the apertures are equally spaced from each other.

Example 45. The prosthetic valve of any example herein, particularly any one of examples 42 to 44, wherein the diameter of the apertures is equal to or smaller than the diameter of the primary suture.

Example 46. The prosthetic valve of any example herein, particularly any one of examples 42 to 44, wherein the diameter of the apertures is equal to or smaller than the combined diameters of the primary suture and the secondary suture.

Example 47. The prosthetic valve of any example herein, particularly any one of examples 32 to 46, wherein the at least one primary suture comprises two primary sutures, which are inversely threaded in an in-and-out pattern, through the same penetration points.

Example 48. The prosthetic valve of any example herein, particularly any one of examples 42 to 44, wherein the diameter of the apertures is equal to or smaller than the diameter of the two primary sutures.

Example 49. The prosthetic valve of any example herein, particularly example 48, wherein the diameter of the apertures is equal to or smaller than the combined diameters of the two primary sutures and the secondary suture.

Example 50. The prosthetic valve of any example herein, particularly any one of examples 32 to 49, wherein the at least one primary suture tracks the curvature of the at least one cusp edge.

Example 51. The prosthetic valve of any example herein, particularly any one of examples 32 to 50, wherein the primary suture comprises a multi-filament suture.

Example 52. The prosthetic valve of any example herein, particularly any one of examples 32 to 51, wherein the secondary suture comprises an ultra-high-molecular-weight polyethylene.

Example 53. The prosthetic valve of any example herein, particularly any one of examples 32 to 52, wherein the prosthetic valve is devoid of fabric strips and/or cloth between the cusp end portions of the leaflets and the strut sections and junctions they are attached to.

Example 54. A method of assembling a prosthetic valve, the method comprising steps of:
  threading a primary suture in an in-and-out pattern through a cusp end portion of a leaflet;
  approximating the cusp end portion with the primary suture threaded there-through to at least one strut section of a frame of the prosthetic valve;
  stitching a secondary suture through the primary suture and around the at least one strut section, in a manner that forms a plurality of whip stitches wrapped around the strut section up to a final whip stitch; and
  forming a junction lock-knot extending from the final whip stitch around a junction at a respective end of the corresponding strut section, wherein the junction lock-knot is configured to maintain tension on the plurality of whip stitches wrapped around the strut section leading to the junction first lateral section.

Example 55. The method of any example herein, particularly example 54, wherein the step of forming a junction lock-knot comprises extending the secondary suture from the final whip stitch disposed at a first lateral side of the junction, over one axial side of the junction, in a direction toward a second lateral side of the junction, thereby forming a transition section of the junction lock-knot.

Example 56. The method of any example herein, particularly example 55, wherein the step of forming a junction lock-knot further comprises extending the secondary suture from the transition section around a strut section extending from the second lateral side of the junction, thereby forming a first loop of the junction lock-knot.

Example 57. The method of any example herein, particularly example 56, wherein the step of forming a junction lock-knot further comprises extending the secondary suture from the first loop, between the transition section and the junction, folding the secondary suture back over itself and passing it through the first loop, thereby forming a second loop of the junction lock-knot.

Example 58. The method of any example herein, particularly example 57, wherein the step of forming a junction lock-knot further comprises forcibly pulling the tail of the second loop to tighten both the first loop and the second loop around the junction.

Example 59. The method of any example herein, particularly any one of examples 55 to 58, wherein forming the transition section comprises extending the secondary suture in a diagonal direction from one radial side of the junction toward an opposite radial side of the junction, as well as from one lateral side of the junction to the opposite lateral side of the junction.

Example 60. The method of any example herein, particularly any one of examples 54 to 59, wherein forming the plurality of whip stitches around any single strut section comprises forming a plurality of angled whip stitches oriented in the same direction around the length of the corresponding strut section.

Example 61. The method of any example herein, particularly example 60, wherein stitching the secondary suture around the at least one strut section comprises stitching around at least two strut sections separated from each other by a mutual junction, such that all whip stitches around one of the strut sections are formed as angled whip stitches oriented in one direction, while all whip stitches around the other strut section are formed as angled whip stitched oriented in a second direction, opposite to the first direction.

Example 62. The method of any example herein, particularly any one of examples 54 to 61, wherein the cusp end portion of each leaflet comprises a series of pre-formed apertures, and wherein the step of threading a primary suture comprises threading the primary suture in an in-and-out pattern through the series of pre-formed apertures.

Example 63. A prosthetic valve comprising:
  a frame movable between a radially compressed configuration and a radially expanded configuration, wherein the frame comprises a plurality of strut sections intersecting at junctions, and
  a leaflet assembly mounted within the frame and comprising a plurality of leaflets configured to regulate flow through the prosthetic valve, wherein each leaflet comprises a rounded cusp end portion defining a cusp edge, a free edge opposite to the cusp edge, and a pair of oppositely-directed tabs separating the cusp edge and the free edge;
  wherein each cusp end portion is coupled to at least one strut section via at least one primary suture threaded therethrough in an in-and-out pattern, and a secondary suture forming a series of non-penetrating whip stitches spaced from each other along the length of the strut section, each non-penetrating whip stitch comprising a strut-wrapping section looped around the strut section and a primary-suture-wrapping section extending therefrom, looped around the primary suture and passing between the primary suture and the leaflet.

Example 64. The prosthetic valve of any example herein, particularly example 63, wherein the primary suture defines a series of running stitch portions, and wherein each primary-suture-wrapping section is looped around a corresponding running stitch portion and extends between the running stitch portion and the rounded cusp end portion.

Example 65. The prosthetic valve of any example herein, particularly any one of examples 63 or 64, wherein the secondary suture does not penetrate through the leaflet.

Example 66. The prosthetic valve of any example herein, particularly any one of examples 63 to 65, wherein the secondary suture does not penetrate through the primary suture.

Example 67. The prosthetic valve of any example herein, particularly any one of examples 63 to 66, wherein each junction is defined between: two opposite axial sides comprising a junction proximal side and a junction distal side; two opposite radial sides comprising a junction inner side and a junction outer side; and two opposite lateral sides comprising a junction first lateral side and a junction second lateral side; wherein the cusp end portion is further coupled to at least one junction at an end of the strut section via a junction lock-knot formed by the second suture, and wherein the junction lock-knot is configured to maintain tension on the plurality of the non-penetrating whip stitches wrapped around the corresponding strut section leading to the junction first lateral section.

Example 68. The prosthetic valve of any example herein, particularly example 67, wherein each junction lock-knot comprises:
  a transition section extending over one axial side of the junction, in a direction from the junction first lateral side to the junction second lateral side;
  a first loop extending from the transition section and around a strut section extending from the junction second lateral side; and
  a second loop extending from the first loop, between the transition section and the junction, and folded over itself to extend through the first loop.

Example 69. The prosthetic valve of any example herein, particularly example 68, wherein the transition section extends in a diagonal direction from one radial side of the junction toward the opposite radial side of the junction, as well as from one lateral side of the junction to the opposite lateral side of the junction.

Example 70. The prosthetic valve of any example herein, particularly any one of examples 68 or 69, wherein both the first loop and the second loop are tightly tensioned around the junction.

Example 71. The prosthetic valve of any example herein, particularly any one of examples 67 to 70, wherein each plurality of non-penetrating whip stitches wrapped around a single strut section are angled non-penetrating whip stitches, oriented in the same direction along the length of the corresponding strut section.

Example 72. The prosthetic valve of any example herein, particularly example 71, wherein the cusp end portion is sutured to at least two strut sections extending from both lateral sides of a selected junction, via a plurality of non-penetrating whip stitches wrapped around each of the respective strut sections and a junction lock-knot around the junction positioned there-between, and wherein the plurality of non-penetrating whip stitches around one of the strut sections are angled in a direction opposite to that of the plurality of the non-penetrating whip stitches wrapped around the other strut section.

Example 73. The prosthetic valve of any example herein, particularly any one of examples 63 to 72, wherein the at least one primary suture comprises two primary sutures, which are inversely threaded in an in-and-out pattern.

Example 74. The prosthetic valve of any example herein, particularly any one of examples 63 to 73, wherein the at least one primary suture tracks the curvature of the at least one cusp edge.

Example 75. The prosthetic valve of any example herein, particularly any one of examples 63 to 74, wherein the primary suture comprises a multi-filament suture.

Example 76. The prosthetic valve of any example herein, particularly any one of examples 63 to 75, wherein the secondary suture comprises an ultra-high-molecular-weight polyethylene.

Example 77. The prosthetic valve of any example herein, particularly any one of examples 63 to 76, wherein the prosthetic valve is devoid of fabric strips and/or cloth between the cusp end portions of the leaflets and the strut sections they are attached to.

Example 78. A method of assembling a prosthetic valve, the method comprising steps of:
  threading a primary suture in an in-and-out pattern through a cusp end portion of a leaflet;
  approximating the cusp end portion with the primary suture threaded there-through to at least one strut section of a frame of the prosthetic valve; and
  looping a secondary suture around the at least one strut section and around the primary suture, in a manner that forms a plurality of non-penetrating whip stitches wrapped around the strut section up to a final non-penetrating whip stitch, each non-penetrating whip stitch comprising a strut-wrapping section looped around the strut section and a primary-suture-wrapping section extending therefrom, passing between the primary suture and the leaflet and looped around the primary suture.

Example 79. The method of any example herein, particularly example 78, wherein forming each non-penetration whip stitch comprises forming the strut-wrapping section by: extending the secondary suture across one radial side of the strut section, folding it over an axial side of the strut section, and extending it backward across the opposite radial side of the strut section.

Example 80. The method of any example herein, particularly example 79, wherein forming each non-penetration whip stitch further comprises forming the primary-suture-wrapping section by: passing the secondary suture between a running stitch portion of the primary suture and the cusp end portion of the leaflet, and folding it over the running stitch portion.

Example 81. The method of any example herein, particularly example 79, wherein forming each non-penetration whip stitch further comprises forming the primary-suture-wrapping section by: passing the secondary suture over a running stitch portion of the primary suture, and looping it back over the running stitch portion and between the running stitch portion and the cusp end portion of the leaflet.

Example 82. The method of any example herein, particularly any one of examples 80 or 81, wherein the running stitch portion is an outer stitch portion of the primary suture.

Example 83. The method of any example herein, particularly any one of examples 78 to 82, further comprising a step of forming a junction lock-knot extending from the final non-penetrating whip stitch around a junction at a respective end of the corresponding strut section, wherein the junction lock-knot is configured to maintain tension on the plurality of non-penetrating whip stitches wrapped around the strut section leading to the junction first lateral section.

Example 84. The method of any example herein, particularly example 83, wherein the step of forming a junction lock-knot comprises extending the secondary suture from the final non-penetrating whip stitch disposed at a first lateral side of the junction, over one axial side of the junction, in a direction toward a second lateral side of the junction, thereby forming a transition section of the junction lock-knot.

Example 85. The method of any example herein, particularly example 84, wherein the step of forming a junction lock-knot further comprises extending the secondary suture from the transition section around a strut section extending from the second lateral side of the junction, thereby forming a first loop of the junction lock-knot.

Example 86. The method of any example herein, particularly example 85, wherein the step of forming a junction lock-knot further comprises extending the secondary suture from the first loop, between the transition section and the junction, folding the secondary suture back over itself and passing it through the first loop, thereby forming a second loop of the junction lock-knot.

Example 87. The method of any example herein, particularly example 86, wherein the step of forming a junction lock-knot further comprises forcibly pulling the tail of the second loop to tighten both the first loop and the second loop around the junction.

Example 88. The method of any example herein, particularly any one of examples 84 to 87, wherein forming the transition section comprises extending the secondary suture in a diagonal direction from one radial side of the junction toward an opposite radial side of the junction, as well as from one lateral side of the junction to the opposite lateral side of the junction.

Example 89. The method of any example herein, particularly any one of examples 83 to 88, wherein forming the plurality of whip stitches around any single strut section comprises forming a plurality of angled whip stitches oriented in the same direction around the length of the corresponding strut section.

Example 90. The method of any example herein, particularly example 89, wherein forming the plurality of whip stitches around the at least one strut section comprises forming a plurality of whip stitches around at least two strut sections separated from each other by a mutual junction, such that all whip stitches around one of the strut sections are formed as angled whip stitches oriented in one direction, while all whip stitches around the other strut section are formed as angled whip stitched oriented in a second direction, opposite to the first direction.

Example 91. A prosthetic valve comprising:
a frame movable between a radially compressed configuration and a radially expanded configuration, wherein the frame comprises a plurality of strut sections intersecting at junctions;
a leaflet assembly mounted within the frame and comprising a plurality of leaflets configured to regulate flow through the prosthetic valve; and
a skirt disposed around the frame, the skirt comprising a skirt proximal end and a skirt distal end;
wherein each junction is defined between: two opposite axial sides comprising a junction proximal side and a junction distal side; two opposite radial sides comprising a junction inner side and a junction outer side; and two opposite lateral sides comprising a junction first lateral side and a junction second lateral side;
wherein the skirt proximal end is coupled to at least one strut section via at least one primary suture threaded at penetration points therethrough in an in-and-out pattern, and a secondary suture threaded through the primary suture and wrapped around the strut section in a series of whip stitches spaced from each other along the length of the strut section;
wherein the skirt proximal end is further coupled to at least one junction at an end of the strut section via a junction lock-knot formed by the second suture, and wherein the junction lock-knot is configured to maintain tension on the plurality of the whip stitches wrapped around the corresponding strut section leading to the junction first lateral section.

Example 92. The prosthetic valve of any example herein, particularly example 91, wherein the skirt proximal end follows a zig-zag pattern.

Example 93. The prosthetic valve of any example herein, particularly example 92, wherein the at least one primary suture tracks the zig-zag pattern of the skirt proximal end.

Example 94. The prosthetic valve of any example herein, particularly any one of examples 91 to 93, wherein each junction lock-knot comprises:
a transition section extending over one axial side of the junction, in a direction from the junction first lateral side to the junction second lateral side;
a first loop extending from the transition section and around a strut section extending from the junction second lateral side; and
a second loop extending from the first loop, between the transition section and the junction, and folded over itself to extend through the first loop.

Example 95. The prosthetic valve of any example herein, particularly example 94, wherein the transition section extends in a diagonal direction from one radial side of the junction toward the opposite radial side of the junction, as well as from one lateral side of the junction to the opposite lateral side of the junction.

Example 96. The prosthetic valve of any example herein, particularly any one of examples 94 or 95, wherein both the first loop and the second loop are tightly tensioned around the junction.

Example 97. The prosthetic valve of any example herein, particularly any one of examples 91 to 96, wherein each plurality of whip stitches wrapped around a single strut section are angled whip stitches, oriented in the same direction along the length of the corresponding strut section.

Example 98. The prosthetic valve of any example herein, particularly example 97, wherein the skirt proximal end is sutured to at least two strut sections extending from both lateral sides of a selected junction, via a plurality of whip stitches wrapped around each of the respective strut sections and a junction lock-knot around the junction positioned there-between, and wherein the plurality of whip stitches around one of the strut sections are angled in a direction opposite to that of the plurality of the whip stitches wrapped around the other strut section.

Example 99. The prosthetic valve of any example herein, particularly any one of examples 91 to 98, wherein the skirt distal end is coupled to at least one strut section at an inflow end portion of the valve via at least one additional primary suture threaded at penetration points therethrough in an in-and-out pattern, and an additional secondary suture threaded through the primary suture and wrapped around the strut section at the inflow end portion in a series of whip stitches spaced from each other along the length of the strut section, and wherein the skirt distal end is further coupled to at least one junction at an end of the strut section at the inflow end portion via an additional junction lock-knot.

Example 100. The prosthetic valve of any example herein, particularly example 99, wherein the additional primary suture tracks the shape of the strut sections disposed around the inflow end portion.

Example 101. The prosthetic valve of any example herein, particularly any one of examples 91 to 100, wherein the diameter of the secondary suture is smaller than the diameter of the primary suture.

Example 102. The prosthetic valve of any example herein, particularly example 101, wherein a secondary to primary sutures diameter ratio is equal to or smaller than 0.8.

Example 103. The prosthetic valve of any example herein, particularly example 101, wherein a secondary to primary sutures diameter ratio is equal to or smaller than 0.5.

Example 104. The prosthetic valve of any example herein, particularly example 101, wherein a secondary to primary sutures diameter ratio is equal to or smaller than 0.3.

Example 105. The prosthetic valve of any example herein, particularly any one of examples 91 to 104, wherein the skirt proximal end comprises a series of pre-formed apertures.

Example 106. The prosthetic valve of any example herein, particularly example 105, wherein the apertures are dimensioned to accept the at least one primary suture, thereby serving as the penetration points.

Example 107. The prosthetic valve of any example herein, particularly any one of examples 105 or 106, wherein the apertures are equally spaced from each other.

Example 108. The prosthetic valve of any example herein, particularly any one of examples 105 to 107, wherein the diameter of the apertures is equal to or smaller than the diameter of the primary suture.

Example 109. The prosthetic valve of any example herein, particularly any one of examples 105 to 107, wherein the diameter of the apertures is equal to or smaller than the combined diameters of the primary suture and the secondary suture.

Example 110. The prosthetic valve of any example herein, particularly any one of examples 91 to 109, wherein the at least one primary suture comprises two primary sutures, which are inversely threaded in an in-and-out pattern, through the same penetration points.

Example 111. The prosthetic valve of any example herein, particularly any one of examples 105 to 107, wherein the diameter of the apertures is equal to or smaller than the diameter of the two primary sutures.

Example 112. The prosthetic valve of any example herein, particularly example 111, wherein the diameter of the apertures is equal to or smaller than the combined diameters of the two primary sutures and the secondary suture.

Example 113. The prosthetic valve of any example herein, particularly any one of examples 91 to 112, wherein the primary suture comprises a multi-filament suture.

Example 114. The prosthetic valve of any example herein, particularly any one of examples 91 to 113, wherein the secondary suture comprises an ultra-high-molecular-weight polyethylene.

Example 115. The prosthetic valve of any example herein, particularly any one of examples 91 to 114, wherein the skirt is an outer skirt, disposed around an outer surface of the frame.

Example 116. A method of assembling a prosthetic valve, the method comprising steps of:
threading a primary suture in an in-and-out pattern through a skirt proximal end of a skirt;
approximating the skirt proximal end with the primary suture threaded there-through to at least one strut section of a frame of the prosthetic valve;
stitching a secondary suture through the primary suture and around the at least one strut section, in a manner that forms a plurality of whip stitches wrapped around the strut section up to a final whip stitch; and
forming a junction lock-knot extending from the final whip stitch around a junction at a respective end of the corresponding strut section, wherein the junction lock-knot is configured to maintain tension on the plurality of whip stitches wrapped around the strut section leading to the junction first lateral section.

Example 117. The method of any example herein, particularly example 116, wherein the step of forming a junction lock-knot comprises extending the secondary suture from the final whip stitch disposed at a first lateral side of the junction, over one axial side of the junction, in a direction toward a second lateral side of the junction, thereby forming a transition section of the junction lock-knot.

Example 118. The method of any example herein, particularly example 117, wherein the step of forming a junction lock-knot further comprises extending the secondary suture from the transition section around a strut section extending from the second lateral side of the junction, thereby forming a first loop of the junction lock-knot.

Example 119. The method of any example herein, particularly example 118, wherein the step of forming a junction lock-knot further comprises extending the secondary suture from the first loop, between the transition section and the junction, folding the secondary suture back over itself and passing it through the first loop, thereby forming a second loop of the junction lock-knot.

Example 120. The method of any example herein, particularly example 119, wherein the step of forming a junction lock-knot further comprises forcibly pulling the tail of the second loop to tighten both the first loop and the second loop around the junction.

Example 121. The method of any example herein, particularly any one of examples 117 to 120, wherein forming the transition section comprises extending the secondary suture in a diagonal direction from one radial side of the junction toward an opposite radial side of the junction, as well as from one lateral side of the junction to the opposite lateral side of the junction.

Example 122. The method of any example herein, particularly any one of examples 116 to 121, wherein forming the plurality of whip stitches around any single strut section comprises forming a plurality of angled whip stitches oriented in the same direction around the length of the corresponding strut section.

Example 123. The method of any example herein, particularly example 122, wherein stitching the secondary suture around the at least one strut section comprises stitching around at least two strut sections separated from each other by a mutual junction, such that all whip stitches around one of the strut sections are formed as angled whip stitches oriented in one direction, while all whip stitches around the other strut section are formed as angled whip stitched oriented in a second direction, opposite to the first direction.

Example 124. The method of any example herein, particularly any one of examples 116 to 123, wherein the skirt proximal end comprises a series of pre-formed apertures, and wherein the step of threading a primary suture comprises threading the primary suture in an in-and-out pattern through the series of pre-formed apertures.

Example 125. The method of any example herein, particularly any one of examples 116 to 124, wherein the skirt is an outer skirt, disposed around an outer surface of the frame.

Example 126. A prosthetic valve comprising:
a frame movable between a radially compressed configuration and a radially expanded configuration, wherein the frame comprises a plurality of strut sections intersecting at junctions;
a leaflet assembly mounted within the frame and comprising a plurality of leaflets configured to regulate flow through the prosthetic valve; and
a skirt disposed around the frame, the skirt comprising a skirt proximal end and a skirt distal end,
wherein the skirt proximal end is coupled to at least one strut section via at least one primary suture threaded therethrough in an in-and-out pattern, and a secondary suture forming a series of non-penetrating whip stitches spaced from each other along the length of the strut section, each non-penetrating whip stitch comprising a strut-wrapping section looped around the strut section and a primary-suture-wrapping section extending therefrom, looped around the primary suture and passing between the primary suture and the leaflet.

Example 127. The prosthetic valve of any example herein, particularly example 126, wherein the skirt proximal end follows a zig-zag pattern.

Example 128. The prosthetic valve of any example herein, particularly example 127, wherein the at least one primary suture tracks the zig-zag pattern of the skirt proximal end.

Example 129. The prosthetic valve of any example herein, particularly any one of examples 126 to 128, wherein the primary suture defines a series of running stitch portions, and wherein each primary-suture-wrapping section is looped around a corresponding running stitch portion and extends between the running stitch portion and the skirt proximal end.

Example 130. The prosthetic valve of any example herein, particularly any one of examples 126 to 129, wherein the secondary suture does not penetrate through the skirt.

Example 131. The prosthetic valve of any example herein, particularly any one of examples 126 to 130, wherein the secondary suture does not penetrate through the primary suture.

Example 132. The prosthetic valve of any example herein, particularly any one of examples 126 to 131, wherein each junction is defined between: two opposite axial sides comprising a junction proximal side and a junction distal side; two opposite radial sides comprising a junction inner side and a junction outer side; and two opposite lateral sides comprising a junction first lateral side and a junction second lateral side; wherein the skirt proximal end is further coupled to at least one junction at an end of the strut section via a junction lock-knot formed by the second suture, and wherein the junction lock-knot is configured to maintain tension on the plurality of the non-penetrating whip stitches wrapped around the corresponding strut section leading to the junction first lateral section.

Example 133. The prosthetic valve of any example herein, particularly example 132, wherein each junction lock-knot comprises:
- a transition section extending over one axial side of the junction, in a direction from the junction first lateral side to the junction second lateral side;
- a first loop extending from the transition section and around a strut section extending from the junction second lateral side; and
- a second loop extending from the first loop, between the transition section and the junction, and folded over itself to extend through the first loop.

Example 134. The prosthetic valve of any example herein, particularly example 133, wherein the transition section extends in a diagonal direction from one radial side of the junction toward the opposite radial side of the junction, as well as from one lateral side of the junction to the opposite lateral side of the junction.

Example 135. The prosthetic valve of any example herein, particularly any one of examples 133 or 134, wherein both the first loop and the second loop are tightly tensioned around the junction.

Example 136. The prosthetic valve of any example herein, particularly any one of examples 132 to 135, wherein each plurality of non-penetrating whip stitches wrapped around a single strut section are angled non-penetrating whip stitches, oriented in the same direction along the length of the corresponding strut section.

Example 137. The prosthetic valve of any example herein, particularly example 136, wherein the skirt proximal end is sutured to at least two strut sections extending from both lateral sides of a selected junction, via a plurality of non-penetrating whip stitches wrapped around each of the respective strut sections and a junction lock-knot around the junction positioned there-between, and wherein the plurality of non-penetrating whip stitches around one of the strut sections are angled in a direction opposite to that of the plurality of the non-penetrating whip stitches wrapped around the other strut section.

Example 138. The prosthetic valve of any example herein, particularly any one of examples 126 to 137, wherein the skirt distal end is coupled to at least one strut section at an inflow end portion of the valve via at least one additional primary suture threaded at penetration points therethrough in an in-and-out pattern, and an additional secondary suture threaded through the primary suture and wrapped around the strut section at the inflow end portion in a series of whip stitches spaced from each other along the length of the strut section, and wherein the skirt distal end is further coupled to at least one junction at an end of the strut section at the inflow end portion via an additional junction lock-knot.

Example 139. The prosthetic valve of any example herein, particularly example 138, wherein the additional primary suture tracks the shape of the strut sections disposed around the inflow end portion.

Example 140. The prosthetic valve of any example herein, particularly any one of examples 126 to 139, wherein the primary suture comprises a multi-filament suture.

Example 141. The prosthetic valve of any example herein, particularly any one of examples 126 to 140, wherein the secondary suture comprises an ultra-high-molecular-weight polyethylene.

Example 142. The prosthetic valve of any example herein, particularly any one of examples 126 to 141, wherein the skirt is an outer skirt, disposed around an outer surface of the frame.

Example 143. A method of assembling a prosthetic valve, the method comprising steps of:
- threading a primary suture in an in-and-out pattern through a skirt proximal end of a skirt;
- approximating the skirt proximal end with the primary suture threaded there-through to at least one strut section of a frame of the prosthetic valve; and
- looping a secondary suture around the at least one strut section and around the primary suture, in a manner that forms a plurality of non-penetrating whip stitches wrapped around the strut section up to a final non-penetrating whip stitch, each non-penetrating whip stitch comprising a strut-wrapping section looped around the strut section and a primary-suture-wrapping section extending therefrom, passing between the primary suture and the skirt proximal end around the primary suture.

Example 144. The method of any example herein, particularly example 143, wherein forming each non-penetration whip stitch comprises forming the strut-wrapping section by: extending the secondary suture across one radial side of the strut section, folding it over an axial side of the strut section, and extending it backward across the opposite radial side of the strut section.

Example 145. The method of any example herein, particularly example 144, wherein forming each non-penetration whip stitch further comprises forming the primary-suture-wrapping section by: passing the secondary suture between a running stitch portion of the primary suture and the skirt proximal end, and folding it over the running stitch portion.

Example 146. The method of any example herein, particularly example 144, wherein forming each non-penetration whip stitch further comprises forming the primarysuture-wrapping section by: passing the secondary suture over a running stitch portion of the primary suture, and looping it back over the running stitch portion and between the running stitch portion and the skirt proximal end.

Example 147. The method of any example herein, particularly any one of examples 145 or 146, wherein the skirt is an outer skirt and the running stitch portion is an inner stitch portion of the primary suture.

Example 148. The method of any example herein, particularly any one of examples 143 to 147, further comprising a step of forming a junction lock-knot extending from the final non-penetrating whip stitch around a junction at a respective end of the corresponding strut section, wherein the junction lock-knot is configured to maintain tension on the plurality of non-penetrating whip stitches wrapped around the strut section leading to the junction first lateral section.

Example 149. The method of any example herein, particularly example 148, wherein the step of forming a junction lock-knot comprises extending the secondary suture from the final non-penetrating whip stitch disposed at a first lateral side of the junction, over one axial side of the junction, in a direction toward a second lateral side of the junction, thereby forming a transition section of the junction lock-knot.

Example 150. The method of any example herein, particularly example 149, wherein the step of forming a junction lock-knot further comprises extending the secondary suture from the transition section around a strut section extending from the second lateral side of the junction, thereby forming a first loop of the junction lock-knot.

Example 151. The method of any example herein, particularly example 150, wherein the step of forming a junction lock-knot further comprises extending the secondary suture from the first loop, between the transition section and the junction, folding the secondary suture back over itself and passing it through the first loop, thereby forming a second loop of the junction lock-knot.

Example 152. The method of any example herein, particularly example 151, wherein the step of forming a junction lock-knot further comprises forcibly pulling the tail of the second loop to tighten both the first loop and the second loop around the junction.

Example 153. The method of any example herein, particularly any one of examples 149 to 152, wherein forming the transition section comprises extending the secondary suture in a diagonal direction from one radial side of the junction toward an opposite radial side of the junction, as well as from one lateral side of the junction to the opposite lateral side of the junction.

Example 154. The method of any example herein, particularly any one of examples 148 to 153, wherein forming the plurality of whip stitches around any single strut section comprises forming a plurality of angled whip stitches oriented in the same direction around the length of the corresponding strut section.

Example 155. The method of any example herein, particularly example 154, wherein forming the plurality of whip stitches around the at least one strut section comprises forming a plurality of whip stitches around at least two strut sections separated from each other by a mutual junction, such that all whip stitches around one of the strut sections are formed as angled whip stitches oriented in one direction, while all whip stitches around the other strut section are formed as angled whip stitched oriented in a second direction, opposite to the first direction.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. No feature described in the context of an embodiment is to be considered an essential feature of that embodiment, unless explicitly specified as such.

In view of the many possible embodiments to which the principles of the disclosure may be applied, it should be recognized that the illustrated embodiments are only preferred examples and should not be taken as limiting the scope. Rather, the scope is defined by the following claims. We therefore claim all that comes within the scope and spirit of these claims.

The invention claimed is:

1. A prosthetic valve comprising:
a frame movable between a radially compressed configuration and a radially expanded configuration, wherein the frame comprises a plurality of strut sections intersecting at junctions, and
a leaflet assembly mounted within the frame and comprising a plurality of leaflets configured to regulate flow through the prosthetic valve, wherein each leaflet comprises a rounded cusp end portion defining a cusp edge, a free edge opposite to the cusp edge, and a pair of oppositely-directed tabs separating the cusp edge and the free edge;
wherein each cusp end portion is coupled to at least one strut section via at least one primary suture threaded therethrough in an in-and-out pattern, and a secondary suture forming a series of non-penetrating whip stitches spaced from each other along the length of the strut section, each non-penetrating whip stitch comprising a strut-wrapping section looped around the strut section and a primary-suture-wrapping section extending therefrom, looped around the primary suture and passing between the primary suture and the leaflet.

2. The prosthetic valve of claim 1, wherein the primary suture defines a series of running stitch portions, and wherein each primary-suture-wrapping section is looped around a corresponding running stitch portion and extends between the running stitch portion and the rounded cusp end portion.

3. The prosthetic valve of claim 1, wherein the secondary suture does not penetrate through the leaflet.

4. The prosthetic valve of claim 1, wherein the secondary suture does not penetrate through the primary suture.

5. The prosthetic valve of claim 1, wherein each junction is defined between: two opposite axial sides comprising a junction proximal side and a junction distal side; two opposite radial sides comprising a junction inner side and a junction outer side; and two opposite lateral sides comprising a junction first lateral side and a junction second lateral side; wherein the cusp end portion is further coupled to at least one junction at an end of the strut section via a junction lock-knot formed by the second suture, and wherein the junction lock-knot is configured to maintain tension on the plurality of the non-penetrating whip stitches wrapped around the corresponding strut section leading to the junction first lateral section.

6. The prosthetic valve of claim 5, wherein each junction lock-knot comprises:

a transition section extending over one axial side of the junction, in a direction from the junction first lateral side to the junction second lateral side;

a first loop extending from the transition section and around a strut section extending from the junction second lateral side; and a second loop extending from the first loop, between the transition section and the junction, and folded over itself to extend through the first loop.

7. The prosthetic valve of claim 6, wherein the transition section extends in a diagonal direction from one radial side of the junction toward the opposite radial side of the junction, as well as from one lateral side of the junction to the opposite lateral side of the junction.

8. The prosthetic valve of claim 6, wherein both the first loop and the second loop are tightly tensioned around the junction.

9. The prosthetic valve of claim 5, wherein each plurality of non-penetrating whip stitches wrapped around a single strut section are angled non-penetrating whip stitches, oriented in the same direction along the length of the corresponding strut section.

10. The prosthetic valve of claim 9, wherein the cusp end portion is sutured to at least two strut sections extending from both lateral sides of a selected junction, via a plurality of non-penetrating whip stitches wrapped around each of the respective strut sections and a junction lock-knot around the junction positioned there-between, and wherein the plurality of non-penetrating whip stitches around one of the strut sections are angled in a direction opposite to that of the plurality of the non-penetrating whip stitches wrapped around the other strut section.

11. The prosthetic valve of claim 1, wherein the prosthetic valve is devoid of fabric strips and/or cloth between the cusp end portions of the leaflets and the strut sections they are attached to.

12. A prosthetic valve comprising:

a frame movable between a radially compressed configuration and a radially expanded configuration, wherein the frame comprises a plurality of strut sections intersecting at junctions;

a leaflet assembly mounted within the frame and comprising a plurality of leaflets configured to regulate flow through the prosthetic valve; and a skirt disposed around the frame, the skirt comprising a skirt proximal end and a skirt distal end, wherein the skirt proximal end is coupled to at least one strut section via at least one primary suture threaded therethrough in an in-and-out pattern, and a secondary suture forming a series of non-penetrating whip stitches spaced from each other along the length of the strut section, each non-penetrating whip stitch comprising a strut-wrapping section looped around the strut section and a primary-suture-wrapping section extending therefrom, looped around the primary suture and passing between the primary suture and the leaflet.

13. The prosthetic valve of claim 12, wherein the primary suture defines a series of running stitch portions, and wherein each primary-suture-wrapping section is looped around a corresponding running stitch portion and extends between the running stitch portion and the skirt proximal end.

14. The prosthetic valve of claim 12, wherein the secondary suture does not penetrate through the skirt.

15. The prosthetic valve of claim 12, wherein the secondary suture does not penetrate through the primary suture.

16. The prosthetic valve of claim 12, wherein each junction is defined between: two opposite axial sides comprising a junction proximal side and a junction distal side; two opposite radial sides comprising a junction inner side and a junction outer side; and two opposite lateral sides comprising a junction first lateral side and a junction second lateral side; wherein the skirt proximal end is further coupled to at least one junction at an end of the strut section via a junction lock-knot formed by the second suture, and wherein the junction lock-knot is configured to maintain tension on the plurality of the non-penetrating whip stitches wrapped around the corresponding strut section leading to the junction first lateral section.

17. The prosthetic valve of claim 16, wherein each junction lock-knot comprises:

a transition section extending over one axial side of the junction, in a direction from the junction first lateral side to the junction second lateral side;

a first loop extending from the transition section and around a strut section extending from the junction second lateral side; and a second loop extending from the first loop, between the transition section and the junction, and folded over itself to extend through the first loop.

18. The prosthetic valve of claim 17, wherein the transition section extends in a diagonal direction from one radial side of the junction toward the opposite radial side of the junction, as well as from one lateral side of the junction to the opposite lateral side of the junction.

19. The prosthetic valve of claim 17, wherein both the first loop and the second loop are tightly tensioned around the junction.

20. The prosthetic valve of claim 16, wherein each plurality of non-penetrating whip stitches wrapped around a single strut section are angled non-penetrating whip stitches, oriented in the same direction along the length of the corresponding strut section.

21. The prosthetic valve of claim 20, wherein the skirt proximal end is sutured to at least two strut sections extending from both lateral sides of a selected junction, via a plurality of non-penetrating whip stitches wrapped around each of the respective strut sections and a junction lock-knot around the junction positioned there-between, and wherein the plurality of non-penetrating whip stitches around one of the strut sections are angled in a direction opposite to that of the plurality of the non-penetrating whip stitches wrapped around the other strut section.

* * * * *